US012757186B2

(12) United States Patent
Sun et al.

(10) Patent No.: US 12,757,186 B2
(45) Date of Patent: Oct. 6, 2026

(54) DATA TRANSMISSION METHOD AND RELATED APPARATUS

(71) Applicant: HUAWEI TECHNOLOGIES CO., LTD., Shenzhen (CN)

(72) Inventors: Desheng Sun, Shenzhen (CN); Li Ding, Shenzhen (CN); Chunsheng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 838 days.

(21) Appl. No.: 18/305,138

(22) Filed: Apr. 21, 2023

(65) Prior Publication Data

US 2023/0262680 A1 Aug. 17, 2023

Related U.S. Application Data

(63) Continuation of application No. PCT/CN2021/123234, filed on Oct. 12, 2021.

(30) Foreign Application Priority Data

Oct. 22, 2020 (CN) ........................ 202011137851.2

(51) Int. Cl.
*H04W 72/121* (2023.01)
*H04W 72/0446* (2023.01)
*H04W 72/1263* (2023.01)

(52) U.S. Cl.
CPC ..... *H04W 72/121* (2013.01); *H04W 72/0446* (2013.01); *H04W 72/1263* (2013.01)

(58) Field of Classification Search
CPC ........... H04W 72/121; H04W 72/0446; H04W 72/1263
See application file for complete search history.

(56) References Cited

U.S. PATENT DOCUMENTS

2015/0120955 A1 4/2015 Wang
2019/0097748 A1* 3/2019 Loprieno .............. H04L 1/0057
2022/0021472 A1* 1/2022 Stracca ................ H04L 1/0041

FOREIGN PATENT DOCUMENTS

JP 2018526866 A 9/2018

OTHER PUBLICATIONS

ISO/IEC/IEEE 8802-3,Part 3:Standard for Ethernet,Amendment 10:Media access control parameters,physical layers,and management parameters for 200 Gb/s and 400 Gb/s operation,Feb. 28, 2019,XP068149978,total 376 pages.

(Continued)

*Primary Examiner* — Michael Thier
*Assistant Examiner* — Nevena Zecevic Sandhu
(74) *Attorney, Agent, or Firm* — WOMBLE BOND DICKINSON (US) LLP

(57) ABSTRACT

An embodiment of this application provides a data transmission method. The method includes: A first communication apparatus sends an $i^{th}$ AM group to a second communication apparatus, and sends first data of a plurality of service flows to the second communication apparatus based on a mapping relationship. The first data is carried in M time units between the $i^{th}$ AM group and an $(i+1)^{th}$ AM group, the mapping relationship is a mapping relationship between a slot of a first calendar and the plurality of service flows, and the first calendar includes s slots. The M time units between the $i^{th}$ AM group and the $(i+1)^{th}$ AM group include N first counting periods, each time unit of the first counting period corresponds to one slot of the first calendar, and different time units of a same first counting period correspond to different slots of the first calendar.

20 Claims, 29 Drawing Sheets

(56) References Cited

OTHER PUBLICATIONS

IEEE Std 802.3™-2018,IEEE Standard for Ethernet,Jun. 14, 2018,total 5600 pages.
Flex Ethernet Implementation Agreement,IA # OIF-FLEXE-01. 0,Implementation Agreement created and approved by the Optical Internetworking Forum,Mar. 2016,total 31 pages.
Flexible Ethernet Technology White Paper(2018 Edition),2018,total 40 pages.
IEEE P802.1AX-Rev/D2.1,Bridges and Bridged Networks—Link Aggregation,Aug. 23, 2019,total 333 pages.

* cited by examiner

DATA TRANSMISSION METHOD AND RELATED APPARATUS

CROSS-REFERENCE TO RELATED APPLICATIONS

This application is a continuation of International Application No. PCT/CN2021/123234, filed on Oct. 12, 2021, which claims priority to Chinese Patent Application No. 202011137851.2, filed on Oct. 22, 2020. The disclosures of the aforementioned applications are hereby incorporated by reference in their entireties.

TECHNICAL FIELD

This application relates to Ethernet technologies, and in particular, to a data transmission method and a related apparatus.

BACKGROUND

A cut-through (cut-through) forwarding technology is also referred to as fast forwarding. After obtaining a destination address of a data packet, a switch starts to send the data packet to a destination port. Usually, when receiving first six bytes of the data packet, the switch determines the destination address of the data packet, and therefore can determine a port to which the data packet is to be forwarded. In cut-through, forwarding does not need to be performed after the entire data packet is completely received, but is performed only when first six bytes of the data packet are received. Therefore, a cut-through forwarding mechanism for forwarding a data packet has a low delay and a high forwarding rate.

In the cut-through forwarding mechanism for forwarding a data packet, a data transmission rate of an ingress port of the switch needs to be consistent with a data transmission rate of an egress port of the switch, to implement cut-through forwarding. To keep the data transmission rate of the ingress port consistent with the data transmission rate of the egress port of the switch, a flexible Ethernet FlexE technology is used, and a flexible Ethernet protocol function layer (which may also be referred to as FlexE Shim) is inserted into a standard Ethernet architecture. The FlexE Shim maps data of a FlexE Client to different slots, to implement decoupling of a MAC sub-rate from an underlying physical (PHY) layer, so as to meet a requirement that the data transmission rate of the ingress port of the switch is consistent with the data transmission rate of the egress port of the switch.

In the FlexE technology, a FlexE Shim layer is inserted into the standard Ethernet architecture, to implement decoupling of a MAC sub-rate from an underlying PHY layer, so as to meet a requirement that the data transmission rate of the ingress port of the switch is consistent with the data transmission rate of the egress port of the switch. However, the FlexE Shim brings specific delay overheads for data transmission. Consequently, a data transmission delay is large, and data transmission performance is affected.

SUMMARY

Embodiments of this application provide a data transmission method and a related apparatus, to reduce a data transmission delay, and improve data transmission performance.

According to a first aspect, an embodiment of this application provides a data transmission method. The method includes:

A first communication apparatus sends an $i^{th}$ alignment marker (alignment marker, AM) group to a second communication apparatus, where the $i^{th}$ AM group is used to align a plurality of logical lanes, and i is an integer greater than or equal to 1; and sends first data of a plurality of service flows to the second communication apparatus based on a mapping relationship by using the plurality of logical lanes, where the first data is carried in M time units between the $i^{th}$ AM group and an $(i+1)^{th}$ AM group, and M is an integer greater than or equal to 2. The M time units between the $i^{th}$ AM group and the $(i+1)^{th}$ AM group include N first counting periods, the first counting period includes s time units, each time unit of the first counting period corresponds to one slot of a first calendar, and different time units of a same first counting period correspond to different slots of the first calendar, where s is an integer greater than or equal to 2, and N is an integer greater than or equal to 1. The first communication apparatus sends the $(i+1)^{th}$ AM group to the second communication apparatus, where a transmission time interval between sending the $i^{th}$ AM group by the first communication apparatus and sending the $(i+1)^{th}$ AM group by the first communication apparatus is the M time units.

In this embodiment, a first calendar is designed based on the $i^{th}$ AM group of the plurality of logical lanes, and the slot included in the first calendar has a mapping relationship with the plurality of service flows. The first communication apparatus maps the data of the plurality of service flows to a corresponding slot, so that the first communication apparatus implements sub-rate allocation. Therefore, this implements decoupling between a MAC sub-rate and an underlying PHY layer, implements consistency between a data transmission rate of an ingress port of a transmitting end device and a data transmission rate of an egress port without introducing a FlexE Shim, reduces a data transmission delay, and improves data transmission performance.

In a possible implementation, the M time units between the $i^{th}$ AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In this possible implementation, when a remainder obtained by dividing M by s is not 0, the M time units between the $i^{th}$ AM group and the $(i+1)^{th}$ AM group further includes the second counting period. A specific quantity of included second counting periods may be determined based on a specific division manner of the first counting period and the remainder obtained by dividing M by s.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes. In this implementation, the first communication apparatus maps data of one slot to only some logical lanes. Therefore, when some logical lanes are faulty, only the data of the slot is affected, and data of all other slots is not affected, to improve data transmission performance.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In this implementation, one slot corresponds to only one of the plurality of logical lanes. Therefore, when the logical lane is faulty, only data of the slot corresponding to the logical lane is affected, and data of all other slots is not affected, to improve data transmission performance.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In this implementation, one slot corresponds to only K logical lanes in the plurality of logical lanes. Therefore, when any one or more of the K logical lanes are faulty, only data of the slot is affected, and data of all other slots is not affected, to improve data transmission performance.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In this implementation, one logical lane corresponds to K slots. Therefore, when the logical lane is faulty, only data of the K slots is affected, and data of all other slots is not affected, to improve data transmission performance.

In another possible implementation, the method further includes: The first communication apparatus generates the $i^{th}$ AM group based on the mapping relationship, where the $i^{th}$ AM group indicates service flows separately corresponding to the slots of the first calendar.

In this possible implementation, a specific implementation in which the mapping relationship is delivered by using the AM group is provided, and a service flow corresponding to each slot of the first calendar is identified by using the AM group. The first communication apparatus is compatible with an architecture of the existing Ethernet technology in a manner in which the $i^{th}$ AM group carries the mapping relationship. This implements indication of a mapping relationship between a slot and a service flow without introducing additional signaling overheads.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group.

In this implementation, because the quantity M of time units between two adjacent AM groups is not necessarily exactly divided by the quantity s of slots included in the first calendar, the first AM in the AM group is used to identify the slot, of the first calendar, that corresponds to the first time unit of the $1^{st}$ counting period in the M time units between the $i^{th}$ AM group and the $(i+1)^{th}$ AM group. Therefore, a receiving end device determines slots corresponding to the M time units, and then determines, based on the mapping relationship, a service flow corresponding to each slot, to determine a service flow corresponding to data carried in the M time units.

According to a second aspect, an embodiment of this application provides a data transmission method. The method includes:

A second communication apparatus receives an $i^{th}$ AM group sent by a first communication apparatus, where the $i^{th}$ AM group is used to align a plurality of logical lanes, and i is an integer greater than or equal to 1; and receives, in M time units between the $i^{th}$ AM group and an $(i+1)^{th}$ AM group, first data of a plurality of service flows sent by the first communication apparatus by using the plurality of logical lanes, where M is an integer greater than or equal to 2. The second communication apparatus determines service flows corresponding to data separately carried in the M time units between the $i^{th}$ AM group and the $(i+1)^{th}$ AM group. There is a mapping relationship between the plurality of service flows and a slot of a first calendar (calendar), the first calendar includes s slots, the M time units between the $i^{th}$ AM group and the $(i+1)^{th}$ AM group includes N first counting periods, the first counting period includes s time units, each time unit of the first counting period corresponds to one slot of the first calendar, and different time units of a same first counting period correspond to different slots of the first calendar. The second communication apparatus receives the $(i+1)^{th}$ AM group sent by the first communication apparatus, where a reception time interval between receiving the $i^{th}$ AM group by the second communication apparatus from the first communication apparatus and receiving the $(i+1)^{th}$ AM group by the second communication apparatus from the first communication apparatus is the M time units, s is an integer greater than or equal to 2, and N is an integer greater than or equal to 1.

In this embodiment, a first calendar is designed based on the $i^{th}$ AM group of the plurality of logical lanes, and the slot included in the first calendar has a mapping relationship with the plurality of service flows. The first communication apparatus maps the data of the plurality of service flows to a corresponding slot, so that the first communication apparatus implements sub-rate allocation. Therefore, this implements decoupling between a MAC sub-rate and an underlying PHY layer, implements consistency between a data transmission rate of an ingress port of a transmitting end device and a data transmission rate of an egress port without introducing a FlexE Shim, reduces a data transmission delay, and improves data transmission performance.

In a possible implementation, the M time units between the $i^{th}$ AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In this possible implementation, when a remainder obtained by dividing M by s is not 0, the M time units between the $i^{th}$ AM group and the $(i+1)^{th}$ AM group further includes the second counting period. A specific quantity of included second counting periods may be determined based on a specific division manner of the first counting period and the remainder obtained by dividing M by s.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes. In this implementation, the first communication apparatus maps data of one slot to only some logical lanes. Therefore, when some logical lanes are faulty, only the data of the slot is affected, and data of all other slots is not affected, to improve data transmission performance.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In this implementation, one slot corresponds to only one of the plurality of logical lanes. Therefore, when the logical lane is faulty, only data of the slot corresponding to the logical lane is affected, and data of all other slots is not affected, to improve data transmission performance.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In this implementation, one slot corresponds to only K logical lanes in the plurality of logical lanes. Therefore, when any one or more of the K logical lanes are faulty, only data of the slot is affected, and data of all other slots is not affected, to improve data transmission performance.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In this implementation, one logical lane corresponds to K slots. Therefore, when the logical lane is faulty, only data of the K slots is affected, and data of all other slots is not affected, to improve data transmission performance.

In another possible implementation, that the second communication apparatus determines service flows corresponding to data separately carried in the M time units between the $i^{th}$ AM group and the $(i+1)^{th}$ AM group includes: The second communication apparatus determines slots, of the first calendar, separately corresponding to the M time units between the $i^{th}$ AM group and the $(i+1)^{th}$ AM group; and determines, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group. This implementation shows a specific process in which the second communication apparatus determines the service flows corresponding to the data separately carried in the M time units.

In another possible implementation, the $i^{th}$ AM group indicates service flows separately corresponding to the slots of the first calendar. That the second communication apparatus determines, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group includes: The second communication apparatus determines, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group.

In this possible implementation, the second communication apparatus first determines a slot corresponding to each time unit, and then determines, based on the mapping relationship, the service flow corresponding to the data carried in each time unit.

In another possible implementation, a first AM in the $i^{th}$ AM group indicates a slot, of the first calendar, that corresponds to a first time unit of a $1^{st}$ counting period in the M time units between the $i^{th}$ AM group and the $(i+1)^{th}$ AM group. That the second communication apparatus determines slots, of the first calendar, separately corresponding to the M time units between the $i^{th}$ AM group and the $(i+1)^{th}$ AM group includes: The second communication apparatus determines, based on the first AM in the $i^{th}$ AM group, the slots, of the first calendar, separately corresponding to the M time units between the $i^{th}$ AM group and the $(i+1)^{th}$ AM group.

In this possible implementation, the second communication apparatus determines, based on the first AM in the $i^{th}$ AM group, the slot corresponding to the first time unit of the $1^{st}$ counting period in the M time units between the $i^{th}$ AM group and the $(i+1)^{th}$ AM group, and then determines, based on the slot corresponding to the first time unit, the slot corresponding to each time unit in the first counting period.

According to a third aspect, an embodiment of this application provides a data transmission method. The method includes:

A first communication apparatus sends first data of a plurality of service flows to a second communication apparatus based on a mapping relationship by using a plurality of logical lanes, where the first data is carried in M time units, M is an integer greater than or equal to 2, the M time units include N first counting periods and at least one second counting period, and N is an integer greater than or equal to 1.

The first counting period includes s time units, each time unit of the first counting period corresponds to one slot of a first calendar, and different time units of a same first counting period correspond to different slots of the first calendar. The second counting period includes only a part of the s time units, each time unit of the second counting period corresponds to one slot of the first calendar, different time units of a same second counting period correspond to different slots of the first calendar, and s is an integer greater than or equal to 2.

In this embodiment, the M time units include N first counting periods and at least one second counting period, the first counting period includes s time units, and the s time units one-to-one correspond to s slots. The second counting period is an incomplete counting period, and includes only a part of the s time units, and each time unit of the second counting period corresponds to one slot of the first calendar, to map the data of the plurality of service flows to a corresponding slot. Therefore, the first communication apparatus implements sub-rate allocation.

In a possible implementation, the method further includes:

The first communication apparatus sends an $i^{th}$ AM group to the second communication apparatus, where i is an integer greater than or equal to 1.

The first communication apparatus sends an $(i+1)^{th}$ AM group to the second communication apparatus, where the $i^{th}$ AM group and the $(i+1)^{th}$ AM group are used to align the plurality of logical lanes, and a transmission time interval between sending the $i^{th}$ AM group by the first communication apparatus and sending the $(i+1)^{th}$ AM group by the first communication apparatus is the M time units. In other words, the M time units carrying the first data is the M time units between the $i^{th}$ AM group and the $(i+1)^{th}$ AM group.

In this possible implementation, a first calendar (calendar) is designed based on the $i^{th}$ AM group of the plurality of logical lanes, and the slot included in the first calendar has a mapping relationship with the plurality of service flows. The first communication apparatus maps the data of the plurality of service flows to a corresponding slot, so that the first communication apparatus implements sub-rate allocation. Therefore, this implements decoupling between a MAC sub-rate and an underlying PHY layer, implements consistency between a data transmission rate of an ingress port of a transmitting end device and a data transmission rate of an egress port without introducing a FlexE Shim, reduces a data transmission delay, and improves data transmission performance.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, the method further includes: The first communication apparatus generates the $i^{th}$ AM group based on the mapping relationship, where the $i^{th}$ AM group indicates service flows separately corresponding to the slots of the first calendar.

In this possible implementation, a specific implementation in which the mapping relationship is delivered by using the AM group is provided, and a service flow corresponding to each slot of the first calendar is identified by using the AM group. The first communication apparatus is compatible with an architecture of the existing Ethernet technology in a manner in which the $i^{th}$ AM group carries the mapping relationship. This implements indication of a mapping relationship between a slot and a service flow without introducing additional signaling overheads. In addition, because the first counting period includes s time units, the $i^{th}$ AM group may be used to identify a slot corresponding to each time unit in the first counting period. A remainder obtained by dividing the quantity M of time units included between the $i^{th}$ AM group and the $(i+1)^{th}$ AM group by the quantity s of slots is not 0, and slots corresponding to time units that are at a same location of the first counting period and that are included between different AM groups may change. Therefore, the first communication apparatus may identify, by using the AM group, a service flow of a slot corresponding to each time unit in the first counting period.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group.

In this implementation, because the quantity M of time units between two adjacent AM groups is not necessarily exactly divided by the quantity s of slots included in the first calendar, the first AM in the AM group is used to identify the slot, of the first calendar, that corresponds to the first time unit of the $1^{st}$ counting period in the M time units between the $i^{th}$ AM group and the $(i+1)^{th}$ AM group. Therefore, a receiving end device determines slots corresponding to the M time units, and then determines, based on the mapping relationship, a service flow corresponding to each slot, to determine a service flow corresponding to data carried in the M time units.

According to a fourth aspect, an embodiment of this application provides a data transmission method. The method includes:

A second communication apparatus receives, in M time units, first data that is of a plurality of service flows and that is sent by a first communication apparatus by using a plurality of logical lanes, where M is an integer greater than or equal to 2; and determines service flows corresponding to data separately carried in the M time units.

There is a mapping relationship between the plurality of service flows and a slot of a first calendar, the first calendar includes s slots, and s is an integer greater than or equal to 2.

The M time units include N first counting periods and at least one second counting period. The first counting period includes s time units, each time unit of the first counting period corresponds to one slot of the first calendar, and different time units of a same first counting period correspond to different slots of the first calendar. The second counting period includes only a part of the s time units, each time unit of the second counting period corresponds to one slot of the first calendar, different time units of a same second counting period correspond to different slots of the first calendar, and N is an integer greater than or equal to 1.

In this embodiment, the M time units include N first counting periods and at least one second counting period, the first counting period includes s time units, and the s time units one-to-one correspond to s slots. The second counting period is an incomplete counting period, and includes only a part of the s time units, and each time unit of the second counting period corresponds to one slot of the first calendar, to map the data of the plurality of service flows to a corresponding slot. Therefore, the first communication apparatus implements sub-rate allocation.

In a possible implementation, the method further includes:

The second communication apparatus receives an $i^{th}$ AM group sent by the first communication apparatus, where i is an integer greater than or equal to 1.

The second communication apparatus receives an $(i+1)^{th}$ AM group sent by the first communication apparatus.

The $i^{th}$ AM group and the $(i+1)^{th}$ AM group are used to align the plurality of logical lanes, and a reception time interval between receiving the $i^{th}$ AM group by the second communication apparatus from the first communication apparatus and receiving the $(i+1)^{th}$ AM group by the second communication apparatus from the first communication apparatus is the M time units. In other words, the M time units carrying the first data received by the second communication apparatus is the M time units between the $i^{th}$ AM group and the $(i+1)^{th}$ AM group, where s is an integer greater than or equal to 2, and N is an integer greater than or equal to 1.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, that the second communication apparatus determines service flows corresponding to data separately carried in the M time units includes: The second communication apparatus determines slots, of the first calendar, separately corresponding to the M time units; and determines, based on the slots, of the first calendar, separately corresponding to the M time units, the service flows corresponding to data separately carried in the M time units.

This implementation shows a specific process in which the second communication apparatus determines the service flows corresponding to the data separately carried in the M time units.

In another possible implementation, the $i^{th}$ AM group indicates service flows separately corresponding to the slots of the first calendar. That the second communication apparatus determines, based on the slots, of the first calendar, separately corresponding to the M time units, the service flows corresponding to data separately carried in the M time units includes: The second communication apparatus determines, based on the $i^{th}$ AM group and the slots, of the first calendar, separately corresponding to the M time units, the service flows corresponding to data separately carried in the M time units between the $i^{th}$ AM group and the $(i+1)^{th}$ AM group.

In this possible implementation, the second communication apparatus first determines a slot corresponding to each time unit, and then determines, based on the mapping relationship, the service flow corresponding to the data carried in each time unit.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group. That the second communication apparatus determines slots, of the first calendar, separately corresponding to the M time units includes: The second communication apparatus determines, based on the first AM in the $i^{th}$ AM group, slots, of the first calendar, separately corresponding to the M time units between the $i^{th}$ AM group and the $(i+1)^{th}$ AM group.

In this possible implementation, the second communication apparatus determines, based on the first AM in the $i^{th}$ AM group, the slot corresponding to the first time unit of the $1^{st}$ counting period in the M time units between the $i^{th}$ AM group and the $(i+1)^{th}$ AM group, and then determines, based on the slot corresponding to the first time unit, the slot corresponding to each time unit in the first counting period.

According to a fifth aspect, an embodiment of this application provides a first communication apparatus. The first communication apparatus includes:

a transceiver unit, configured to: send an $i^{th}$ AM group to a second communication apparatus, where the $i^{th}$ AM group is used to align a plurality of logical lanes, and i is an integer greater than or equal to 1; send first data of a plurality of service flows to the second communication apparatus based on a mapping relationship by using the plurality of logical lanes, where the first data is carried in M time units between the $i^{th}$ AM group and an $(i+1)^{th}$ AM group, M is an integer greater than or equal to 2, a first counting period includes s time units, each time unit of the first counting period corresponds to one slot of a first calendar, and different time units of a same first counting period correspond to different slots of the first calendar, where s is an integer greater than or equal to 2, and N is an integer greater than or equal to 1; and send the $(i+1)^{th}$ AM group to the second communication apparatus, where a transmission time interval between sending the $i^{th}$ AM group by the transceiver unit and sending the $(i+1)^{th}$ AM group by the transceiver unit is the M time units.

In a possible implementation, the M time units between the $i^{th}$ AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In this possible implementation, when a remainder obtained by dividing M by s is not 0, the M time units between the $i^{th}$ AM group and the $(i+1)^{th}$ AM group further includes the second counting period. A specific quantity of included second counting periods may be determined based on a specific division manner of the first counting period and the remainder obtained by dividing M by s.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In another possible implementation, the first communication apparatus further includes a processing unit.

The processing unit is configured to generate the $i^{th}$ AM group based on the mapping relationship, where the $i^{th}$ AM group indicates service flows corresponding to the slots of the first calendar.

In another possible implementation, a first AM in the $i^{th}$ AM group indicates a slot, of the first calendar, that corresponds to a first time unit of a $1^{st}$ counting period in the M time units between the $i^{th}$ AM group and the $(i+1)^{th}$ AM group.

According to a sixth aspect, an embodiment of this application provides a second communication apparatus. The second communication apparatus includes:

- a transceiver unit, configured to: receive an $i^{th}$ AM group sent by a first communication apparatus, where the $i^{th}$ AM group is used to align a plurality of logical lanes, and i is an integer greater than or equal to 1; and receive, in M time units between the $i^{th}$ AM group and an $(i+1)^{th}$ AM group, first data that is of a plurality of service flows and that is sent by the first communication apparatus by using the plurality of logical lanes, where M is an integer greater than or equal to 2; and
- a processing unit, configured to: determine service flows corresponding to data separately carried in the M time units between the $i^{th}$ AM group and the $(i+1)^{th}$ AM group.

There is a mapping relationship between the plurality of service flows and a slot of a first calendar (calendar), and the first calendar includes s slots. The M time units between the $i^{th}$ AM group and the $(i+1)^{th}$ AM group include N first counting periods, the first counting period includes s time units, each time unit of the first counting period corresponds to one slot of the first calendar, and different time units of a same first counting period correspond to different slots of the first calendar, where s is an integer greater than or equal to 2, and N is an integer greater than or equal to 1.

The transceiver unit is further configured to receive the $(i+1)^{th}$ AM group sent by the first communication apparatus, where a reception time interval between receiving the $i^{th}$ AM group by the transceiver unit from the first communication apparatus and receiving the $(i+1)^{th}$ AM group by the transceiver unit from the first communication apparatus is the M time units.

In a possible implementation, the M time units between the $i^{th}$ AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In this possible implementation, when a remainder obtained by dividing M by s is not 0, the M time units between the $i^{th}$ AM group and the $(i+1)^{th}$ AM group further includes the second counting period. A specific quantity of included second counting periods may be determined based on a specific division manner of the first counting period and the remainder obtained by dividing M by s.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

This possible implementation shows two possible location relationships between the second counting period included in the M time units and the N first counting periods.

In another possible implementation, if a remainder obtained by dividing M by s is r, the second counting period includes r time units, and r is an integer greater than or equal to 1 and less than s.

In this possible implementation, the remainder obtained by dividing M by s is used to determine a quantity of time units included in the second counting period.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

This possible implementation shows location relationships between the two second counting periods included in the M time units and the N first counting periods.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In another possible implementation, the processing unit is specifically configured to:

determine slots, of the first calendar, separately corresponding to the M time units between the $i^{th}$ AM group and the $(i+1)^{th}$ AM group; and determine, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group.

In another possible implementation, the $i^{th}$ AM group indicates service flows separately corresponding to the slots of the first calendar, and the processing unit is specifically configured to:

determine, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group.

In another possible implementation, a first AM in the $i^{th}$ AM group indicates a slot, of the first calendar, that corresponds to a first time unit of a $1^{st}$ counting period in the M time units between the $i^{th}$ AM group and the $(i+1)^{th}$ AM group, and the processing unit is specifically configured to:

determine, based on the first AM in the $i^{th}$ AM group, the slots, of the first calendar, separately corresponding to the M time units between the $i^{th}$ AM group and the $(i+1)^{th}$ AM group.

According to a seventh aspect, an embodiment of this application provides a first communication apparatus. The first communication apparatus includes:

a transceiver unit, configured to send first data of a plurality of service flows to a second communication apparatus based on a mapping relationship by using a plurality of logical lanes, where the first data is carried in M time units, M is an integer greater than or equal to 2, the M time units include N first counting periods and at least one second counting period, and N is an integer greater than or equal to 1.

The first counting period includes s time units, each time unit of the first counting period corresponds to one slot of the first calendar, and different time units of a same first counting period correspond to different slots of the first calendar, where s is an integer greater than or equal to 2.

The second counting period includes only a part of the s time units, each time unit of the second counting period corresponds to one slot of the first calendar, and different time units of a same second counting period correspond to different slots of the first calendar.

In a possible implementation, the transceiver unit is further configured to:

send an $i^{th}$ AM group to the second communication apparatus, where i is an integer greater than or equal to 1; and send an $(i+1)^{th}$ AM group to the second communication apparatus, where the $i^{th}$ AM group and the $(i+1)^{th}$ AM group are used to align the plurality of logical lanes, and a transmission time interval between sending the $i^{th}$ AM group by the transceiver unit and sending the $(i+1)^{th}$ AM group by the transceiver unit is the M time units. In other words, the M time units carrying the first data is the M time units between the $i^{th}$ AM group and the $(i+1)^{th}$ AM group.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

In another possible implementation, if a remainder obtained by dividing M by s is r, the second counting period includes r time units, and r is an integer greater than or equal to 1 and less than s.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

In another possible implementation, if a remainder obtained by dividing M by s is r, the two second counting periods include r time units, and r is an integer greater than or equal to 1 and less than s.

In another possible implementation, the first communication apparatus further includes a processing unit.

The processing unit is configured to generate the $i^{th}$ AM group based on the mapping relationship, where the $i^{th}$ AM group indicates service flows separately corresponding to the slots of the first calendar.

In this possible implementation, a specific implementation in which the mapping relationship is delivered by using the AM group is provided, and a service flow corresponding to each slot of the first calendar is identified by using the AM group. The first communication apparatus is compatible with an architecture of the existing Ethernet technology in a manner in which the $i^{th}$ AM group carries the mapping relationship. This implements indication of a mapping relationship between a slot and a service flow without introducing additional signaling overheads. In addition, because the first counting period includes s time units, the $i^{th}$ AM group may be used to identify a slot corresponding to each time unit in the first counting period. A remainder obtained by dividing the quantity M of time units included between the $i^{th}$ AM group and the $(i+1)^{th}$ AM group by the quantity s of slots is not 0, and slots corresponding to time units that are at a same location of the first counting period and that are included between different AM groups may change. Therefore, the first communication apparatus may identify, by using the AM group, a service flow of a slot corresponding to each time unit in the first counting period.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group.

In this implementation, the M time units carrying the first data is the M time units between the $i^{th}$ AM group and the $(i+1)^{th}$ AM group. Because the quantity M of time units between two adjacent AM groups is not necessarily exactly divided by the quantity s of slots included in the first calendar, the first AM in the AM group is used to identify the slot, of the first calendar, that corresponds to the first time unit of the $1^{st}$ counting period in the M time units between the $i^{th}$ AM group and the $(i+1)^{th}$ AM group in this implementation. Therefore, a receiving end device determines slots corresponding to the M time units, and then determines, based on the mapping relationship, a service flow corresponding to each slot, to determine a service flow corresponding to data carried in the M time units.

According to an eighth aspect, an embodiment of this application provides a second communication apparatus. The second communication apparatus includes:

- a transceiver unit, configured to receive, in M time units, first data that is of a plurality of service flows and that is sent by a first communication apparatus by using a plurality of logical lanes, where M is an integer greater than or equal to 2; and
- a processing unit, configured to: determine service flows corresponding to data separately carried in the M time units.

There is a mapping relationship between the plurality of service flows and a slot of a first calendar, and the first calendar includes s slots.

The M time units include N first counting periods and at least one second counting period, s is an integer greater than or equal to 2, and N is an integer greater than or equal to 1.

The first counting period includes s time units, each time unit of the first counting period corresponds to one slot of the first calendar, and different time units of a same first counting period correspond to different slots of the first calendar.

The second counting period includes only a part of the s time units, each time unit of the second counting period corresponds to one slot of the first calendar, and different time units of a same second counting period correspond to different slots of the first calendar.

In a possible implementation, the transceiver unit is further configured to:

- receive an $i^{th}$ AM group sent by the first communication apparatus, where i is an integer greater than or equal to 1; and
- receive an $(i+1)^{th}$ AM group sent by the first communication apparatus.

The $i^{th}$ AM group and the $(i+1)^{th}$ AM group are used to align the plurality of logical lanes, and a reception time interval between receiving the $i^{th}$ AM group by the transceiver unit from the first communication apparatus and receiving the $(i+1)^{th}$ AM group by the transceiver unit from the first communication apparatus is the M time units. In other words, the M time units carrying the first data received by the second communication apparatus is the M time units between the $i^{th}$ AM group and the $(i+1)^{th}$ AM group.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

In another possible implementation, if a remainder obtained by dividing M by s is r, the second counting period includes r time units, and r is an integer greater than or equal to 1 and less than s.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, the processing unit is specifically configured to: determine slots, of the first calendar, separately corresponding to the M time units; and determine, based on the slots, of the first calendar, separately corresponding to the M time units, the service flows corresponding to data separately carried in the M time units. This implementation shows a specific process in which the second communication apparatus determines the service flows corresponding to the data separately carried in the M time units.

In another possible implementation, the $i^{th}$ AM group indicates service flows separately corresponding to the slots of the first calendar, and the processing unit is specifically configured to:

determine, based on the $i^{th}$ AM group and the slots, of the first calendar, separately corresponding to the M time units, the service flows corresponding to data separately carried in the M time units between the $i^{th}$ AM group and the $(i+1)^{th}$ AM group.

In this possible implementation, the second communication apparatus first determines a slot corresponding to each time unit, and then determines, based on the mapping relationship, the service flow corresponding to the data carried in each time unit.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group, and the processing unit is specifically configured to:

determine, based on the first AM in the $i^{th}$ AM group, the slots, of the first calendar, separately corresponding to the M time units between the $i^{th}$ AM group and the $(i+1)^{th}$ AM group.

In this possible implementation, the second communication apparatus determines, based on the first AM in the $i^{th}$ AM group, the slot corresponding to the first time unit of the $1^{st}$ counting period in the M time units between the $i^{th}$ AM group and the $(i+1)^{th}$ AM group, and then determines, based on the slot corresponding to the first time unit, the slot corresponding to each time unit in the first counting period.

According to a ninth aspect, an embodiment of this application provides a first communication apparatus. The first communication apparatus includes a processor, configured to implement the method in any one of the first aspect and/or the possible implementations of the first aspect. The first communication apparatus may further include a memory. In an embodiment, the memory is configured to store instructions. When executing the instructions stored in the memory, the processor may implement the method in any one of the first aspect and/or the possible implementations of the first aspect. The first communication apparatus may further include a communication interface. The communication interface is used by the first communication apparatus to communicate with another device. For example, the communication interface may be a transceiver, a circuit, a bus, a module, a pin, or another type of communication interface.

According to a tenth aspect, an embodiment of this application provides a second communication apparatus. The second communication apparatus includes a processor, configured to implement the method in any one of the second aspect and/or the possible implementations of the second aspect. The second communication apparatus may further include a memory. In an embodiment, the memory is configured to store instructions. When executing the instructions stored in the memory, the processor may implement the method in any one of the second aspect and/or the possible implementations of the second aspect. The second communication apparatus may further include a communication interface. The communication interface is used by the second communication apparatus to communicate with another device. For example, the communication interface may be a transceiver, a circuit, a bus, a module, a pin, or another type of communication interface.

According to an eleventh aspect, an embodiment of this application provides a data transmission system. The data transmission system includes the first communication apparatus in the fifth aspect and the second communication apparatus in the sixth aspect. Alternatively, the data transmission system includes the first communication apparatus in the seventh aspect and the second communication apparatus in the eighth aspect.

According to a twelfth aspect, an embodiment of this application provides a computer-readable storage medium. The computer-readable storage medium stores computer instructions, and when the computer instructions are run on a computer, the computer is enabled to perform the method in any one of the aspects and the possible implementations of the aspects.

According to a thirteenth aspect, an embodiment of this application provides a chip, including a processor. The processor is configured to perform the method in any one of the aspects and the possible implementations of the aspects.

In an embodiment, the chip further includes a memory. The memory is coupled to the processor.

Further, in an embodiment, the chip further includes a communication interface.

According to a fourteenth aspect, an embodiment of this application provides a computer program product. The computer program product includes computer program code. When the computer program code is run on a computer, the computer is enabled to perform the method in any one of the aspects and the possible designs of the aspects.

DESCRIPTION OF EMBODIMENTS

Embodiments of this application provide a data transmission method and a related communication apparatus, to reduce a data transmission delay, and improve data transmission performance.

Figure 1:
FIG. 1 is a diagram of a system architecture according to an embodiment of this application.

Development of a network imposes higher requirements on network traffic. For example, there are currently 100G (100,000 megabits per second), 200G (200,000 megabits per second), and 400G (400,000 megabits per second) Ethernet technologies. Development of the network imposes higher requirements on an Ethernet speed. FIG. 1 is a schematic diagram of a system architecture. A first communication apparatus and a second communication apparatus are connected by using several physical lanes, and parallel transmission is performed by using a plurality of physical lanes, to improve an Ethernet speed. For example, the physical lane may be a high-speed bus, for example, a copper wire or an optical fiber. Therefore, the first communication apparatus and the second communication apparatus may be electrically interconnected by using a copper wire. For example, for the 200G Ethernet technology, the first communication apparatus and the second communication apparatus may be connected by using eight physical lanes, four physical lanes, two physical lanes, or one physical lane. For another example, for the 400G Ethernet technology, the first communication apparatus and the second communication apparatus may be connected by using 16 physical lanes, eight physical lanes, four physical lanes, two physical lanes, or one physical lane. For still another example, for the 100G Ethernet technology, the first communication apparatus and the second communication apparatus are connected by using four physical lanes, two physical lanes, or one physical lane.

It may be understood that the first communication apparatus and the second communication apparatus may be a chip, a unit with receiving and sending functions, or a physical device. If the first communication apparatus sends data, the second communication apparatus receives the data. If the second communication apparatus sends data, the first communication apparatus receives the data. A transmission physical lane of the first communication apparatus one-to-one corresponds to a reception physical lane of the second communication apparatus. A transmission physical lane of the second communication apparatus one-to-one corresponds to a reception physical lane of the first communication apparatus. This embodiment of this application is described by using an example in which the first communication apparatus is a transmitting end device and the second communication apparatus is a receiving end device.

There is a mapping relationship between the physical lane and a logical lane in the first communication apparatus and the second communication apparatus. For example, one physical lane corresponds to one logical lane, one physical lane corresponds to two logical lanes, or one physical lane corresponds to four logical lanes. In other words, one physical lane may carry data of one or more logical lanes.

In addition, IEEE 802.3 defines different quantities of logical lanes for Ethernet technologies at different speeds. For example, a quantity of logical lanes in the 100G Ethernet technology is 4. For another example, a quantity of logical lanes in the 200G Ethernet technology is 8. For still another example, a quantity of logical lanes in the 400G Ethernet technology is 16.

In this embodiment of this application, quantities of logical lanes defined by Ethernet technologies at different speeds may be consistent with or different from quantities of logical lanes defined by IEEE 802.3 for Ethernet technologies at different speeds. For example, IEEE 802.3 defines 16 logical lanes for the 400G Ethernet technology, and each logical lane supports a 25G bandwidth. However, this application may define four logical lanes for the 400G Ethernet technology, and each logical lane supports a 100G bandwidth.

It should be noted that the logical lane may be a physical coding sublayer (PCS) lane or a forward error correction (FEC) lane. For example, for a 200G/400G Ethernet interface, a logical lane may be referred to as a PCS lane or an FEC lane. For another example, for a 100G Ethernet interface, a logical lane may be referred to as an FEC lane. Because the PCS lane and the FEC lane are usually distributed inside an implementation unit, and are usually referred to as logical lanes for distinguishing from a physical medium access (PMA) sublayer lane. In this application, the PCS lane and the FEC lane are also referred to as logical lanes.

When the first communication apparatus and the second communication apparatus transmit data by using a plurality of logical lanes, to ensure that the second communication apparatus can implement locking and alignment of the logical lanes, IEEE 802.3 further designs an alignment marker (AM) to identify each logical lane.

Figure 2:
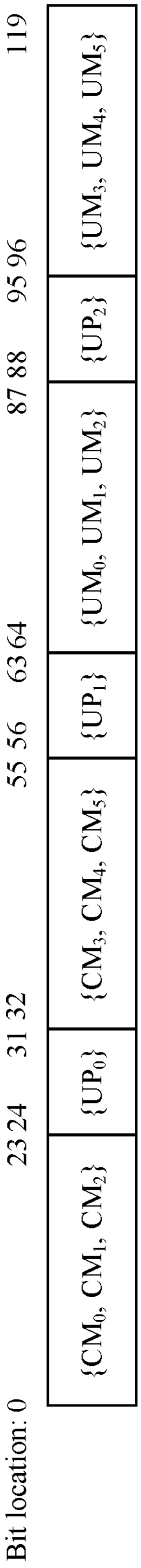
FIG. 2 is an AM format of 200G/400G Ethernet.
Figure 3:
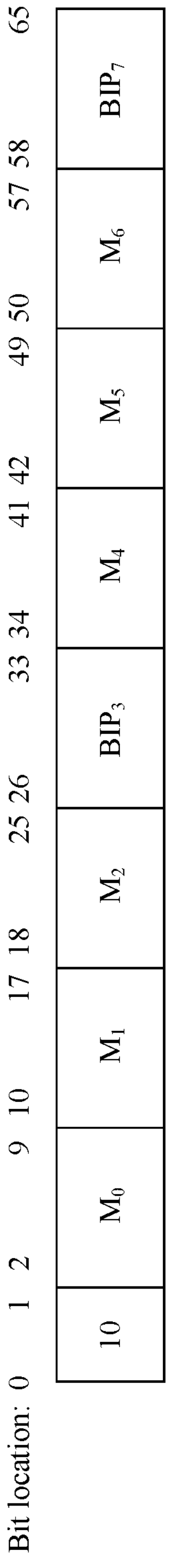
FIG. 3 is an AM format of 40G/100G Ethernet.

The AM has a specific format. The 200G/400G Ethernet technology is used as an example. An AM format is shown in FIG. 2. $CM_0$ to $CM_5$ in a common marker (CM) are common markers of a plurality of logical lanes, $UM_0$ to $UM_5$ in a unique marker (UM) are used to uniquely identify a logical lane, and $UP_0$, $UP_1$, and $UP_2$ in unique padding (UP) are padding bits. In other words, $CM_0$, $CM_1$, $CM_2$, $CM_3$, $CM_4$, and $CM_5$ in an AM of each logical lane are the same, and $UM_0$, $UM_1$, $UM_2$, $UM_3$, $UM_4$, $UM_5$, $UP_0$, $UP_1$, and $UP_2$ of any two logical lanes are different. The 100G/40G Ethernet technology is used as another example. An AM format is shown in FIG. 3. M in $M_0$, $M_1$, $M_2$, $M_4$, $M_5$, and $M_6$ indicates a marker, BIP in $BIP_3$ and $BIP_7$ is bit-interleaved parity, and $BIP_3$ or $BIP_7$ may also be a padding field.

An AM format in another Ethernet technology at another speed is similar to or different from the AM format in the 200G Ethernet technology and the AM format in the 400G Ethernet technology. To avoid repetition, examples are not enumerated one by one herein.

The AM one-to-one corresponds to the logical lane. The 200G Ethernet technology is used as an example. The first communication apparatus and the second communication apparatus each include eight logical lanes, and an AM of each logical lane is shown in Table 1. In Table 1, one row represents an AM of one lane. The second communication apparatus may lock the logical lane in a plurality of manners. For example, in IEEE 802.3, the second communication apparatus receives an AM, and matches $CM_0$ to $CM_5$ in the AM with $CM_0$ to $CM_5$ in the AM in Table 1. $CM_0$ to $CM_5$ have 48 bits in total, and may be divided into 12 nibbles (a nibble is 4 consecutive binary bits). When a quantity of nibbles that are mismatched between $CM_0$ to $CM_5$ in the second communication apparatus and $CM_0$ to CM in the AM in Table 1 is less than or equal to 3, the second communication apparatus may lock one logical lane. Then, the second communication apparatus identifies a lane number of the logical lane based on received $UM_0$ to $UM_5$.

TABLE 1

| Logical lane number | $\{CM_0, CM_1, CM_2, UP_0, CM_3, CM_4, CM_5, UP_1, UM_0, UM_1, UM_2, UP_2, UM_3, UM_4, UM_5\}$ |
|---|---|
| 0 | 0x9A, 0x4A, 0x26, 0x05, 0x65, 0xB5, 0xD9, 0xD6, 0xB3, 0xC0, 0x8C, 0x29, 0x4C, 0x3F, 0x73 |
| 1 | 0x9A, 0x4A, 0x26, 0x04, 0x65, 0xB5, 0xD9, 0x67, 0x5A, 0xDE, 0x7E, 0x98, 0xA5, 0x21, 0x81 |
| 2 | 0x9A, 0x4A, 0x26, 0x46, 0x65, 0xB5, 0xD9, 0xFE, 0x3E, 0xF3, 0x56, 0x01, 0xC1, 0x0C, 0xA9 |
| 3 | 0x9A, 0x4A, 0x26, 0x5A, 0x65, 0xB5, 0xD9, 0x84, 0x86, 0x80, 0xD0, 0x7B, 0x79, 0x7F, 0x2F |
| 4 | 0x9A, 0x4A, 0x26, 0xE1, 0x65, 0xB5, 0xD9, 0x19, 0x2A, 0x51, 0xF2, 0xE6, 0xD5, 0xAE, 0x0D |
| 5 | 0x9A, 0x4A, 0x26, 0xF2, 0x65, 0xB5, 0xD9, 0x4E, 0x12, 0x4F, 0xD1, 0xB1, 0xED, 0xB0, 0x2E |
| 6 | 0x9A, 0x4A, 0x26, 0x3D, 0x65, 0xB5, 0xD9, 0xEE, 0x42, 0x9C, 0xA1, 0x11, 0xBD, 0x63, 0x5E |
| 7 | 0x9A, 0x4A, 0x26, 0x22, 0x5, 0xB5, 0xD9, 0x32, 0xD6, 0x76, 0x5B, 0xCD, 0x29, 0x89, 0xA4 |

The AM format is an AM format defined by IEEE 802.3 for Ethernet technologies at different speeds.

If the logical lane in this embodiment of this application is a logical lane defined by IEEE 802.3 for Ethernet technologies at different speeds, a size and a format of an AM corresponding to each logical lane are the same as a size and a format of an AM defined in IEEE 802.3 described above.

If a quantity of logical lanes that is newly defined in this embodiment of this application for Ethernet technologies at different speeds is different from a quantity of logical lanes defined by IEEE 802.3 for Ethernet technologies at different speeds, a size and a format of an AM corresponding to each logical lane may be the same as or different from a size and a format of an AM defined in IEEE 802.3 described above.

For example, a quantity of logical lanes defined by IEEE 802.3 for the 400G Ethernet technology is 16, that is, each logical lane supports a 25G bandwidth, and a size of an AM corresponding to each logical lane is 120 bits, namely, a size and a format of the AM shown in FIG. 2.

If a quantity of logical lanes that is newly defined in this embodiment of this application for the 400G Ethernet technology is 4, a size of an AM corresponding to each logical lane is 120 bits, that is, each logical lane supports a 100G bandwidth, namely, a size and a format of the AM shown in FIG. 2.

If the 400G Ethernet technology supports only a logical lane with a 25G bandwidth, and a quantity of logical lanes defined for the 400G Ethernet technology in this application is 4, logical lanes in each newly defined 100G logical lane further need to be divided. In other words, four 25G logical lanes in the newly defined 100G logical lane may further be divided, to adapt to the 400G Ethernet technology. Therefore, a size of an AM corresponding to the newly defined 100G logical lane may be 4×120 bits, to facilitate alignment of four 25G logical lanes in the 100G logical lane that are subsequently further divided. Specifically, the format of the AM of the newly defined 100G logical lane needs to be configured based on a subsequent data distribution granularity and a distribution rule of the four 25G logical lanes, and the configured AM with 4×120 bits includes padding bits such as $UP_1$ and $UP_2$. Related functions of $UP_1$ and $UP_2$ are similar to functions of $UP_1$ and $UP_2$ in the AM shown in FIG. 2. Details are not described herein again. It can be learned that, for the quantities of logical lanes newly defined for Ethernet technologies at different speeds, a size and a format of an AM corresponding to each newly defined logical lane need to be determined based on supporting capabilities of logical lanes with different bandwidths in Ethernet technologies at different speeds.

The foregoing is described by using only the 400G Ethernet technology as an example. For example, 40G, 100G, and 200G Ethernet technologies are also similar. Details are not described herein again.

In this embodiment of this application, a quantity of AMs included in each AM group is equal to a quantity of logical lanes. Whether quantities of logical lanes of Ethernet technologies at different speeds are defined by IEEE 802.3, or defined in a new manner, a quantity of AMs included in each AM group is the same as a quantity of logical lanes. For a format and a size of an AM, refer to the foregoing related descriptions.

Figure 4:
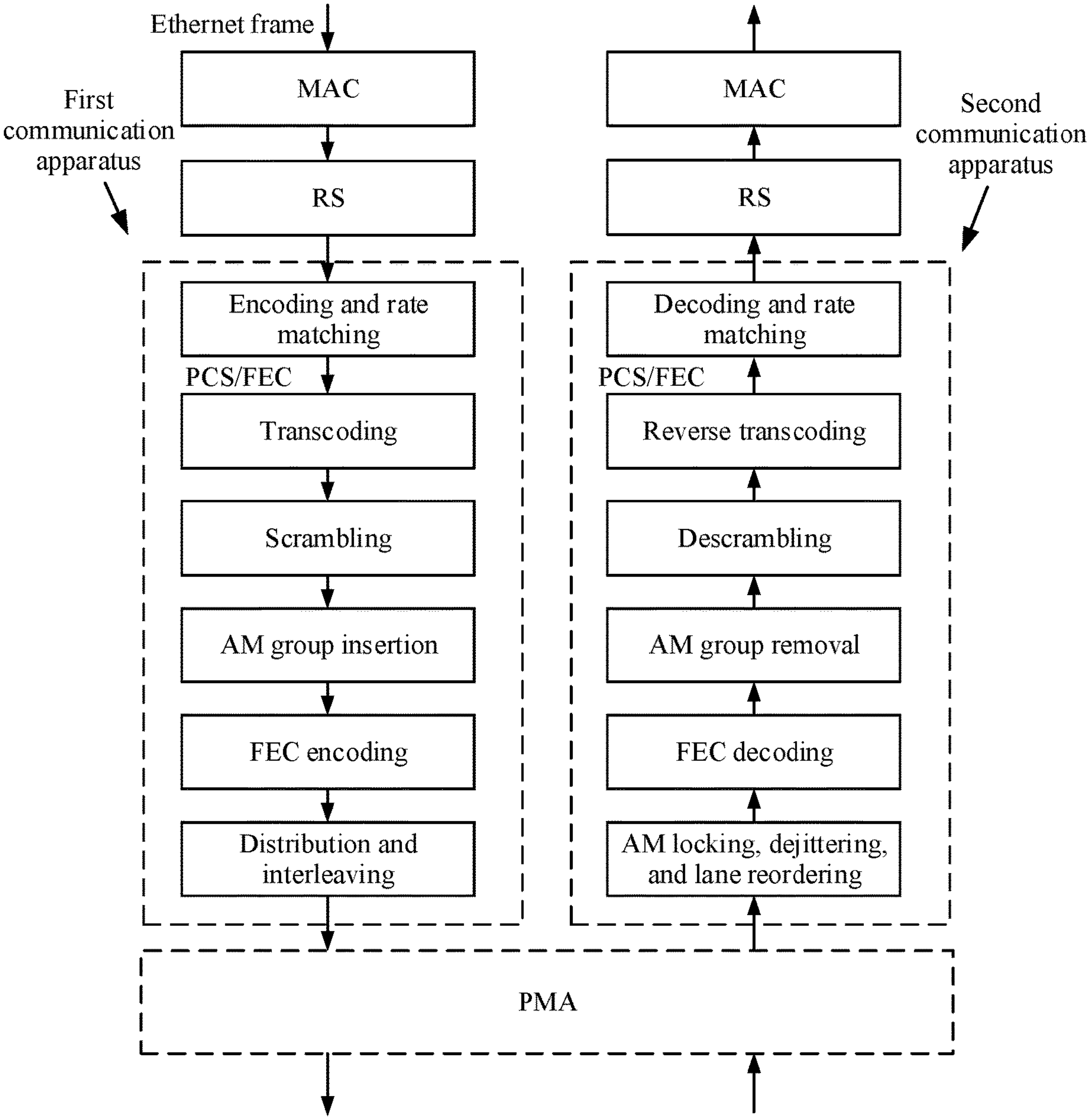
FIG. 4 is a diagram of a data processing process between a first communication apparatus and a second communication apparatus according to an embodiment of this application.

The following describes a data processing process between a first communication apparatus and a second communication apparatus with reference to FIG. 4.

The 200G Ethernet technology is used as an example in FIG. 4. As shown in FIG. 4, the first communication apparatus receives an Ethernet frame from a data link layer, where the Ethernet frame arrives at a media access control (MAC) layer and a reconciliation sublayer (RS); and checks the Ethernet frame at the MAC layer, and sends checked bit data to a PCS sublayer through a specific media independent interface (x-speed media independent interface, xMII) by using the RS sublayer. The PCS sublayer receives related bits from the xMII, and performs encoding and rate matching based on a specific bit block of a first size. After encoding and rate matching, a block of the bit block of a first size is transcoded, to obtain a serial block stream of a bit block of a second size. The bit block of a second size is scrambled, and an AM group is inserted into the bit block of a second size, where the AM group includes several bit blocks of a second size. In this embodiment of this application, the first communication apparatus periodically inserts an AM group into a serial data stream, so that a counting period is divided by using the AM group as a boundary, and a time unit included in the counting period has a mapping relationship with a slot of a first calendar. Therefore, the first calendar is designed based on the AM group, there is a mapping relationship between a slot included in the first calendar and a plurality of service flows, and the plurality of service flows are mapped to corresponding slots, to implement sub-rate allocation, and implement an end-to-end cut-through forwarding mechanism.

After the AM group is inserted, FEC coding is performed on a plurality of serial bit blocks of a second size to add check bits. Then, the bit blocks of a second size are distributed to several PCS lanes or FEC lanes based on a specific quantity of bits through distribution and interleaving, and each AM included in the AM group is distributed in a corresponding PCS lane or FEC lane. Bits in the PCS lane or FEC lane may be sent to the second communication apparatus by using a PMA lane. The physical lane may be a PMA lane.

The second communication apparatus receives, by using a PMD and the PMA lane, the bits sent by the first communication device, locks a lane based on an AM in each PCS lane or FEC lane, and reorders the lanes, to obtain a serial code block stream. Then, the second communication apparatus performs FEC decoding on the serial code block stream, to remove an AM group from the serial code block stream, and performs descrambling and reverse transcoding on the serial code block stream from which the AM group is removed, to obtain the serial code block stream of the bit block of a first size. The second communication apparatus performs decoding and rate matching on the serial code block stream of the bit block of a first size, and sends data to the RS sublayer and the MAC layer, and the data is transmitted to the data link layer by using the MAC layer.

It may be understood that, for different Ethernet technologies, the bit block of a first size is different from the bit block of a second size. For example, for the 200G/400G Ethernet technology, the bit block of a first size is 64B (bit)/66B, and the bit block of a second size is 256B/257B. The AM group includes four or eight 257B code blocks. For another example, for the 100G Ethernet technology, the bit block of a first size is 64B/66B, and the bit block of a second size is 256B/257B. The AM group includes five 257B code blocks.

It should be noted that, for ease of understanding, FIG. 4 describes a processing procedure of an Ethernet interface. Specifically, another processing procedure may be added during application, or the foregoing processing procedure is not included. For example, for 40G and 100G Ethernet interfaces, FEC encoding and FEC decoding may not be performed. Processing procedures vary with different Ethernet technologies. For example, for 200G and 400G Ethernet technologies, FEC encoding and FEC decoding may be performed, and an FEC sublayer is located inside the PCS sublayer. For 40G and 100G Ethernet technologies, FEC encoding and FEC decoding may be or may not be performed. When FEC encoding and FEC decoding may be performed in 40G and 100G Ethernet technologies, an FEC sublayer is located between the PCS sublayer and the PMA sublayer as an independent sublayer.

Figure 5:
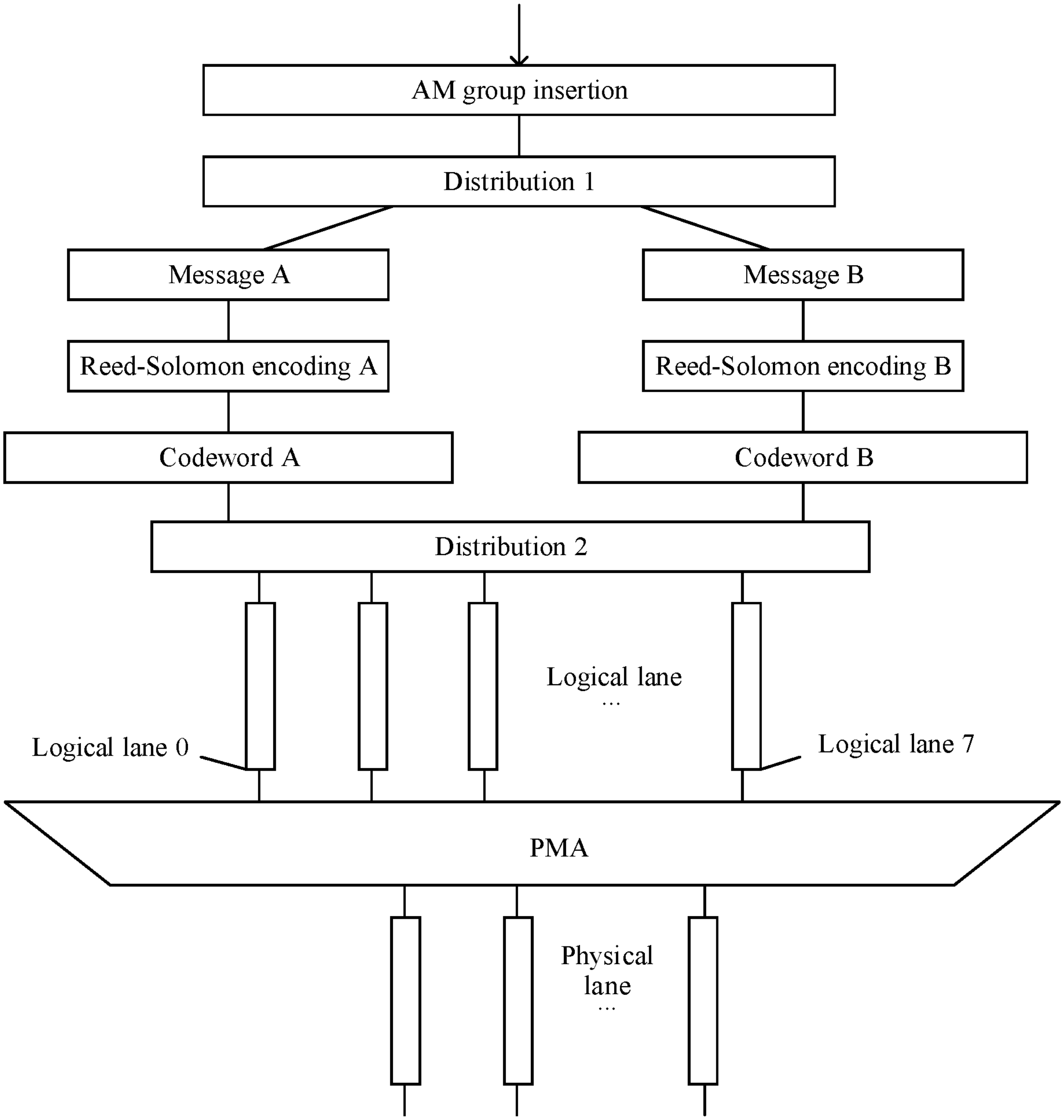
FIG. 5 is a diagram in which a first communication apparatus distributes data by using a plurality of lanes according to an embodiment of this application.
Figure 6:
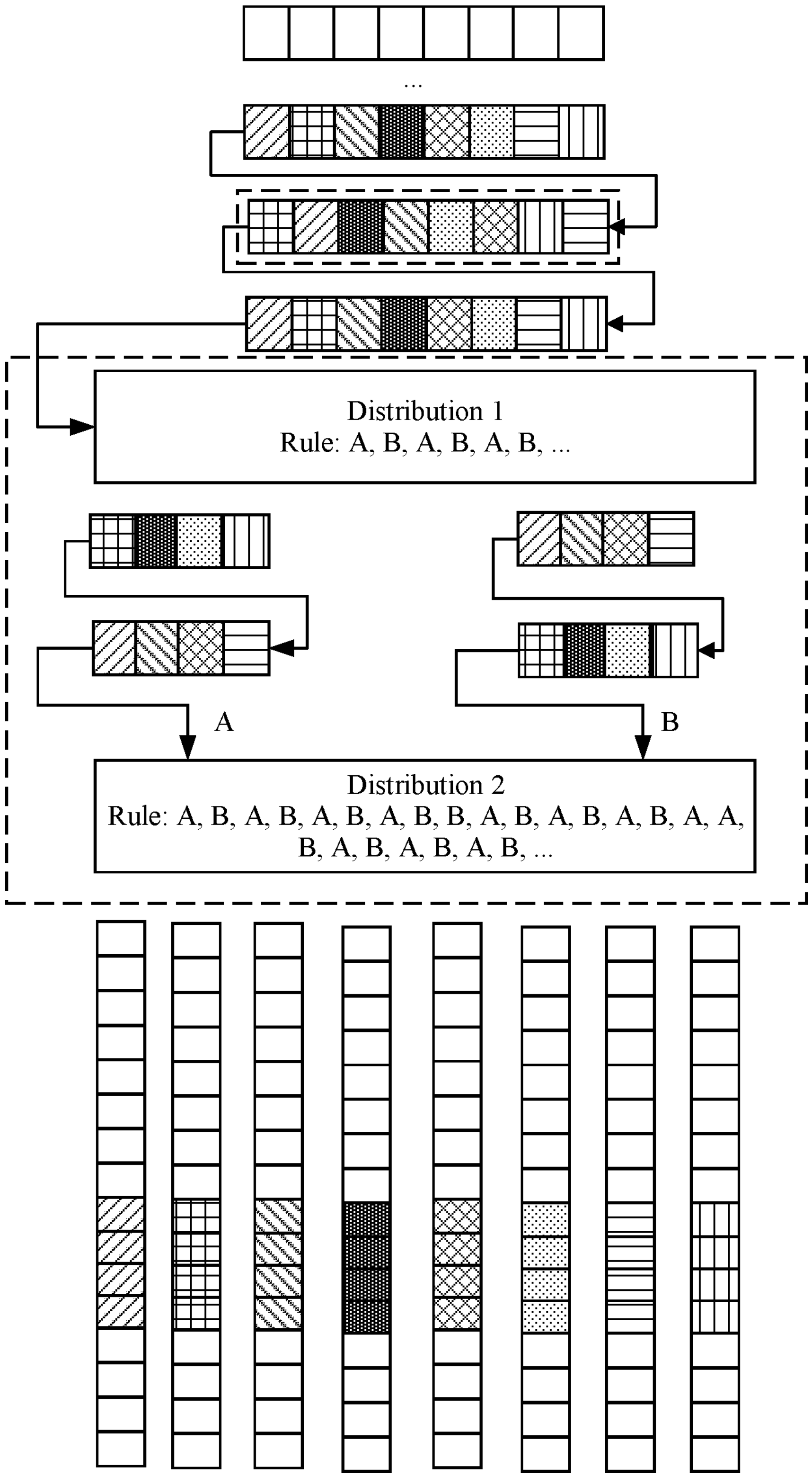
FIG. 6 is another diagram in which a first communication apparatus distributes data by using a plurality of lanes according to an embodiment of this application.
Figure 7:
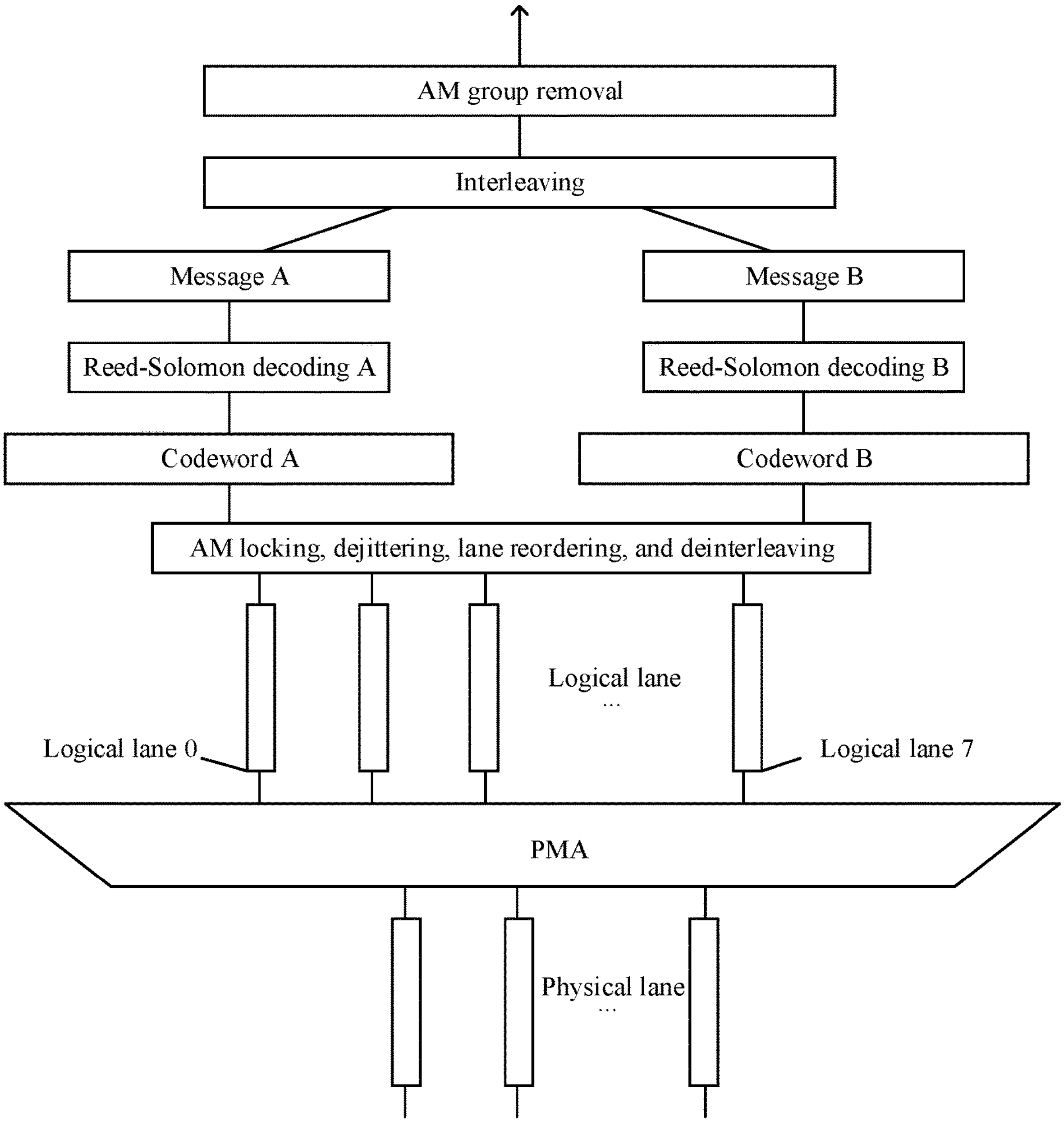
FIG. 7 is a diagram in which a second communication apparatus receives data by using a plurality of lanes according to an embodiment of this application.

The following describes in detail a data transmission process between a first communication apparatus and a second communication apparatus by using a plurality of lanes with reference to FIG. 5 to FIG. 7.

FIG. 5 is a schematic diagram in which a first communication apparatus distributes data by using a plurality of lanes. A procedure of distributing 200G data is used as an example. As shown in FIG. 5, after inserting an AM group into to-be-sent serial data, the first communication apparatus distributes a serial data stream to eight logical lanes in two distribution processes. The to-be-sent data inserted into the AM group is distributed to two parallel data streams through distribution 1, and FEC encoding is performed, to obtain two parallel data streams after FEC encoding (the first communication apparatus can obtain several parallel data streams by using several FEC codewords). As shown in FIG. 5, two parallel data streams A and B after FEC encoding may be obtained. Data of the two parallel data streams A and B after FEC encoding may be distributed to eight logical lanes through distribution 2, and then the data is sent to the second communication apparatus by using the physical lane.

Similarly, the 200G Ethernet technology is used as an example to describe in detail the two distribution processes. As shown in FIG. 6, first, the two parallel data streams A and B are formed according to a rule of distribution 1 (that is, one encoding symbol is first selected and distributed to the data stream A, then one encoding symbol is selected and distributed to the data stream B, and the rest can be deduced by analogy, where the distribution process may be represented by: A, B, A, B . . . ) by using the serial data stream inserted into the AM group. Then, the two parallel data stream A and B are distributed to eight logical lanes according to a rule of distribution 2 (that is, an encoding symbol 1 of the data stream A is distributed to a logical lane 0, an encoding symbol 0 of the data stream B is distributed to a logical lane 1, the encoding symbol 1 of the data stream A is distributed to a logical lane 2, an encoding symbol 1 of the data stream B is distributed to a logical lane 3, an encoding symbol 2 of the data stream A is distributed to a logical lane 4, an encoding symbol 2 of the data stream B is distributed to a logical lane 5, an encoding symbol 3 of the data stream A is distributed to a logical lane 6, an encoding symbol 4 of the data stream B is distributed to a logical lane 7, and this distribution process may be represented by: A, B, A, B, A, B, A, B; a subsequent distribution process is: B, A, B, A, B, A, B, A; a subsequent distribution process is: A, B, A, B, A, B, A, B; and the rest can be deduced by analogy). It should be understood that the distribution manner of distribution 2 is used for improving a capability of avoiding burst errors.

The encoding symbol is a data unit used by the first communication apparatus to distribute data. For example, in the 400G Ethernet technology defined by IEEE 802.3, the encoding symbol may be 10 bits, 12 bits, or the like. In addition, in this embodiment of this application, in the 200G and 400G Ethernet technologies, the encoding symbol may be 257 bits. For details, refer to related examples in FIG. 12B, FIG. 13B, and FIG. 14B.

Therefore, to ensure that an AM corresponding to each logical lane appears completely on each logical lane in an expected mode, before the AM group is inserted into the serial data stream, the AM group needs to be constructed based on an AM format of the logical lane and a specific distribution rule, so that the second communication apparatus receives an AM in a correct format, to lock and align the logic lanes.

For example, if a quantity of logical lanes that is newly defined in this embodiment of this application for the 400G Ethernet technology is 4, a size of an AM corresponding to each logical lane is 120 bits, that is, each logical lane supports a 100G bandwidth, namely, a size and a format of the AM shown in FIG. 2. If a distribution granularity of the four newly defined 100G logical lanes is a distribution granularity of 257 bits, the first communication apparatus may configure the 120-bit AM corresponding to each 100G logical lane as one 257-bit code block. For the four 100G logical lanes, one AM group includes four 257-bit code blocks. Then, the first communication apparatus inserts the AM group (including four 257-bit code blocks) into the serial data stream.

For example, if the 400G Ethernet technology supports only a logical lane with a 25G bandwidth, and a quantity of logical lanes defined for the 400G Ethernet technology in this application is 4, logical lanes in each newly defined 100G logical lane further need to be divided. In other words, four 25G logical lanes in the newly defined 100G logical lane may further be divided, to adapt to the 400G Ethernet technology. Therefore, a size of an AM corresponding to the newly defined 100G logical lane may be 4×120 bits, to facilitate alignment of four 25G logical lanes in the 100G logical lane that are subsequently further divided. If a distribution granularity of the four newly defined 100G logical lanes is a distribution granularity of 257 bits, the first communication apparatus may configure the 4×120-bit AM of each 100G logical lane as two 257-bit code blocks. For the four 100G logical lanes, one AM group includes eight 257-bit code blocks. Then, the first communication apparatus inserts the AM group (including eight 257-bit code blocks) into the serial data stream.

FIG. 7 is a schematic diagram in which a second communication apparatus receives data by using a plurality of lanes. Similarly, a procedure of distributing 200G data is used as an example. As shown in FIG. 7, the second communication apparatus receives data from the first communication apparatus by using a physical lane and a logical lane, and performs processing such as AM locking, dejittering, and logical lane reordering, and deinterleaving on the logical lane, to form two parallel data streams A and B. The two parallel data streams A and B are decoded and interleaved, to obtain serial data including an AM group. The AM group is further removed from the data, to obtain data actually transmitted by the first communication apparatus.

In FIG. 5 to FIG. 7, only the 200G Ethernet technology is used as an example. Data processing processes in the 40G, 50G, 100G, and 400G Ethernet technologies are similar, and details are not described herein again.

Currently, in a FlexE technology, a FlexE Shim layer is inserted into a standard Ethernet architecture, to implement decoupling of a MAC sub-rate from an underlying PHY layer, so as to meet a requirement that a data transmission rate of an ingress port of a switch is consistent with a data transmission rate of an egress port of the switch. However, the FlexE Shim brings specific delay overheads for data transmission. Consequently, a data transmission delay is large, and data transmission performance is affected.

This application provides a data transmission method. A first calendar is designed based on an AM group, there is a mapping relationship between a slot included in the first calendar and a plurality of service flows, and the plurality of service flows are mapped to corresponding slots, to implement sub-rate allocation. Therefore, this implements decoupling between a MAC sub-rate and an underlying PHY layer, implements consistency between a data transmission rate of an ingress port of a transmitting end device and a data transmission rate of an egress port without introducing a FlexE Shim, implements an end-to-end cut-through forwarding mechanism, reduces a data transmission delay, and improves data transmission performance.

Figure 8A:
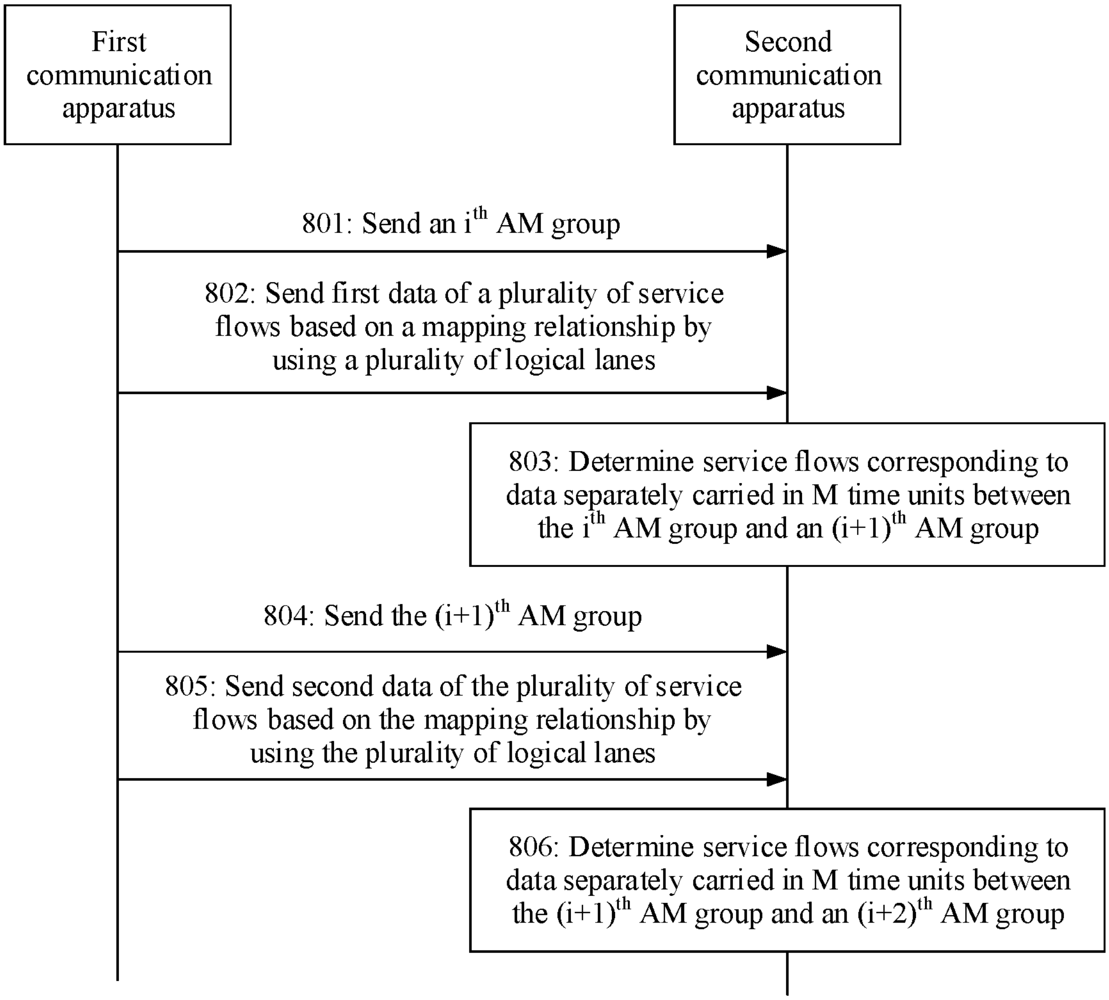
FIG. 8A is a diagram of an embodiment of a data transmission method according to an embodiment of this application.

FIG. 8A is a schematic diagram of an embodiment of a data transmission method according to an embodiment of this application. In FIG. 8A, the data transmission method includes the following operations.

801: A first communication apparatus sends an $i^{th}$ AM group to a second communication apparatus.

The $i^{th}$ AM group is used to align a plurality of logical lanes, and i is an integer greater than or equal to 1. The $i^{th}$ AM group includes a plurality of AMs, and the plurality of logical lanes one-to-one correspond to the plurality of AMs.

For example, if the plurality of logical lanes include eight logical lanes, the $i^{th}$ AM group includes eight AMs, each AM corresponds to one logical lane, and the eight AMs are used to align the eight logical lanes.

A quantity of code blocks included in each AM group may be configured according to a data distribution rule and a distribution granularity. For details, refer to the foregoing descriptions of the format and size of the AM and the AM group.

In this embodiment, a manner of defining a logical lane may be a logical lane defined by IEEE 802.3 for Ethernet technologies at different speeds, or may be a newly defined logical lane of Ethernet technologies at different speeds.

1. The $i^{th}$ AM group is described based on the logical lane defined by IEEE 802.3 for Ethernet technologies at different speeds.

For example, in the 200G Ethernet technology defined by IEEE 802.3, the $i^{th}$ AM group includes four 257-bit code blocks, that is, the $i^{th}$ AM group includes eight AMs used to align eight logical lanes in the 200G Ethernet technology.

For example, in the 400G Ethernet technology defined by IEEE 802.3, the $i^{th}$ AM group includes eight 257-bit code blocks. The $i^{th}$ AM group includes 16 AMs used to align 16 logical lanes in the 400G Ethernet technology.

2. The $i^{th}$ AM group is described based on the newly defined logical lane of Ethernet technologies at different speeds.

For example, the 400G Ethernet technology includes four newly defined logical lanes, and the $i^{th}$ AM group includes four 257-bit code blocks, that is, the $i^{th}$ AM group includes four AMs used to align four newly defined logical lanes in the 400G Ethernet technology. Alternatively, the $i^{th}$ AM group includes eight 257-bit code blocks, that is, the $i^{th}$ AM group includes four AMs used to align four newly defined logical lanes in the 400G Ethernet technology. For related descriptions of the size and the format of the AM corresponding to the newly defined logical lane and the quantity of code blocks included in the AM group, refer to the foregoing related descriptions. Details are not described herein again.

In this embodiment of this application, distribution of the code blocks in the AM group is similar to the distribution process described in FIG. 5 and FIG. 6. Refer to the foregoing related descriptions.

Figure 8B:
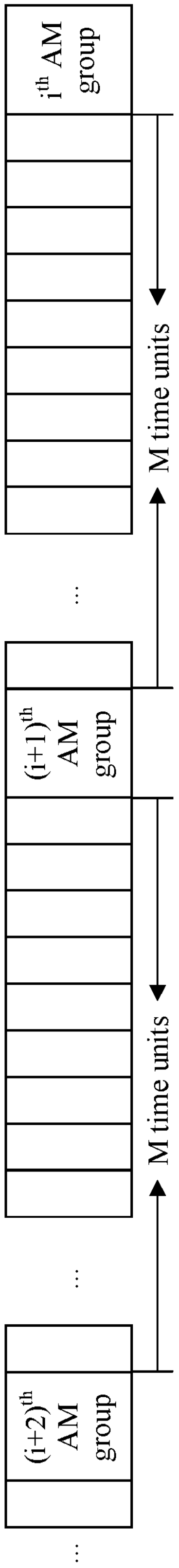
FIG. 8B is a diagram of a serial data stream of a first communication apparatus according to an embodiment of this application.

In some embodiments, as shown in FIG. 8B, that the first communication apparatus periodically inserts an AM group into a serial data stream may be performed in the process of inserting the AM group shown in FIG. 4. Duration of a period in which the AM group is inserted into the serial data stream is duration of M time units between two adjacent AM groups. Then, the first communication apparatus sends the $i^{th}$ AM group to a second communication apparatus. For a specific distribution manner, refer to related descriptions in FIG. 5 and FIG. 6.

For example, in the 200G Ethernet technology, the duration of the M time units between two adjacent AM groups is duration for sending 81920 257-bit code blocks. In the 400G Ethernet technology, the duration of the M time units between two adjacent AM groups is duration for sending 163840 257-bit code blocks.

802: The first communication apparatus sends first data of a plurality of service flows to the second communication apparatus based on a mapping relationship by using the plurality of logical lanes.

The first data is carried in M time units between the $i^{th}$ AM group and an $(i+1)^{th}$ AM group, M is an integer greater than or equal to 2, and the mapping relationship is a mapping relationship between a slot of a first calendar and the plurality of service flows.

The time unit is duration for sending one code block, duration for sending two code blocks, or other duration. This is not limited in this application. For example, the time unit is duration for sending one 257-bit code block.

The following describes the mapping relationship with reference to Example 1 to Example 4.

Example 1: In the 200G Ethernet technology, the plurality of service flows include a service flow 1 and a service flow 2. The service flow 1 occupies a 100G bandwidth, and the service flow 2 occupies a 100G bandwidth. To implement sub-rate allocation in the 200G Ethernet technology, so that the service flow 1 occupies a 100G bandwidth, and the service flow 2 occupies a 100G bandwidth, the first calendar includes eight slots: a slot 0 to a slot 7, and a bandwidth occupied by each slot is 25G. Then, the service flow 1 is mapped to the slot 0 to the slot 3, and the service flow 2 is mapped to the slot 4 to the slot 7. The mapping relationship may be represented as Table 2.

TABLE 2

| Service flow | Bandwidth | Slot of a first calendar |
|---|---|---|
| Service flow 1 | 100G | Slot 0, slot 1, slot 2, and slot 3 |
| Service flow 2 | 100G | Slot 4, slot 5, slot 6, and slot 7 |

It can be learned from Table 2 that the service flow 1 is mapped to the slot 0 to the slot 3, and the service flow 2 is mapped to the slot 4 to the slot 7, so that the first communication apparatus implements sub-rate allocation in the 200G Ethernet technology. Therefore, this implements consistency between a data transmission rate of an ingress port of the first communication apparatus and a data transmission rate of an egress port, implements an end-to-end cut-through forwarding mechanism, reduces a data transmission delay, and improves data transmission performance.

Example 2: In the 400G Ethernet technology, the plurality of service flows include a service flow 1, a service flow 2, and a service flow 3. The service flow 1 occupies a 100G bandwidth, the service flow 2 occupies a 100G bandwidth, and the service flow 3 occupies a 200G bandwidth. To implement sub-rate allocation in the 400G Ethernet technology, so that the service flow 1 occupies a 100G bandwidth, the service flow 2 occupies a 100G bandwidth, and the service flow 3 occupies a 200G bandwidth, in this embodiment, the first calendar includes 16 slots: a slot 0 to a slot 15, and a bandwidth occupied by each slot is 25G. Then, the service flow 1 is mapped to the slot 0 to the slot 3, the service flow 2 is mapped to the slot 4 to the slot 7, and the service flow 3 is mapped to the slot 8 to the slot 15. The mapping relationship may be represented as Table 3.

TABLE 3

| Service flow | Bandwidth | Slot of a first calendar |
|---|---|---|
| Service flow 1 | 100G | Slot 0, slot 1, slot 2, and slot 3 |
| Service flow 2 | 100G | Slot 4, slot 5, slot 6, and slot 7 |
| Service flow 3 | 200G | Slot 8, slot 9, slot 10, slot 11, slot 12, slot 13, slot 14, and slot 15 |

Example 3: In the 400G Ethernet technology, the plurality of service flows include a service flow 1, a service flow 2, and a service flow 3. The service flow 1 occupies a 100G bandwidth, the service flow 2 occupies a 100G bandwidth, and the service flow 3 occupies a 200G bandwidth. To implement sub-rate allocation in the 400G Ethernet technology, so that the service flow 1 occupies a 100G bandwidth, the service flow 2 occupies a 100G bandwidth, and the service flow 3 occupies a 200G bandwidth, the first calendar includes four slots: a slot 0 to a slot 3, and a bandwidth occupied by each slot is 100G. The service flow 1 is mapped to the slot 0, the service flow 2 is mapped to the slot 1, and the service flow 3 is mapped to the slot 2 and the slot 3. The mapping relationship may be represented as Table 4.

TABLE 4

| Service flow | Bandwidth | Slot of a first calendar |
|---|---|---|
| Service flow 1 | 100G | slot 0 |
| Service flow 2 | 100G | slot 1 |
| Service flow 3 | 200G | Slot 2 and slot 3 |

Example 4: In the 400G Ethernet technology, the plurality of service flows include a service flow 1 and a service flow 2. The service flow 1 and the service flow 2 each occupy a 200G bandwidth. To implement sub-rate allocation in the 400G Ethernet technology, so that the service flow 1 occupies a 200G bandwidth, and the service flow 2 occupies a 200G bandwidth, the first calendar includes two slots: a slot 0 and a slot 1, and a bandwidth occupied by each slot is 200G. The service flow 1 is mapped to the slot 0, and the service flow 2 is mapped to the slot 1. The mapping relationship may be represented as Table 5.

TABLE 5

| Service flow | Bandwidth | Slot of a first calendar |
|---|---|---|
| Service flow 1 | 200G | Slot 0 |
| Service flow 2 | 200G | Slot 1 |

It can be learned from Table 2 to Table 5 that the plurality of service flows are mapped to corresponding slots of the first calendar, to implement sub-rate allocation. Therefore, this implements consistency between a data transmission rate of an ingress port of the first communication apparatus and a data transmission rate of an egress port, implements an end-to-end cut-through forwarding mechanism, avoids traffic distribution imbalance caused by distributing a bandwidth in a steering mode or a splitting mode, avoids a bandwidth waste, reduces a data transmission delay, and improves data transmission performance.

The M time units between the $i^{th}$ AM group and the $(i+1)^{th}$ AM group includes N first counting periods, where N is an integer greater than or equal to 1, each first counting period includes s time units, and s is an integer greater than or equal to 2.

There are a plurality of manners of dividing the first counting period. The following shows two possible implementations. The first counting period in this embodiment of this application is also applicable to another division manner, and an example of the following division manner constitutes no limitation on this application.

Division manner 1: Divide the M time units between the $i^{th}$ AM group and the $(i+1)^{th}$ AM group by using the AM group as a boundary, to obtain the N first counting periods.

Figure 9A:
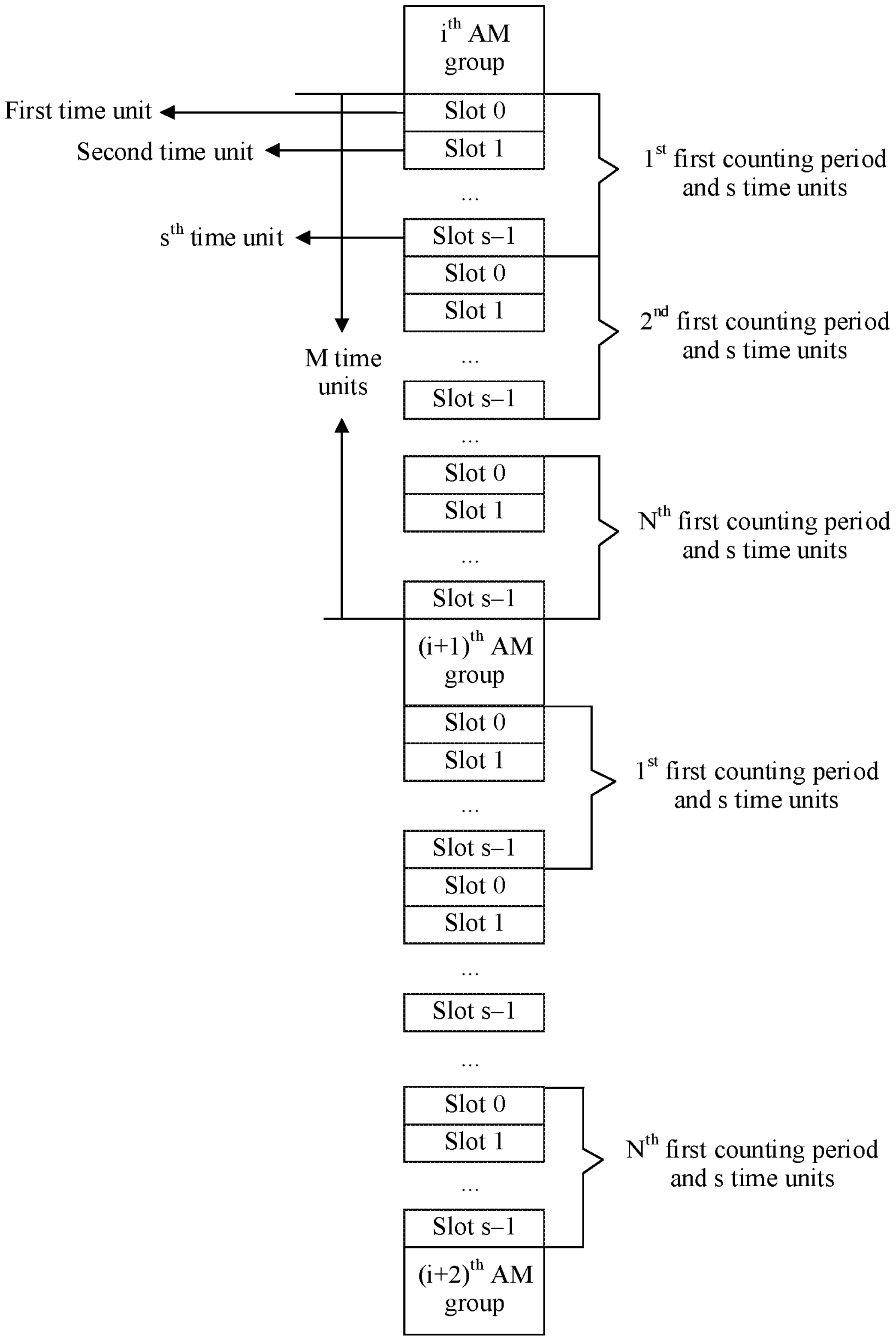
FIG. 9A is another diagram of a serial data stream of a first communication apparatus according to an embodiment of this application.

For example, as shown in FIG. 9A, the M time units between the $i^{th}$ AM group and the $(i+1)^{th}$ AM group include the N first counting periods. The N first counting periods are obtained by dividing the M time units between the $i^{th}$ AM group and the $(i+1)^{th}$ AM group by using the it AM group as a boundary. The following describes a sequence of time units in a counting period with reference to FIG. 9A. As shown in FIG. 9A, a $1^{st}$ first counting period includes s time units, and the s time units are: a first time unit, a second time unit, a third time unit, . . . , and a last time unit, namely, an $s^{th}$ time unit, in the $1^{st}$ first counting period in a sequence from right to left. A sequence of time units in another counting period is also similar, and is not described one by one herein again. In the division manner 1, the first time unit in the $1^{st}$ first counting period in the N first counting periods is continuous with a last time unit (a time unit included in the $i^{th}$ AM group is not shown in the figure) in the $i^{th}$ AM group.

The first calendar includes s slots, the N first counting periods include s time units, and the s time units one-to-one corresponds to the s slots. The s time units included in the first counting period may be separately mapped to corresponding slots in a sequence of the slots, or may not be separately mapped to corresponding slots in a sequence of the slots. This is not limited in this application. The following is described by using an example in which the s time units included in the first counting period may be separately mapped to corresponding slots in the sequence of the slots.

For example, as shown in FIG. 9A, the first time unit included in the $1^{st}$ first counting period corresponds to the slot 0, a second time unit corresponds to the slot 1, and the rest can be deduced by analogy. An $(s-1)^{th}$ time unit corresponds to a slot s−1.

The division manner 1 has the following two cases, which are separately described in the following:

Case 1: If a remainder obtained by dividing the quantity M of time units between the $i^{th}$ AM group and the $(i+1)^{th}$ AM group by the quantity s of time units included in the first counting period is 0, the first time unit of the $1^{st}$ first counting period in the N first counting periods is continuous with the last time unit of the $i^{th}$ AM group, and a last first counting period in the N first counting periods is continuous with a first time unit of the $(i+1)^{th}$ AM group.

For example, as shown in FIG. 9A, the M time units are included between the $i^{th}$ AM group and the $(i+1)^{th}$ AM group, M is evenly divided by s, and each first counting period includes s time units. The first time unit of the $1^{st}$ first counting period in the N first counting periods is continuous with the last time unit of the $i^{th}$ AM group, and an $N^{th}$ first counting period in the N first counting periods is continuous with the first time unit of the $(i+1)^{th}$ AM group.

Each time unit of the first counting period corresponds to one slot of the first calendar, and different time units of a same first counting period correspond to different slots of the first calendar.

It can be learned from FIG. 9A that each time unit of each first counting period has a corresponding slot. In the s time units included in the $1^{st}$ first counting period, the first time unit corresponds to the slot 0 of the first calendar, the second time unit corresponds to the slot 1 of the first calendar, and the rest can be deduced by analogy. An $s^{th}$ time unit corresponds to a slot s−1 of the first calendar. In other words, different time units of a same first counting period correspond to different slots.

Case 2: If a remainder obtained by dividing the quantity M of time units between the $i^{th}$ AM group and the $(i+1)^{th}$ AM group by the quantity s of time units included in the first counting period is r, r is an integer greater than or equal to 1 and less than s, the M time units between the $i^{th}$ AM group and the $(i+1)^{th}$ AM group further include one second counting period, and the second counting period includes only a part of the s time units, namely, including r time units.

A first time unit of the second counting period is continuous with a last time unit of the last first counting period in the N first counting periods, and a last time unit of the second counting period is continuous with the first time unit of the $(i+1)^{th}$ AM group.

Figure 9B:
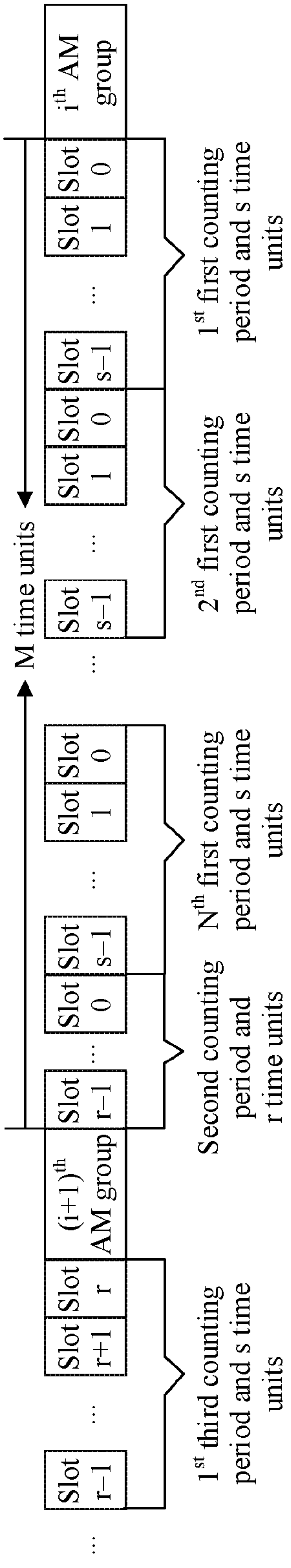
FIG. 9B is another diagram of a serial data stream of a first communication apparatus according to an embodiment of this application.

For example, as shown in FIG. 9B, if a remainder obtained by dividing M by s is r, the M time units between the $i^{th}$ AM group and the $(i+1)^{th}$ AM group further include one second counting period, the second counting period includes r time units, the first time unit in the r time units of the second counting period is continuous with the last time unit of the $N^{th}$ first counting period, and the last time unit in the r time units of the second counting period is continuous with the first time unit (a time unit included in the $i^{th}$ AM group is not shown in FIG. 9A) of the $(i+1)^{th}$ AM group. In addition, the first time unit of the $1^{st}$ first counting period in the N first counting periods is continuous with the last time unit of the $i^{th}$ AM group, and the $N^{th}$ first counting period in the N first counting periods is continuous with the first time unit of the $(i+1)^{th}$ AM group.

Each time unit of the first counting period corresponds to one slot of the first calendar, and different time units of a same first counting period correspond to different slots of the first calendar.

Each time unit of the second counting period corresponds to one slot of the first calendar, and different time units of the second counting period correspond to different slots of the first calendar.

For example, as shown in FIG. 9B, the M time units are included between the $i^{th}$ AM group and the $(i+1)^{th}$ AM group, and a remainder obtained by dividing M by s is r. It can be learned from FIG. 9B that each of the N first counting periods includes s time units, and the second counting period includes r time units. A relationship between the slot and the time unit included in the first counting period is described by using the $1^{st}$ first counting period in the N first counting periods as an example. This relationship is also applicable to another first counting period. As shown in FIG. 9B, in the s time units included in the $1^{st}$ first counting period, the first time unit corresponds to the slot 0 of the first calendar, the second time unit corresponds to the slot 1 of the first calendar, and the rest can be deduced by analogy. The $s^{th}$ time unit corresponds to the slot s−1 of the first calendar. In the r time units included in the second counting period, the first time unit corresponds to the slot 0 of the first calendar, the second time unit corresponds to the slot 1 of the first calendar, and an $r^{th}$ time unit corresponds to a slot r−1 of the first calendar.

Figure 9C:
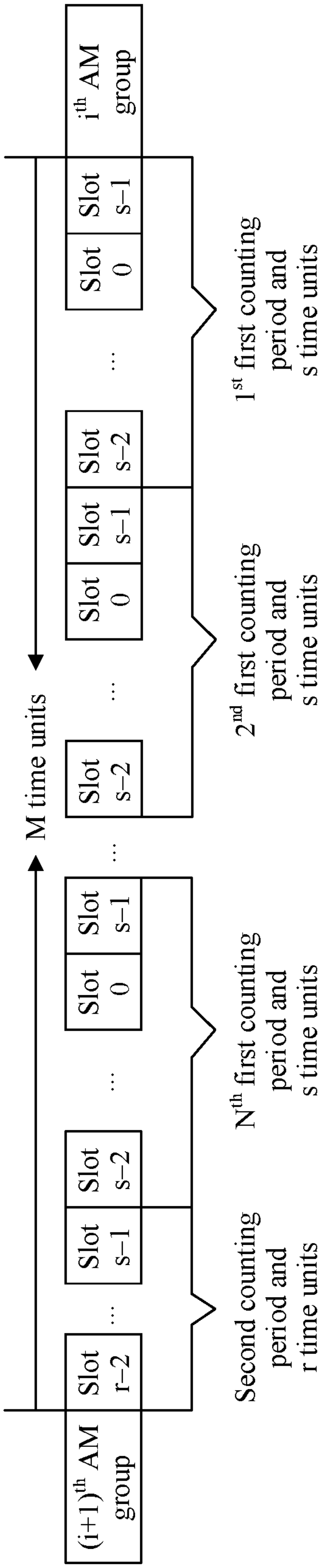
FIG. 9C is another diagram of a serial data stream of a first communication apparatus according to an embodiment of this application.

For another example, as shown in FIG. 9C, each of the N first counting periods includes s time units, and the second counting period includes r time units. A relationship between the slot and the time unit included in the first counting period is described by using the $1^{st}$ first counting period in the N first counting periods as an example. This relationship is also applicable to another first counting period. In the s time units included in the $1^{st}$ first counting period, the first time unit corresponds to the slot s−1 of the first calendar (it indicates that a last time unit in M time units between a previous AM group of the $i^{th}$ AM group and the $i^{th}$ AM group corresponds to a slot s−2, and the example shown in FIG. 9C is an example in which i is greater than or equal to 2), the second time unit corresponds to the slot 0 of the first calendar, the third time unit corresponds to the slot 1 of the first calendar, and the rest can be deduced by analogy. The $s^{th}$ time unit corresponds to a slot s−2 of the first calendar. In the r time units included in the second counting period, the first time unit corresponds to the slot s−1 of the first calendar, the second time unit corresponds to the slot 0 of the first calendar, the third time unit corresponds to the slot 1 of the first calendar, and the rest can be deduced by analogy. The $r^{th}$ time unit corresponds to a slot r−2 of the first calendar.

Division manner 2: Divide the M time units between the $i^{th}$ AM group and the $(i+1)^{th}$ AM group by using a time unit corresponding to a slot 0 as a boundary, where the M time units include the N first counting periods.

The first calendar includes s slots. In some embodiments, as shown in FIG. 9A, in the M time units between the $i^{th}$ AM group and the $(i+1)^{th}$ AM group, a slot corresponding to each time unit is allocated based on a sequence of the slots and a sequence of the M time units. For example, in FIG. 9A, the first time unit of each of the N first counting periods corresponds to the slot 0, a second time unit corresponds to the slot 1, the third time unit corresponds to the slot 2, the fourth time unit corresponds to the slot 3, and the rest can be deduced by analogy. The $s^{th}$ time unit corresponds to the slot s−1.

The division manner 2 has the following two cases, which are separately described in the following:

Case 1: If a remainder obtained by dividing the quantity M of time units between the $i^{th}$ AM group and the $(i+1)^{th}$ AM group by the quantity s of time units included in the first counting period is 0, the first time unit of the $1^{st}$ first counting period in the N first counting periods is continuous with the last time unit of the $i^{th}$ AM group, and a last first counting period in the N first counting periods is continuous with a first time unit of the $(i+1)^{th}$ AM group.

For example, as shown in FIG. 9A, the M time units are included between the $i^{th}$ AM group and the $(i+1)^{th}$ AM group, M is evenly divided by s, and each first counting period includes s time units. The first time unit of the $1^{st}$ first counting period in the N first counting periods is continuous with the last time unit of the $i^{th}$ AM group, and an $N^{th}$ first counting period in the N first counting periods is continuous with the first time unit of the $(i+1)^{th}$ AM group.

Each time unit of the first counting period corresponds to one slot of the first calendar, and different time units of a same first counting period correspond to different slots of the first calendar.

It can be learned from FIG. 9A that each time unit of each first counting period has a corresponding slot. In the s time units included in the $1^{st}$ first counting period, the first time unit corresponds to the slot 0 of the first calendar, the second time unit corresponds to the slot 1 of the first calendar, and the rest can be deduced by analogy. An $s^{th}$ time unit corresponds to a slot s−1 of the first calendar. In other words, different time units of a same first counting period correspond to different slots.

Case 2: If a remainder obtained by dividing the quantity M of time units between the $i^{th}$ AM group and the $(i+1)^{th}$ AM group by the quantity s of time units included in the first counting period is r, r is an integer greater than or equal to 1 and less than s, the M time units between the $i^{th}$ AM group and the $(i+1)^{th}$ AM group further include at least one second counting period, and each of the at least one second counting period includes only a part of the s time units. In other words, the at least one second counting period includes r time units in total.

The at least one second counting period includes two possible cases.

1. The at least one second counting period includes one second counting period, the second counting period includes r time units, and there are two possible location relationships between the second counting period and the N first counting periods.

Location relationship 1: A first time unit of the second counting period is continuous with a last time unit of the last first counting period in the N first counting periods.

In the location relationship 1, a last time unit of the second counting period is continuous with the first time unit of the $(i+1)^{th}$ AM group.

Figure 9D:
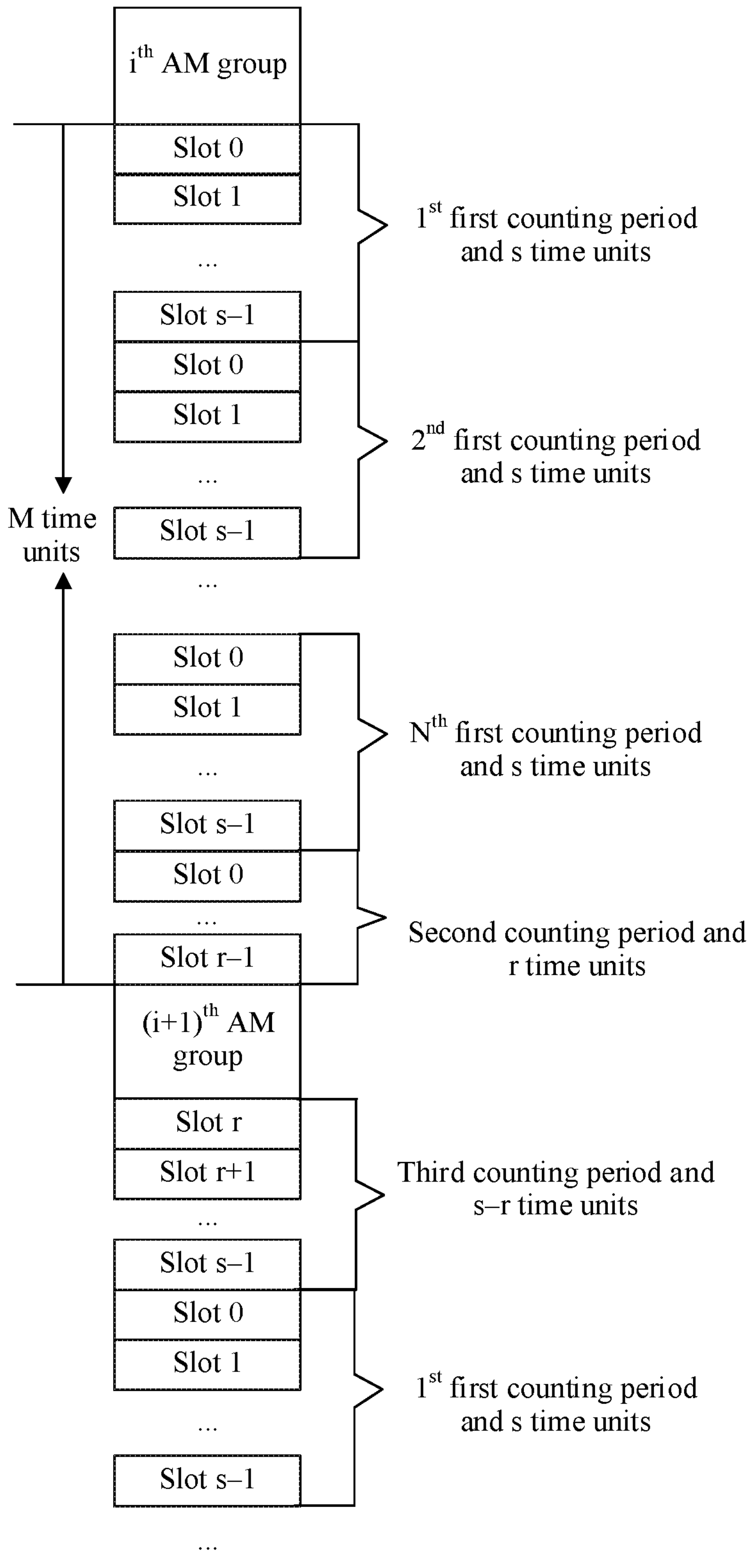
FIG. 9D is another diagram of a serial data stream of a first communication apparatus according to an embodiment of this application.

For example, as shown in FIG. 9D, if a remainder obtained by dividing M by s is r, the second counting period includes r time units. The first time unit in the r time units of the second counting period is continuous with the last time unit of the $N^{th}$ first counting period, and the last time unit in the r time units included in the second counting period is continuous with the first time unit (a time unit included in the $(i+1)^{th}$ AM group is not shown in the figure) of the $(i+1)^{th}$ AM group.

Location relationship 2: A last time unit of the second counting period is continuous with a first time unit of the $1^{st}$ first counting period in the N first counting periods.

In the location relationship 2, a first time unit of the second counting period is continuous with the last time unit of the $i^{th}$ AM group.

Figure 9E:
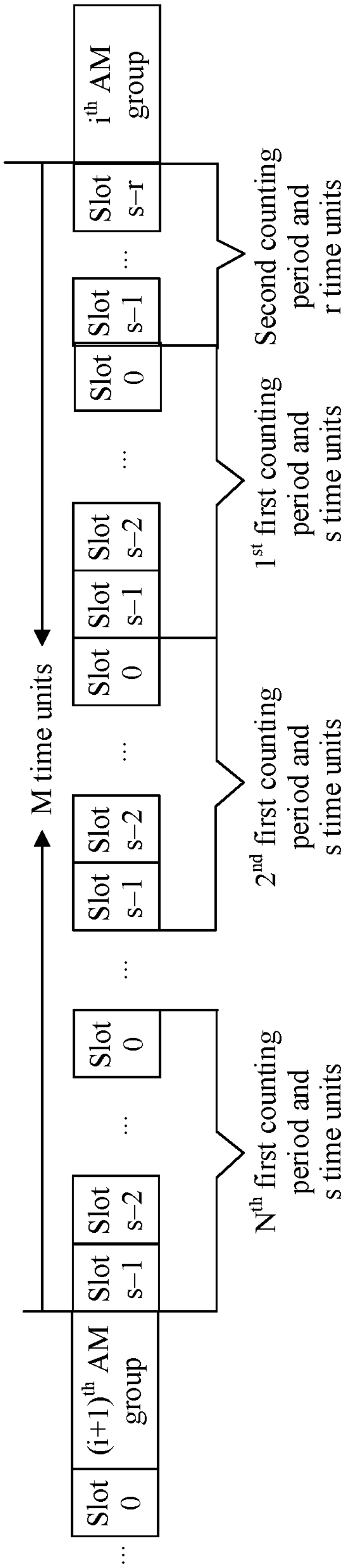
FIG. 9E is another diagram of a serial data stream of a first communication apparatus according to an embodiment of this application.

For example, as shown in FIG. 9E, if a remainder obtained by dividing M by s is r, the second counting period includes r time units, the last time unit in the r time units of the second counting period is continuous with the first time unit of the $1^{st}$ first counting period, and the first time unit in the r time units of the second counting period is continuous with the last time unit (a time unit included in the $i^{th}$ AM group is not shown in the figure) of the $i^{th}$ AM group.

2. The at least one second counting period includes two second counting periods, and the two second counting periods include r time units in total. Location relationships between the two second counting periods and the N first counting periods are as follows: A last time unit of the $1^{st}$ second counting period is continuous with the first time unit of the $1^{st}$ first counting period in the N first counting periods, and a first time unit of the $2^{nd}$ second counting period is continuous with the last time unit of the last first counting period in the N first counting periods.

In addition, a first time unit of the $1^{st}$ second counting period is continuous with the last time unit of the $i^{th}$ AM group, and a last time unit of the $2^{nd}$ second counting period is continuous with the first time unit of the $(i+1)^{th}$ AM group.

Figure 9F:
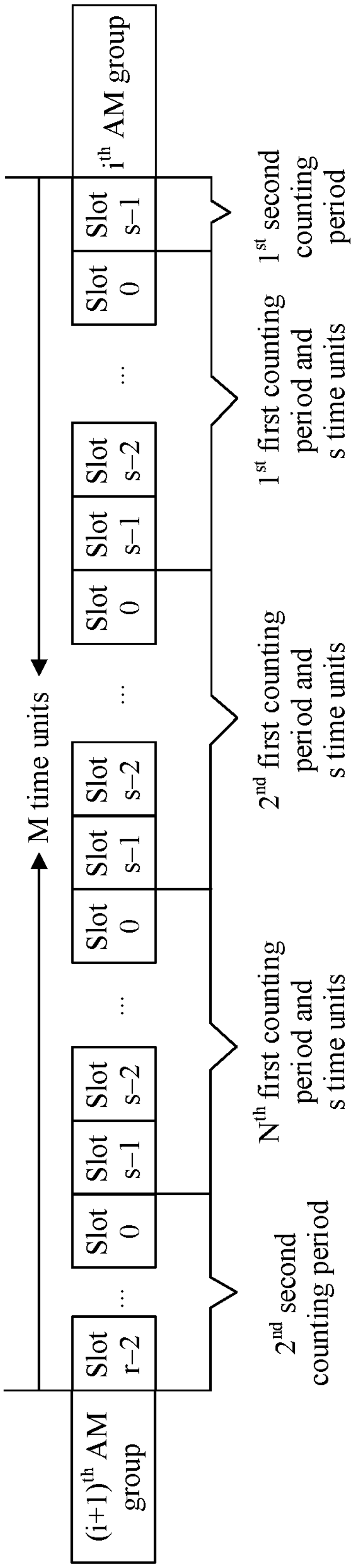
FIG. 9F is another diagram of a serial data stream of a first communication apparatus according to an embodiment of this application.

For example, as shown in FIG. 9F, if a remainder obtained by dividing M by s is r, the $1^{st}$ second counting period includes one time unit, that is, the first time unit of the $1^{st}$ second counting period is the last time unit of the $1^{st}$ second counting period. The $2^{nd}$ second counting period includes r−1 time units. The time unit included in the $1^{st}$ second counting period is continuous with the last time unit (a time unit included in the $i^{th}$ AM group is not shown in the figure) of the $i^{th}$ AM group, and the time unit included in the $1^{st}$ second counting period is continuous with the first time unit of the $1^{st}$ first counting period. The first time unit of the $2^{nd}$ second counting period is continuous with the last time unit of the $N^{th}$ first counting period, and the last time unit of the $2^{nd}$ second counting period is continuous with the first time unit (a time unit included in the $(i+1)^{th}$ AM group is not shown in the figure) of the $(i+1)^{th}$ AM group.

Each time unit of the first counting period corresponds to one slot of the first calendar, and different time units of a same first counting period correspond to different slots of the first calendar. Each time unit of each second counting period in the at least one second counting period corresponds to one slot of the first calendar, and different time units of a same second counting period correspond to different slots of the first calendar.

For example, as shown in FIG. 9E, the M time units are included between the $i^{th}$ AM group and the $(i+1)^{th}$ AM group, and a remainder obtained by dividing M by s is r. The second counting period includes r time units. A relationship between the slot and the time unit included in the first counting period is described by using the $1^{st}$ first counting period in the N first counting periods as an example. This relationship is also applicable to another first counting period. As shown in FIG. 9E, in the s time units included in the $1^{st}$ first counting period, the first time unit corresponds to the slot 0 of the first calendar, the second time unit corresponds to the slot 1 of the first calendar, and the rest can be deduced by analogy. The $s^{th}$ time unit corresponds to the slot s−1 of the first calendar. In the r time units included in the second counting period, the first time unit corresponds to a slot s−r of the first calendar, the second time unit corresponds to a slot s−r+1 of the first calendar, and the rest can be deduced by analogy. An $r^{th}$ time unit corresponds to a slot s−1 of the first calendar.

For example, as shown in FIG. 9F, the M time units are included between the $i^{th}$ AM group and the $(i+1)^{th}$ AM group, and a remainder obtained by dividing M by s is r. The $1^{st}$ second counting period includes one time units, and the $2^{nd}$ second counting period includes r−1 time units. A relationship between the slot and the time unit included in the first counting period is described by using the $1^{st}$ first counting period in the N first counting periods as an example. This relationship is also applicable to another first counting period. As shown in FIG. 9F, in the s time units included in the $1^{st}$ first counting period, the first time unit corresponds to the slot 0 of the first calendar, the second time unit corresponds to the slot 1 of the first calendar, and the rest can be deduced by analogy. The $s^{th}$ time unit corresponds to the slot s−1 of the first calendar. The first time unit of the $1^{st}$ second counting period corresponds to the slot s−1, the first time unit of the $2^{nd}$ second counting period corresponds to the slot 0, the second time unit of the $2^{nd}$ second counting period corresponds to the slot 1, and the rest can be deduced by analogy. An $(r-1)^{th}$ time unit of the $2^{nd}$ second counting period corresponds to a slot r−2.

In the division manner 1 and the division manner 2, when N is greater than or equal to 2, a last time unit of a $j^{th}$ first counting period in the N first counting periods is continuous with a first time unit of a $(j+1)^{th}$ first counting period in the N first counting periods, where j is an integer greater than or equal to 1, and j is less than N.

For example, as shown in FIG. 9A, the N first counting periods are included between the $i^{th}$ AM group and the $(i+1)^{th}$ AM group, and different first counting periods are continuous with each other. As shown in FIG. 9A, the last time unit of the $1^{st}$ first counting period is continuous with the first time unit of the $2^{nd}$ first counting period.

Then, the first communication apparatus sends the first data of the plurality of service flows to the second communication apparatus based on the mapping relationship in the M time units between the $i^{th}$ AM group and the $(i+1)^{th}$ AM group. For a specific transmission process of the first communication apparatus by using the plurality of logical lanes, refer to related descriptions in FIG. 5 and FIG. 6. Details are not described herein again.

In this embodiment, the slot of the first calendar is divided by using the $i^{th}$ AM group as a boundary, and the division manner is compatible with the existing Ethernet architecture. In addition, a bandwidth supported by each slot of the first calendar may be set based on an actual requirement. For example, in Table 2, a bandwidth occupied by each slot is 25G, and a bandwidth occupied by each slot in Table 4 is 100G. Therefore, when the slot of the first calendar is divided based on the $i^{th}$ AM group, light-weight mapping may be designed based on an actual situation, to achieve flexible implementation.

Figure 10A:
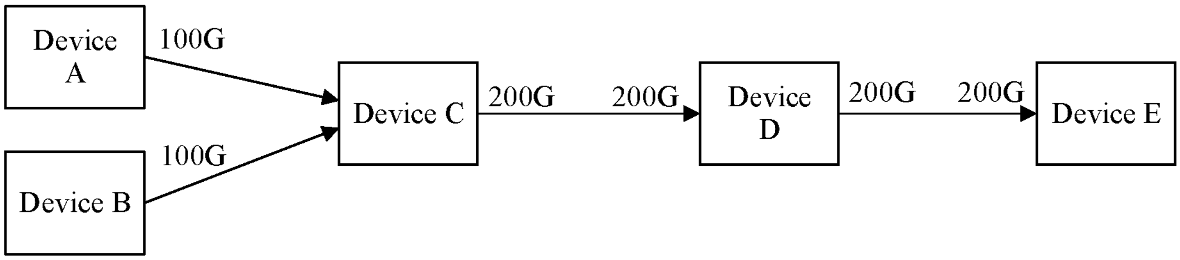
FIG. 10A is a diagram of an application scenario according to an embodiment of this application.

For example, with reference to Table 2 and FIG. 10A, the first communication apparatus is a device C, a device A sends data of the service flow 1 to the device C, and a device B sends data of the service flow 2 to the device C. Then, according to the data transmission method provided in embodiments of this application, the device C maps the service flow 1 to the slot 0 to the slot 3 of the first calendar, and maps the service flow 2 to the slot 4 to the slot 7 of the first calendar, to implement sub-rate allocation. Therefore, this implements consistency between a data transmission rate of an ingress port of the device C and a data transmission rate of an egress port of the device C (that is, for the service flow 1, the data transmission rate of the ingress port of the device C is 100G, and the data transmission rate of the egress port is also 100G, which is the same for the service flow 2), and implements an end-to-end cut-through forwarding mechanism.

Figure 10B:
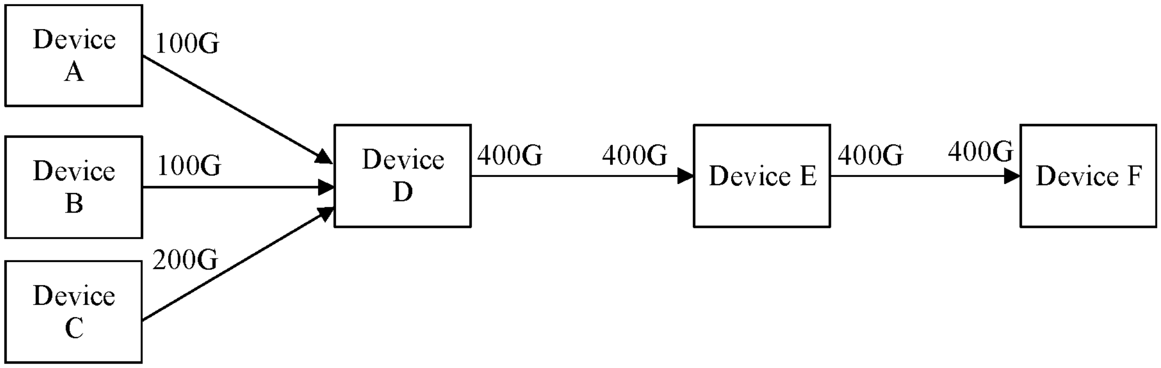
FIG. 10B is a diagram of another application scenario according to an embodiment of this application.

For example, with reference to Table 3 and FIG. 10B, the first communication apparatus is a device D, the device A sends the data of the service flow 1 to the device D, the device B sends the data of the service flow 2 to the device D, and the device C sends data of the service flow 3 to the device D. Then, according to the data transmission method provided in embodiments of this application, the device D maps the service flow 1 to the slot 0 to the slot 3 of the first calendar, maps the service flow 2 to the slot 4 to the slot 7 of the first calendar, and maps the service flow 3 to the slot 8 to the slot 15 of the first calendar, to implement sub-rate allocation. Therefore, this implements consistency between a data transmission rate of an ingress port of the device D and a data transmission rate of an egress port of the device D, and implements an end-to-end cut-through forwarding mechanism.

803: The second communication apparatus determines service flows corresponding to data separately carried in the M time units between the $i^{th}$ AM group and the $(i+1)^{th}$ AM group.

In some embodiments, the second communication apparatus determines slots, of the first calendar, separately corresponding to the M time units; and determines, based on the slots, of the first calendar, separately corresponding to the M time units, the service flows corresponding to the data separately carried in the M time units. For a specific determining manner, refer to the following related descriptions. For a process in which the second communication apparatus receives the data, refer to the data reception and parsing process shown in FIG. 7.

804: The first communication apparatus sends the $(i+1)^{th}$ AM group.

A transmission time interval between sending the $i^{th}$ AM group by the first communication apparatus and sending the $(i+1)^{th}$ AM group by the first communication apparatus is the M time units.

For example, as shown in FIG. 9A, the first communication apparatus sends the $i^{th}$ AM group, the data separately carried in the M time units between the $i^{th}$ AM group and the $(i+1)^{th}$ AM group, and then the $(i+1)^{th}$ AM group. In other words, a time unit in which the first communication apparatus sends the $i^{th}$ AM group is continuous with the first time unit in the M time units, and a first time unit in which the first communication apparatus sends the $(i+1)^{th}$ AM group is continuous with the last time unit in the M time units (time units included in the $i^{th}$ AM group and the $(i+1)^{th}$ AM group are not shown in the figure).

805: The first communication apparatus sends second data of a plurality of service flows to the second communication apparatus based on a mapping relationship by using the plurality of logical lanes.

806: The second communication apparatus determines service flows corresponding to data separately carried in M time units between the $(i+1)^{th}$ AM group and an $(i+2)^{th}$ AM group.

Operation 804 to operation 806 are similar to operation 801 to operation 803. For details, refer to related descriptions of operation 801 to operation 803. Details are not described herein again.

In this embodiment of this application, the first communication apparatus sends the $i^{th}$ AM group to the second communication apparatus, where the $i^{th}$ AM group is used to align the plurality of logical lanes, and i is an integer greater than or equal to 1; and sends the first data of the plurality of service flows to the second communication apparatus based on a mapping relationship by using the plurality of logical lanes, where the first data is carried in the M time units between the $i^{th}$ AM group and the $(i+1)^{th}$ AM group, and M is an integer greater than or equal to 2. The mapping relationship is a mapping relationship between the slot of the first calendar and the plurality of service flows, the first calendar includes s time units, the M time units between the $i^{th}$ AM group and the $(i+1)^{th}$ AM group include N first counting periods, the first counting period includes s time units, each time unit of the first counting period corresponds to one slot of the first calendar, and different time units of a same first counting period correspond to different slots of the first calendar, where s is an integer greater than or equal to 2, and N is an integer greater than or equal to 1. Then, the first communication apparatus sends the $(i+1)^{th}$ AM group to the second communication apparatus, where the transmission time interval between sending the $i^{th}$ AM group by the first communication apparatus and sending the $(i+1)^{th}$ AM group by the first communication apparatus is the M time units. It can be learned that, in this embodiment of this application, a first calendar (calendar) is designed based on the $i^{th}$ AM group, and the slot included in the first calendar has a mapping relationship with the plurality of service flows. The first communication apparatus maps the data of the plurality of service flows to a corresponding slot, so that the first communication apparatus implements sub-rate allocation. Therefore, this implements decoupling between a MAC sub-rate and an underlying PHY layer, implements consistency between a data transmission rate of an ingress port of a transmitting end device and a data transmission rate of an egress port without introducing a FlexE Shim, implements end-to-end cut-through forwarding, breaks through a bottleneck of the cut-through forwarding technology, reduces a data transmission delay, and improves data transmission performance.

In this embodiment of this application, in the embodiment shown in FIG. 8A, the following describes operation 803 with reference to operation 803*a* and operation 803*b*.

Operation 803*a* The second communication apparatus determines slots, of the first calendar, separately corresponding to the M time units.

In operation 803*a*, the second communication apparatus determines, in a plurality of manners, the slots separately corresponding to the M time units. The following separately describes the manners.

Determining manner 1: The second communication apparatus determines, based on a first correspondence between a pre-configured time unit of the first counting period and the slot, the slots, of the first calendar, separately corresponding to the M time units.

The following describes the determining manner 1 based on the division manner 1 of the first counting period.

The first correspondence is first described based on the division manner 1 of the first counting period in operation 802.

For example, as shown in FIG. 9A, in the s time units included in the first counting period, the first time unit corresponds to the slot 0 of the first calendar, the second time unit corresponds to the slot 1 of the first calendar, and the rest can be deduced by analogy. The $s^{th}$ time unit corresponds to the slot s−1 of the first calendar. The second communication apparatus may determine, based on the pre-configured first correspondence, a slot corresponding to a time unit included in each of the N first counting periods, and further determine the slots separately corresponding to the M time units.

If a remainder obtained by dividing M by s is 0, M time units between two adjacent AM groups include N first counting periods, and each first counting period includes s time units, a first time unit of each first counting period corresponds to the slot 0 of the first calendar, a second time unit corresponds to the slot 1 of the first calendar, and the rest can be deduced by analogy. An $s^{th}$ time unit corresponds to the slot s−1 of the first calendar. Therefore, the first correspondence between the first counting period and the slot of the first calendar only needs to be configured on the second communication apparatus once.

If a remainder obtained by dividing M by s is r, N first counting periods and one second counting period are included between the $i^{th}$ AM group and the $(i+1)^{th}$ AM group. It can be learned from FIG. 9B that the first time unit of each first counting period corresponds to the slot 0 of the first calendar, the second time unit corresponds to the slot 1 of the first calendar, and the rest can be deduced by analogy. The $s^{th}$ time unit corresponds to the slot s−1 of the first calendar. For third counting periods included between the $(i+1)^{th}$ AM group and the $(i+2)^{th}$ AM group, in s time units included in each third counting period, a first time unit corresponds to the slot s−r of the first calendar, a second time unit corresponds to the slot s−r+1 of the first calendar, and the rest can be deduced by analogy. An $s^{th}$ time unit corresponds to the slot r−1 of the first calendar. Therefore, it can be learned that a correspondence between a time unit included in the first counting period and a slot may be different from a correspondence between a time unit included in the third counting period and a slot. The second communication apparatus should separately configure, for the first counting period and the third counting period, the correspondence between a time unit included in the first counting period and a slot and the correspondence between a time unit included in the third counting period and a slot.

In an embodiment, the second communication apparatus determines, based on the first correspondence and a second correspondence between at least one second counting period and the slot, the slots, of the first calendar, separately corresponding to the M time units.

In the division manner 1 of the first counting period, when a remainder obtained by dividing M by s is r, one second counting period is further included between the $i^{th}$ AM group and the $(i+1)^{th}$ AM group, and the second communication apparatus should configure a correspondence between the second counting period and the slot.

For example, as shown in FIG. 9B, in r time units included in the second counting period, a first time unit of the second counting period corresponds to the slot 0, a second time unit corresponds to the slot 1, and the rest can be deduced by analogy. An $r^{th}$ time unit corresponds to the slot r−1.

For another example, as shown in FIG. 9C, in r time units included in the second counting period, a first time unit of the second counting period corresponds to the slot s−1, a second time unit corresponds to the slot 0, and the rest can be deduced by analogy. An $r^{th}$ time unit corresponds to the slot r−2.

The following describes the first correspondence based on the division manner 2 of the first counting period.

In the division manner 2, the first counting period is divided by using the time unit corresponding to the slot 0 as a boundary. Therefore, in the s time units included in each first counting period, the first time unit corresponds to the slot 0 of the first calendar, the second time unit corresponds to the slot 1 of the first calendar, and the rest can be deduced by analogy. The $s^{th}$ time unit corresponds to the slot s−1 of the first calendar. Therefore, the first correspondence between the first counting period and the slot of the first calendar only needs to be configured on the second communication apparatus once.

In an embodiment, the second communication apparatus determines, based on the first correspondence and a second correspondence between at least one second counting period and the slot, the slots, of the first calendar, separately corresponding to the M time units.

In the division manner 1 of the first counting period, when a remainder obtained by dividing M by s is r, at least one second counting period is further included between the $i^{th}$ AM group and the $(i+1)^{th}$ AM group, and the second communication apparatus should configure a second correspondence between the at least one second counting period and the slot.

For example, as shown in FIG. 9E, the M time units between the $i^{th}$ AM group and the $(i+1)^{th}$ AM group further include one second counting period. In r time units included in the second counting period, a first time unit of the second counting period corresponds to the slot s−r, a second time unit corresponds to the slot s−r+1, and the rest can be deduced by analogy. An $r^{th}$ time unit corresponds to the slot s−1. Therefore, the correspondence between the second counting period and the slot needs to be configured on the second communication apparatus.

For still another example, as shown in FIG. 9F, the M time units between the $i^{th}$ AM group and the $(i+1)^{th}$ AM group further include two second counting periods. A first time unit of the $1^{st}$ second counting period corresponds to the slot s−1. In r−1 time units included in a $2^{nd}$ second counting period, a first time unit corresponds to the slot 0, a second time unit corresponds to the slot 1, and the rest can be deduced by analogy. An $r^{th}$ time unit corresponds to the slot r−2. Therefore, a correspondence between the $1^{st}$ second counting period and the slot and a correspondence between the $2^{nd}$ second counting period and the slot need to be configured on the second communication apparatus.

Determining manner 2: The second communication apparatus determines, based on the $i^{th}$ AM group, the slots, of the first calendar, separately corresponding to the M time units.

A first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group.

In some embodiments, the second communication apparatus determines, based on the $i^{th}$ AM group, the slot corresponding to the first time unit of the $1^{st}$ counting period in the M time units between the $i^{th}$ AM group and the $(i+1)^{th}$ AM group, and then determines the slot corresponding to each time unit of each counting period in the M time units between the $i^{th}$ AM group and the $(i+1)^{th}$ AM group, to determine the slots separately corresponding to the M time units. Because the quantity M of time units between two adjacent AM groups is not necessarily exactly divided by the quantity s of slots included in the first calendar, the first AM in the AM group is used to identify the slot, of the first calendar, that corresponds to the first time unit of the $1^{st}$ counting period in the M time units between the $i^{th}$ AM group and the $(i+1)^{th}$ AM group, so that the second communication apparatus determines the slots corresponding to the M time units.

The following first describes the determining manner 2 based on the division manner 1 of the first counting period and with reference to FIG. 9A and FIG. 9C.

For example, as shown in FIG. 9A, the $1^{st}$ counting period in the M time units between the $i^{th}$ AM group and the $(i+1)^{th}$ AM group is the $1^{st}$ first counting period. In other words, the first time unit of the $1^{st}$ first counting period corresponds to the slot 0 identified by the first AM in the $i^{th}$ AM group. Therefore, the second communication apparatus may determine that a first time unit of each first counting period corresponds to the slot 0, a second time unit corresponds to the slot 1, the third time unit corresponds to the slot 2, and the rest can be deduced by analogy. An $s^{th}$ time unit corresponds to the slot s−1. Further, the slots separately corresponding to the M time units are determined.

For example, as shown in FIG. 9C, the $1^{st}$ counting period in the M time units between the $i^{th}$ AM group and the $(i+1)^{th}$ AM group is the $1^{st}$ first counting period. In other words, the first time unit of the $1^{st}$ first counting period corresponds to the slot s identified by the first AM in the $i^{th}$ AM group. Therefore, the second communication apparatus may determine that a first time unit of each first counting period corresponds to the slot s, a second time unit corresponds to the slot 0, the third time unit corresponds to the slot 1, and the rest can be deduced by analogy. An $s^{th}$ time unit corresponds to the slot s−2. A last time unit of the first counting period corresponds to the slot s−2, and the first calendar includes s slots. Therefore, the second communication apparatus may determine that in r time units included in the first counting period, a first time unit corresponds to the slot s−1, a second time unit corresponds to the slot 0, and the rest can be deduced by analogy. An $r^{th}$ time unit corresponds to the slot r−2. Further, the slots separately corresponding to the M time units are determined.

The following describes the determining manner 2 based on the division manner 2 of the first counting period and with reference to FIG. 9E and FIG. 9F.

For example, as shown in FIG. 9E, the $1^{st}$ counting period in the M time units between the $i^{th}$ AM group and the $(i+1)^{th}$ AM group is the second counting period. In other words, the first time unit of the second counting period corresponds to the slot s−r identified by the first AM in the $i^{th}$ AM group. Therefore, the second communication apparatus may determine that a first time unit of the second counting period corresponds to the slot s−r, and a second time unit corresponds to the slot s−r+1. Because the first calendar includes s slots, the second communication apparatus may determine that the second counting period includes r time units, that is, an $r^{th}$ time unit of the second counting period corresponds to the slot s−1. Then, the second communication apparatus determines that in the s time units included in each first counting period, the first time unit corresponds to the slot 0, the second time unit corresponds to the slot 1, and the rest can be deduced by analogy. The $s^{th}$ time unit corresponds to the slot s−1. Therefore, the second communication apparatus determines the slots separately corresponding to the M time units.

For example, as shown in FIG. 9F, the $1^{st}$ counting period in the M time units between the $i^{th}$ AM group and the $(i+1)^{th}$ AM group is the second counting period. In other words, the first time unit of the $1^{st}$ second counting period corresponds to the slot s−1 identified by the first AM in the $i^{th}$ AM group. Therefore, the second communication apparatus may determine that the first time unit of the $1^{st}$ second counting period corresponds to the slot s−1. Because the first calendar includes s slots, the second communication apparatus may determine that the $1^{st}$ second counting period includes one time unit. Then, the second communication apparatus determines that in the s time units included in each first counting period, the first time unit corresponds to the slot 0, the second time unit corresponds to the slot 1, and the rest can be deduced by analogy. The $s^{th}$ time unit corresponds to the slot s−1. Then, the second communication apparatus determines slots corresponding to remaining r−1 time units. The last time unit included in the first counting period corresponds to the slot s−1. Therefore, the second communication apparatus may determine that in r time units (namely, the remaining r−1 time units) of the $2^{nd}$ second counting period, a first time unit corresponds to the slot 0, a second time unit corresponds to the slot 1, and the rest can be deduced by analogy. An $(r-1)^{th}$ time unit corresponds to the slot r−2. Therefore, the second communication apparatus determines the slots separately corresponding to the M time units.

In this embodiment, the second communication apparatus may alternatively select another AM in the $i^{th}$ AM group to identify the slot, of the first calendar, corresponding to the first time unit of the $1^{st}$ counting period in the M time units between the $i^{th}$ AM group and the $(i+1)^{th}$ AM group. This is not limited in this application. For example, the second communication apparatus selects a second AM in the $i^{th}$ AM group to identify the slot, of the first calendar, corresponding to the first time unit of the $1^{st}$ counting period in the M time units between the $i^{th}$ AM group and the $(i+1)^{th}$ AM group.

Based on the determining manner 2, in an embodiment, this embodiment further includes operation 801*a*, and operation 801*a* is performed before operation 801.

Operation 801*a*: The first communication apparatus generates the $i^{th}$ AM group based on the slot corresponding to the first time unit of the $1^{st}$ counting period in the M time units.

The first AM in the $i^{th}$ AM group is used to identify the slot, of the first calendar, that corresponds to the first time unit of the $1^{st}$ counting period in the M time units between the $i^{th}$ AM group and the $(i+1)^{th}$ AM group.

In this embodiment, the first communication apparatus may use a padding bit in the $i^{th}$ AM group to identify the slot corresponding to the first time unit of the $1^{st}$ counting period in the M time units between the $i^{th}$ AM group and the $(i+1)^{th}$ AM group. In an embodiment, the first AM in the $i^{th}$ AM group includes a second padding part.

The second padding part carries an ID of the slot corresponding to the first time unit of the $1^{st}$ counting period in the M time units between the $i^{th}$ AM group and the $(i+1)^{th}$ AM group.

In the 200G or 400G Ethernet technology, the second padding part may be $UP_1$. In the 40G or 100G Ethernet technology, the second padding part may be $BIP_3$. The following describes the second padding part by using the 200G Ethernet technology as an example.

Figure 11A:
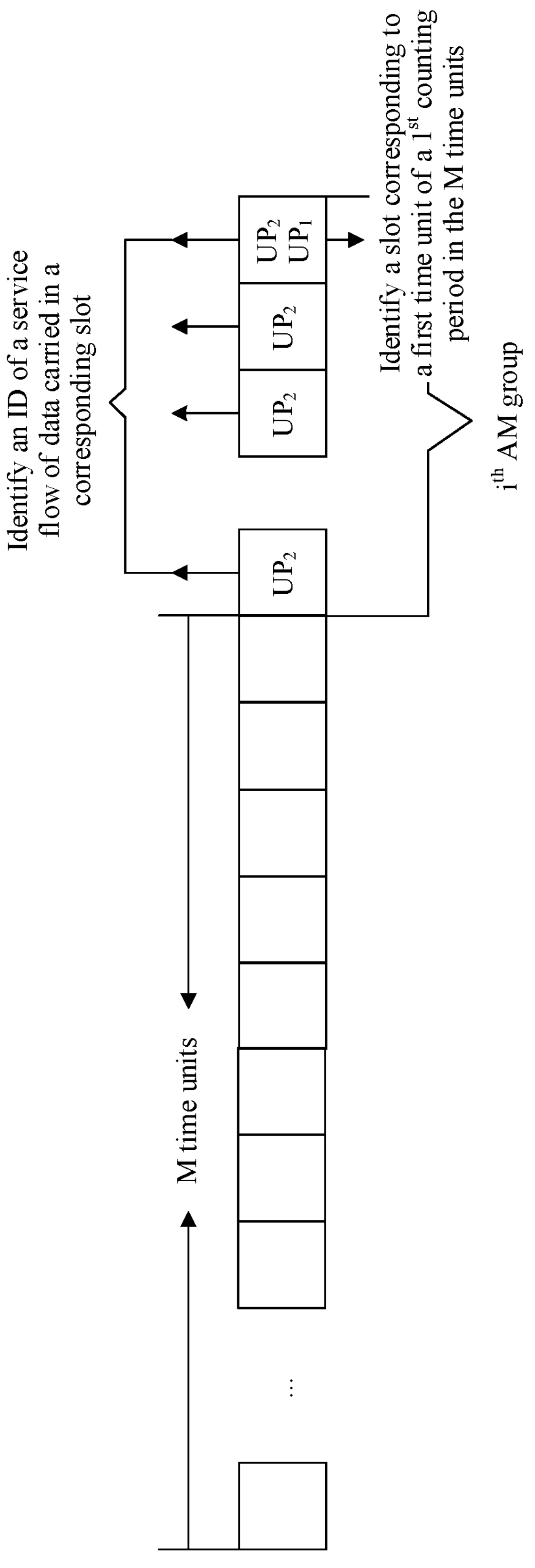
FIG. 11A is a diagram of a first padding part and a second padding part of an $i^{th}$ AM group according to an embodiment of this application.

As shown in FIG. 11A, the $i^{th}$ AM group includes the second padding part, and the second padding part is $UP_1$ of the first AM in the $i^{th}$ AM group. For related descriptions of $UP_1$, refer to the related descriptions in FIG. 2.

It should be noted that the second padding part may alternatively be $UP_1$ of another AM in the $i^{th}$ AM group. This is not limited in this application. For example, the second padding part is $UP_1$ of the second AM in the $i^{th}$ AM group.

Figure 11B:
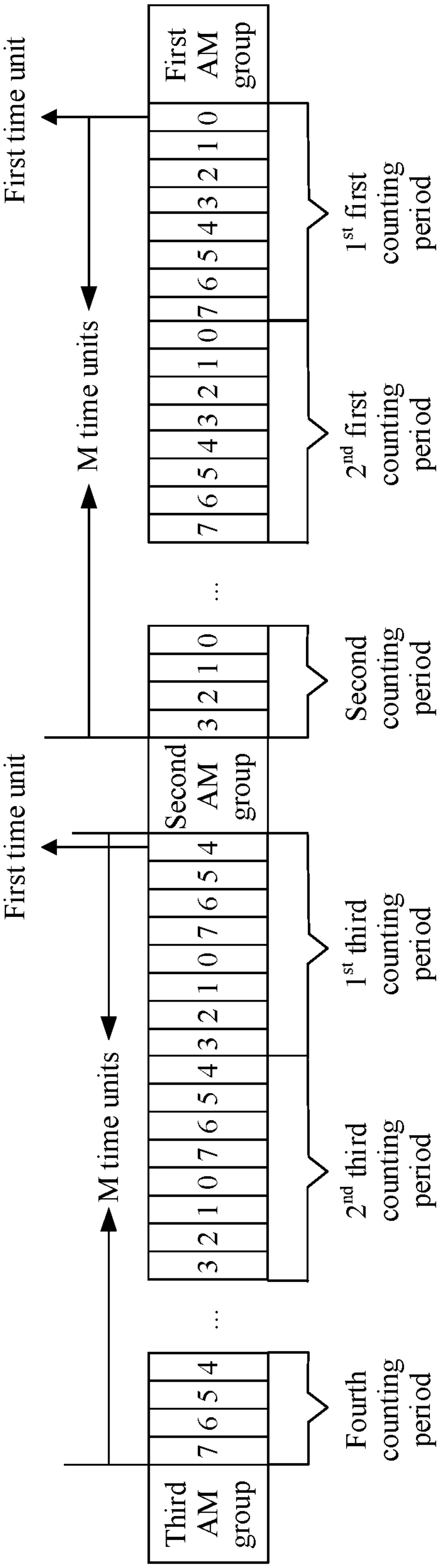
FIG. 11B is another diagram of a serial data stream of a first communication apparatus according to an embodiment of this application.
Figure 11C:
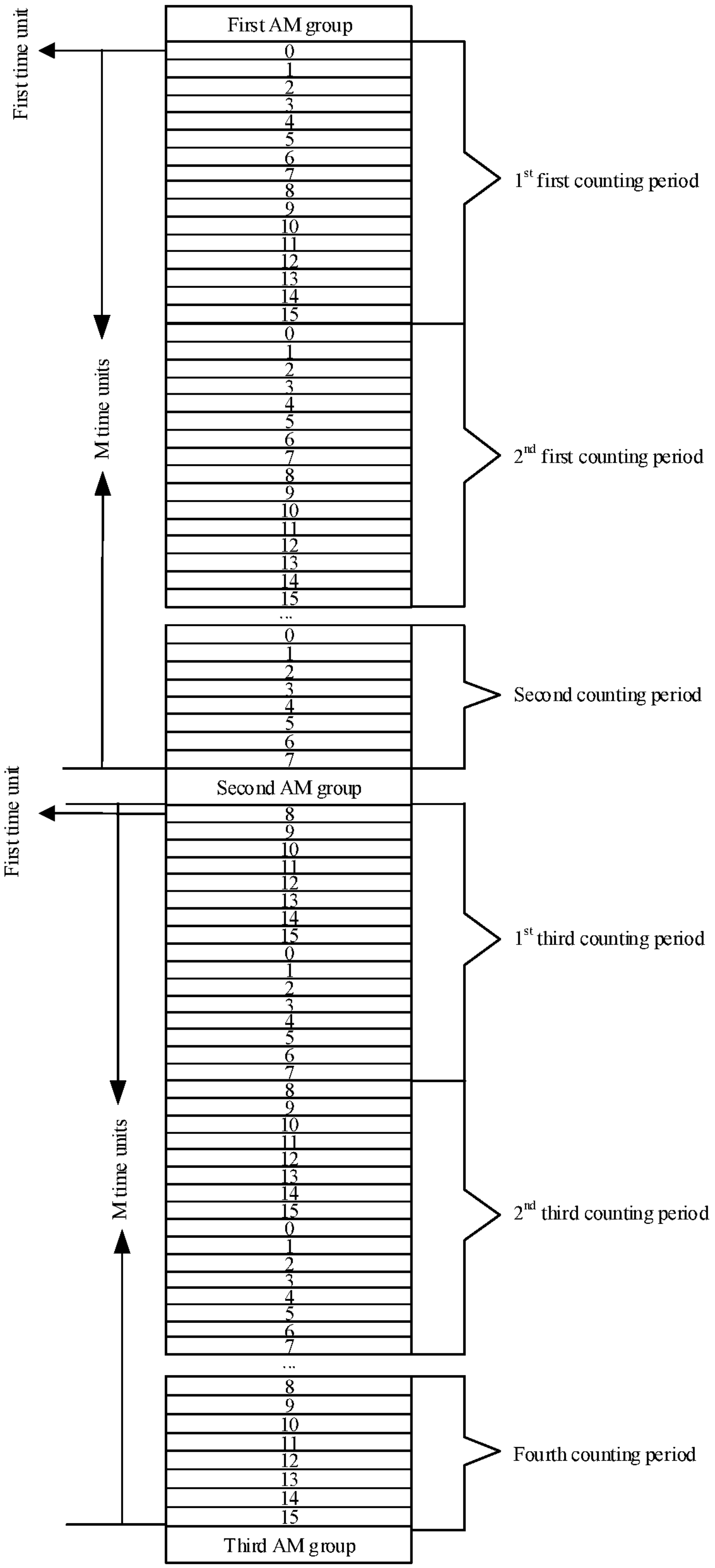
FIG. 11C is another diagram of a serial data stream of a first communication apparatus according to an embodiment of this application.

The following describes, with reference to FIG. 11B and FIG. 11C, a case in which the second padding part carries the ID of the slot corresponding to the first time unit of the $1^{st}$ counting period in the M time units.

The following describes the second padding part based on the division manner 1 of the first counting period and with reference to FIG. 11B and FIG. 11C.

Example 1: As shown in FIG. 11B, in the 200G Ethernet technology, if the $i^{th}$ AM group is a first AM group, the second padding part is $UP_1$ of a first AM in the first AM group. The slot corresponding to the first time unit of the $1^{st}$ counting period in the M time units is a $0^{th}$ slot, namely, the slot 0, of the first calendar. Therefore, $UP_1$ of the first AM in the first AM group carries the ID of the slot 0 corresponding to the first time unit of the $1^{st}$ first counting period. In other words, the first communication apparatus encodes $UP_1$ of the first AM in the first AM group, to obtain the ID of the slot 0 that is carried in $UP_1$ of the first AM in the first AM group.

Example 2: As shown in FIG. 11B, in the 200G Ethernet technology, if the $i^{th}$ AM group is a second AM group, the second padding part is $UP_1$ of a first AM in the second AM group. The slot corresponding to the first time unit of the $1^{st}$ counting period in the M time units is a slot 4. Therefore, it can be learned from FIG. 11B that $UP_1$ of the first AM in the second AM group carries an ID of the slot 4 corresponding to the first time unit of the $1^{st}$ first counting period. In other words, the first communication apparatus encodes $UP_1$ of the first AM in the second AM group, to obtain the ID of the slot 4 that is carried in $UP_1$ of the first AM in the second AM group.

Example 3: As shown in FIG. 11C, in the 400G Ethernet technology, if the $i^{th}$ AM group is a first AM group, the second padding part is $UP_1$ of a first AM in the first AM group. The slot corresponding to the first time unit of the $1^{st}$ counting period in the M time units is the slot 0. Therefore, $UP_1$ of the first AM in the first AM group carries the ID of the slot 0 corresponding to the first time unit of the first counting period. In other words, the first communication apparatus encodes $UP_1$ of the first AM in the first AM group, to obtain the ID of the slot 0 that is carried in $UP_1$ of the first AM in the first AM group.

Example 4: As shown in FIG. 11C, in the 400G Ethernet technology, if the $i^{th}$ AM group is a second AM group, the second padding part is $UP_1$ of a first AM in the second AM group. $UP_1$ of the first AM in the second AM group carries an ID of the slot 8 corresponding to the first time unit of the $1^{st}$ first counting period. In other words, the first communication apparatus encodes $UP_1$ of the first AM in the second AM group, to obtain the ID of the slot 8 that is carried in $UP_1$ of the first AM in the second AM group.

Figure 11D:
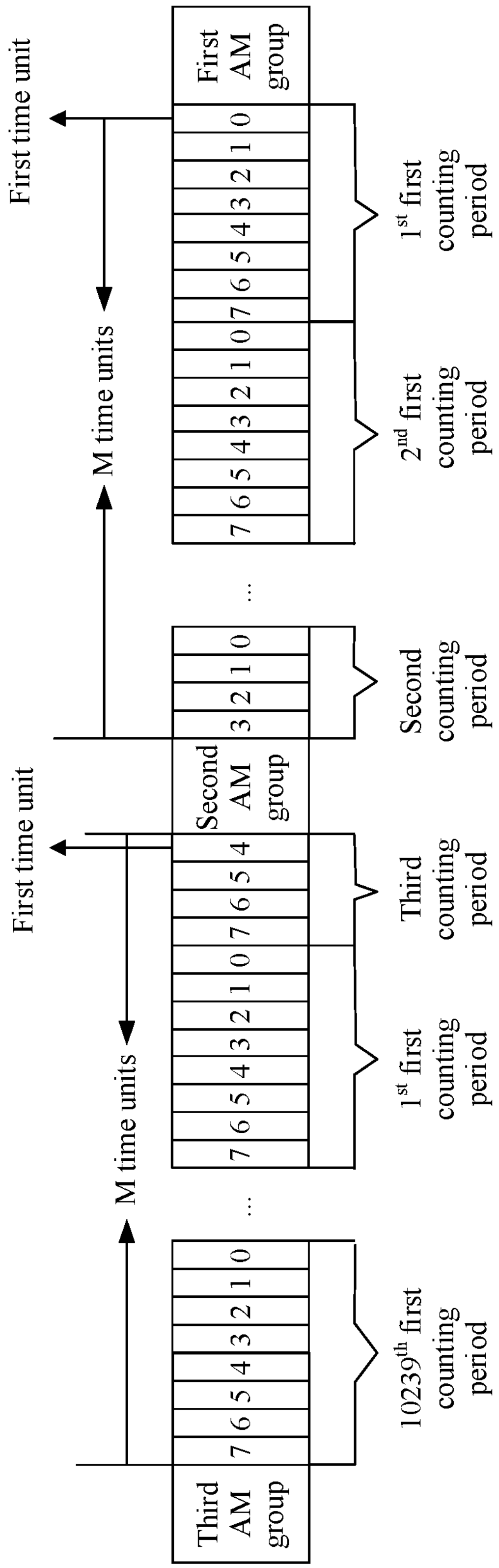
FIG. 11D is another diagram of a serial data stream of a first communication apparatus according to an embodiment of this application.

The following describes the second padding part based on the division manner 1 of the first counting period and with reference to FIG. 11D.

For example, as shown in FIG. 11D, in the 200G Ethernet technology, M is 81916. If the $i^{th}$ AM group is a first AM group, the second padding part is $UP_1$ of a first AM in the first AM group. The slot corresponding to the first time unit of the $1^{st}$ counting period in the M time units is a $0^{th}$ slot, namely, the slot 0, of the first calendar. Therefore, $UP_1$ of the first AM in the first AM group carries the ID of the slot 0 corresponding to the first time unit of the $1^{st}$ first counting period. If the $i^{th}$ AM group is a second AM group, the second padding part is $UP_1$ of a first AM in the second AM group, and $UP_1$ of the first AM in the second AM group carries an ID, namely, an ID of the slot 4, of a slot corresponding to a first time unit of a fourth counting period.

It should be noted that FIG. 11B, FIG. 11C, and FIG. 11D are described by using only the first AM group and the second AM group of a data stream of the first communication apparatus as an example. Other AM groups of the data stream of the first communication apparatus are also similar, and are not described one by one herein.

Operation 803*b*: The second communication apparatus determines, based on the slots, of the first calendar, separately corresponding to the M time units, the service flows corresponding to the data separately carried in the M time units.

In some embodiments, the second communication apparatus determines, based on the mapping relationship and the slots, of the first calendar, separately corresponding to the M time units, the service flows corresponding to the data separately carried in the M time units. For related descriptions of the mapping relationship, refer to the related descriptions in operation 802.

The mapping relationship may be pre-configured in the first communication apparatus and the second communication apparatus, or may be carried in the $i^{th}$ AM group. This is not limited in this application.

For a manner in which the mapping relationship is pre-configured in the first communication apparatus and the second communication apparatus, when the mapping relationship changes, the first communication apparatus and the second communication apparatus should update the mapping relationship.

If the mapping relationship is carried in the $i^{th}$ AM group, in an embodiment, this embodiment further includes operation 801*b*, and operation 801*b* is performed before operation 801.

Operation 801*b*: The first communication apparatus generates the $i^{th}$ AM group based on the mapping relationship.

The $i^{th}$ AM group indicates service flows separately corresponding to the slots of the first calendar.

In some embodiments, the first communication apparatus uses a first padding part of the $i^{th}$ AM group to identify IDs of the service flows separately corresponding to the slots of the first calendar. In an embodiment, the $i^{th}$ AM group includes P AMs, where P is a quantity of the plurality of logical lanes, and P is an integer greater than 1.

When P is greater than or equal to s, the first communication apparatus may use the first padding part of the $i^{th}$ AM group to identify the service flows separately corresponding to the slots of the first calendar.

When P is greater than s, the first communication apparatus may use a first padding part of first s AMs or last s AMs in the $i^{th}$ AM group to identify the service flows separately corresponding to the slots of the first calendar. This is not limited in this application.

It should be noted that if the second communication apparatus determines, based on the $i^{th}$ AM group, the slots, of the first calendar, separately corresponding to the M time units in operation 803*a*, and the second communication apparatus determines, based on the $i^{th}$ AM group and the slots, of the first calendar, separately corresponding to the M time units, the service flows corresponding to the data separately carried in the M time units in operation 803*b*, operation 801*a* and operation 801*b* may be combined as follows: The first communication apparatus generates the $i^{th}$ AM group based on the mapping relationship and the slot, of the first calendar, that corresponds to each time unit of the first counting period, to obtain the $i^{th}$ AM group used to identify the service flows separately corresponding to the slots of the first calendar, and the first AM in the $i^{th}$ AM group used to identify the slot, of the first calendar, that corresponds to the first time unit of the $1^{st}$ counting period in the M time units between the $i^{th}$ AM group and the $(i+1)^{th}$ AM group.

The first padding part may be $UP_2$ of an AM in the 200G or 400G Ethernet technology, or $BIP_7$ in the 40G or 100G Ethernet technology. The following is described by using $UP_2$ of the AM in the 200G Ethernet technology as an example.

For example, as shown in FIG. 11A, a quantity of AMs included in the $i^{th}$ AM group is the same as a quantity of time units included in the first counting period, that is, P is equal to s. Each AM includes a first padding part, and the first padding part may be $UP_2$ of each AM. For related descriptions of $UP_2$, refer to the related descriptions in FIG. 2.

It should be noted that when P is less than s, the first communication apparatus may pre-configure the mapping relationship, or use a first padding part of an AM group adjacent to the $i^{th}$ AM group and the first padding part of the $i^{th}$ AM group to identify the service flows separately corresponding to the slots of the first calendar. This is not limited in this application.

The following describes, by using an example in which the first padding part is $UP_2$ of the AM in the 200G or 400G Ethernet technology, a case in which the first padding part of the it AM group is used to identify the service flows separately corresponding to the slots of the first calendar. The following is described by using an example in which P is equal to s.

Example 1: As shown in FIG. 11B, in the 200G Ethernet technology, if the $i^{th}$ AM group is a first AM group, the first padding part is $UP_2$ of each AM in the first AM group. The first AM group includes eight AMs, and the first calendar includes eight slots. It can be learned from the mapping relationship shown in Table 2 that the service flow 1 is mapped to the slot 0 to the slot 3, and the service flow 2 is mapped to the slot 4 to the slot 7.

Because the first counting period includes s time units, and the s time units one-to-one correspond to s slots, $UP_2$ of each AM in the first AM group may carry the service flow corresponding to the slot corresponding to each time unit of the first counting period. In FIG. 11B, $UP_2$ of first four AMs in the first AM group separately carries an ID of the service flow 1. $UP_2$ of last four AMs in the first AM group separately carries an ID of the service flow 2. In other words, in operation 801*b*, the first communication apparatus separately encodes $UP_2$ of the first four AMs in the first AM group, to obtain IDs, separately carried on $UP_2$ of the first four AMs, of service flows corresponding to the slot 0 to the slot 3. The first communication apparatus separately encodes $UP_2$ of the last four AMs in the first AM group, to obtain IDs, separately carried on $UP_2$ of the last four AMs, of service flows corresponding to the slot 4 to the slot 7.

In FIG. 11B, after the first AM group, the first communication apparatus sends, in a first time unit to a fourth time unit of the $1^{st}$ first counting period, the data of the service flow 1, sends, in a fifth time unit to an eighth time unit of the $1^{st}$ first counting period, the data of the service flow 2, sends, in a first time unit to a fourth time unit of the $2^{nd}$ first counting period, the data of the service flow 1, sends, in a fifth time unit to an eighth time unit of the $2^{nd}$ first counting period, the data of the service flow 2, and the rest can be deduced by analogy. The first communication apparatus sends, in a first time unit to a fourth time unit of a $10239^{th}$ first counting period, the data of the service flow 1, and sends, in a fifth time unit to an eighth time unit of the $10239^{th}$ first counting period, the data of the service flow 2. The M time units between the first AM group and the second AM group further include one second counting period, and the first communication apparatus sends, in a first time unit to a fourth time unit of the second counting period, the data of the service flow 1. The second communication apparatus receives, in a corresponding time unit, the data of the service flow 1 and the data of the service flow 2. Therefore, the second communication apparatus determines, based on the first padding part of each AM in the $i^{th}$ AM group and the slots corresponding to the M time units, the service flows corresponding to the data separately carried in the M time units.

Example 2: As shown in FIG. 11B, in the 200G Ethernet technology, if the $i^{th}$ AM group is a second AM group, the second padding part is $UP_2$ of each AM in the second AM group. The second AM group includes eight AMs, and the first calendar includes eight slots.

Because the third counting period includes s time units, and the s time units one-to-one correspond to s slots, $UP_2$ of each AM in the first AM group may carry the service flow corresponding to the slot corresponding to each time unit of the third counting period. In the third counting period included in the first AM group and the second AM group, a first time unit corresponds to the slot 4, a second time unit corresponds to the slot 5, a third time unit corresponds to the slot 6, a fourth time unit corresponds to the slot 7, a fifth time unit corresponds to the slot 0, and the rest can be deduced by analogy. An eighth time unit corresponds to the slot 3. It can be learned from the mapping relationship shown in Table 2 that the service flow 1 is mapped to the slot 0 to the slot 3, and the service flow 2 is mapped to the slot 4 to the slot 7.

Therefore, $UP_2$ of first four AMs in the second AM group separately carries an ID of the service flow 2, and $UP_2$ of last four AMs in the first AM group separately carries an ID of the service flow 1. In other words, in operation 801*b*, the first communication apparatus separately encodes $UP_2$ of the first four AMs in the first AM group, to obtain IDs, separately carried on $UP_2$ of the first four AMs, of service flows corresponding to the slot 4 to the slot 7. The first communication apparatus separately encodes $UP_2$ of the last four AMs in the second AM group, to obtain IDs, separately carried on $UP_2$ of the last four AMs, of service flows corresponding to the slot 0 to the slot 3.

In FIG. 11B, after the second AM group, the first communication apparatus sends, in a first time unit to a fourth time unit of a $1^{st}$ third counting period, the data of the service flow 2, sends, in a fifth time unit to an eighth time unit of the $1^{st}$ third counting period, the data of the service flow 1, sends, in a first time unit to a fourth time unit of a $2^{nd}$ third counting period, the data of the service flow 2, sends, in a fifth time unit to an eighth time unit of the $2^{nd}$ third counting period, the data of the service flow 1, and the rest can be deduced by analogy. The first communication apparatus sends, in a first time unit to a fourth time unit of a $10239^{th}$ third counting period, the data of the service flow 2, and sends, in a fifth time unit to an eighth time unit of the $10239^{th}$ third counting period, the data of the service flow 1. The M time units between the first AM group and the second AM group further include one fourth counting period, the fourth counting period includes four time units, and the first communication apparatus sends, in a first time unit to a fourth time unit of the fourth counting period, the data of the service flow 2. The second communication apparatus receives, in a corresponding time unit, the data of the service flow 1 and the data of the service flow 2. Therefore, the second communication apparatus determines, based on the first padding part of each AM in the $i^{th}$ AM group and the slots corresponding to the M time units, the service flows corresponding to the data separately carried in the M time units.

Example 3: As shown in FIG. 11C, in the 400G Ethernet technology, if the $i^{th}$ AM group is a first AM group, the first padding part is $UP_2$ of each AM in the first AM group. The first AM group includes 16 AMs, and the first calendar includes 16 slots. It can be learned from the mapping relationship shown in Table 3 that the service flow 1 is mapped to the slot 0 to the slot 3, the service flow 2 is mapped to the slot 4 to the slot 7, and the service flow 3 is mapped to the slot 8 to the slot 15.

Because the first counting period includes s time units, and the s time units one-to-one correspond to s slots, $UP_2$ of each AM in the first AM group may carry the service flow corresponding to the slot corresponding to each time unit of the first counting period. Therefore, $UP_2$ of first four AMs in the first AM group separately carries an ID of the service flow 1, $UP_2$ of a fifth AM to an eight AM in the first AM group separately carries an ID of the service flow 2, and $UP_2$ of a ninth AM to a sixteenth AM in the first AM group separately carries an ID of the service flow 3. In other words, in operation 801*b*, the first communication apparatus encodes $UP_2$ of each AM in the first AM group, to obtain IDs, separately carried on $UP_2$ of the first four AMs in the first AM group, of service flows corresponding to the slot 0 to the slot 3, IDs, separately carried on $UP_2$ of the fifth AM to the eighth AM in the first AM group, of service flows corresponding to the slot 4 to the slot 7, and IDs, separately carried on $UP_2$ of the ninth AM to the sixteenth AM in the first AM group, of service flows corresponding to the slot 8 to the slot 15.

In FIG. 11C, after the first AM group, the first communication apparatus sends, in a first time unit to a fourth time unit of the $1^{st}$ first counting period, the data of the service flow 1, sends, in a fifth time unit to an eighth time unit of the $1^{st}$ first counting period, the data of the service flow 2, and sends, in a ninth time unit to a sixteenth time unit of the $1^{st}$ first counting period, the data of the service flow 3. The rest can be deduced by analogy. A data sending process in another first counting period is similar. The M time units between the first AM group and the second AM group further include one second counting period, the second counting period includes eight time units, and the first communication apparatus sends, in a first time unit to a fourth time unit of the second counting period, the data of the service flow 1, and sends, in a fifth time unit to an eighth time unit, the data of the service flow 2. The second communication apparatus receives, in a corresponding time unit, the data of the service flow 1, the data of the service flow 2, and the data of the service flow 3. Therefore, the second communication apparatus may determine, based on the first padding part of each AM in the $i^{th}$ AM group and the slots separately corresponding to the M time units, the service flows corresponding to the data separately carried in the M time units.

Example 4: As shown in FIG. 11C, in the 400G Ethernet technology, if the $i^{th}$ AM group is a second AM group, the second padding part is $UP_2$ of each AM in the second AM group. The second counting period included in the M time units between the first AM group and the second AM group includes only eight time units. Therefore, it can be learned from FIG. 11C that in 16 time units included in each third counting period between the second AM group and a third AM group, a first time unit corresponds to the slot 8, a second time unit corresponds to the slot 9, and the rest can be deduced by analogy. A sixteenth time unit corresponds to the slot 7.

It can be learned from the mapping relationship shown in Table 3 that the service flow 1 is mapped to the slot 0 to the slot 3, the service flow 2 is mapped to the slot 4 to the slot 7, and the service flow 3 is mapped to the slot 8 to the slot 15. Because the third counting period includes s time units, and the s time units one-to-one correspond to s slots, $UP_2$ of each AM in the first AM group may carry the service flow corresponding to the slot corresponding to each time unit of the third counting period. Therefore, $UP_2$ of first eight AMs in the second AM group separately carries an ID of the service flow 3, $UP_2$ of a ninth AM to a twelfth AM in the second AM group separately carries an ID of the service flow 1, and $UP_2$ of a thirteenth AM to a sixteenth AM in the second AM group separately carries an ID of the service flow 2.

In FIG. 11C, after the second AM group, the first communication apparatus sends, in a first time unit to an eighth time unit of the $1^{st}$ third counting period, the data of the service flow 3, sends, in a ninth time unit to a twelfth time unit of the $1^{st}$ third counting period, the data of the service flow 1, and sends, in a thirteenth time unit to a sixteenth time unit of the $1^{st}$ third counting period, the data of the service flow 2. The rest can be deduced by analogy. A data sending process in another third counting period is similar. The M time units between the second AM group and the third AM group further include one fourth counting period, and the first communication apparatus sends, in a first time unit to an eighth time unit of the fourth counting period, the data of the service flow 3. The second communication apparatus receives, in a corresponding time unit, the data of the service flow 1, the data of the service flow 2, and the data of the service flow 3. Therefore, the second communication apparatus may determine, based on the first padding part of each AM in the $i^{th}$ AM group and the slots separately corresponding to the M time units, the service flows corresponding to the data separately carried in the M time units.

The example 1 to the example 4 are examples based on the division manner 1 of the first counting period. The following shows an example 5 based on the division manner 2 of the first counting period.

Example 5: As shown in FIG. 11D, in the 200G Ethernet technology, regardless of the $i^{th}$ AM group, the first AM group, or the second AM group, the first counting period includes s time units, the first time unit of the first counting period corresponds to the slot 0, the second time unit corresponds to the slot 1, and the rest can be deduced by analogy. The $s^{th}$ time unit corresponds to the slot s−1.

Therefore, $UP_2$ of the first four AMs in the first AM group separately carries IDs of the service flows corresponding to the slot 0 to the slot 3, and $UP_2$ of the last four AMs in the first AM group separately carries IDs of the service flows corresponding to the slot 4 to the slot 7. $UP_2$ of the first four AMs in the second AM group separately carries the IDs of the service flows corresponding to the slot 0 to the slot 3, and $UP_2$ of the last four AMs in the second AM group separately carries the IDs of the service flows corresponding to the slot 4 to the slot 7.

It can be learned from the foregoing that in the division manner 2 of the first counting period, in the first counting period included in M time units between different AM groups, in the s time units of the first counting period, the first time unit corresponds to the slot 0, the second time unit corresponds to the slot 1, and the rest can be deduced by analogy. The $s^{th}$ time unit corresponds to the slot s−1. In other words, slots corresponding to different time units of a same first counting period does not vary with AM groups. Therefore, in this implementation, the first communication apparatus may use only the first padding part of the first AM group in the serial data stream to identify the service flow of the slot corresponding to the time unit corresponding to the first counting period, and does not need to identify the service flow of each AM group in the serial data stream. In other words, when the mapping relationship between the slots in the first calendar and the plurality of service flows changes, the first communication apparatus may use $UP_2$ of the AM in the AM group to identify the service flow corresponding to the slot in the first calendar. This is not limited in this application.

It can be learned from the example that the first communication apparatus may carry, by using the $i^{th}$ AM group, the ID of the service flow corresponding to the slot of the first calendar, and the slot corresponding to the first time unit of the $1^{st}$ counting period in the M time units between the $i^{th}$ AM group and the $(i+1)^{th}$ AM group.

It should be noted that, regardless of the division manner 1 or the division manner 2 of the first counting period, when M is evenly divided by s, a first time unit of a $1^{st}$ first counting period between adjacent AM groups corresponds to the slot 0. Then, the first communication apparatus does not need to identify, by using $UP_1$ of a first AM in each AM group in the serial data stream, an ID of a slot corresponding to the first time unit of the $1^{st}$ count period included in the M time units between the AM groups. For example, the first communication apparatus may use a first AM in the first AM group in the serial data stream to identify the ID of the slot corresponding to the first time unit of the $1^{st}$ counting period included in the M time units between adjacent AM groups. In addition, when M is evenly divided by s, the first communication apparatus does not need to identify, by using $UP_2$ of the AM in each AM group in the serial data stream, the service flow corresponding to the slot of the first calendar; and may identify, by using $UP_2$ of the AM in the AM group, the service flow corresponding to the slot in the first calendar when the mapping relationship between the slots of the first calendar and the plurality of service flows changes. This is not limited in this application.

In this embodiment, the first communication apparatus is compatible with an architecture of the existing Ethernet technology in a manner in which the $i^{th}$ AM group carries the mapping relationship between the slots of the first calendar and the plurality of service flows. This implements indication of a mapping relationship between a slot and a service flow without introducing additional signaling overheads. In addition, because the first counting period includes s time units, the $i^{th}$ AM group may be used to identify a slot corresponding to each time unit in the first counting period. A remainder obtained by dividing the quantity M of time units included between the $i^{th}$ AM group and the $(i+1)^{th}$ AM group by the quantity s of slots is not 0, and slots corresponding to time units that are at a same location of the first counting period and that are included between different AM groups may change. Therefore, the first communication apparatus may identify, by using the AM group, a service flow of a slot corresponding to each time unit in the first counting period.

In addition, because the quantity M of time units between two adjacent AM groups is not necessarily exactly divided by the quantity s of slots included in the first calendar, the first AM in the AM group is used to identify the slot, of the first calendar, that corresponds to the first time unit of the $1^{st}$ counting period in the M time units between the $i^{th}$ AM group and the $(i+1)^{th}$ AM group. Therefore, a receiving end device determines slots corresponding to the M time units, and then determines, based on the mapping relationship, a service flow corresponding to each slot, to determine a service flow corresponding to data carried in the M time units.

In embodiments of this application, in the embodiment shown in FIG. 8A, the first communication apparatus sends the data of the plurality of service flows to the second communication apparatus by using the plurality of logical lanes. For a specific data distribution process, refer to the distribution procedure shown in FIG. 6.

The M time units between the $i^{th}$ AM group and the $(i+1)^{th}$ AM group include N first counting periods, the first calendar includes s slots, each time unit of the first counting period corresponds to one slot of the first calendar, and different time units of a same first counting period correspond to different slots of the first calendar.

There are a plurality of division granularities of time units. For example, the time unit is duration for sending one 257-bit code block, duration for sending two 257-bit code blocks, or other duration. This is not limited in this application.

When a data distribution granularity of the first communication apparatus is a distribution granularity of one time unit, a relationship may be established between the slot of the first calendar and the logical lane. The following describes three possible relationships between the slots of the first calendar and the plurality of logical lanes with reference to FIG. 12A, FIG. 13A, and FIG. 14A.

Relationship 1: A quantity Q of logical lanes included in the plurality of logical lanes is equal to K multiplied by the quantity s of slots included in the first calendar, and a remainder obtained by dividing the quantity M of time units between two adjacent AM groups by the quantity Q of logical lanes included in the plurality of logical lanes is 0, where M, K, Q, and s are all integers greater than or equal to 2. In other words, Q mod s=0, Q=K×s, and M mod Q=0. “mod” indicates a modulo operation.

In this case, each slot of the first calendar corresponds to K logical lanes in the plurality of logical lanes, and the K logical lanes corresponding to different slots are different. To ensure that AMs in each AM group can be accurately distributed to corresponding logical lanes, the quantity M of time units between two adjacent AM groups should be an integer multiple of the quantity Q of logical lanes included in the plurality of logical lanes.

Figure 12A:
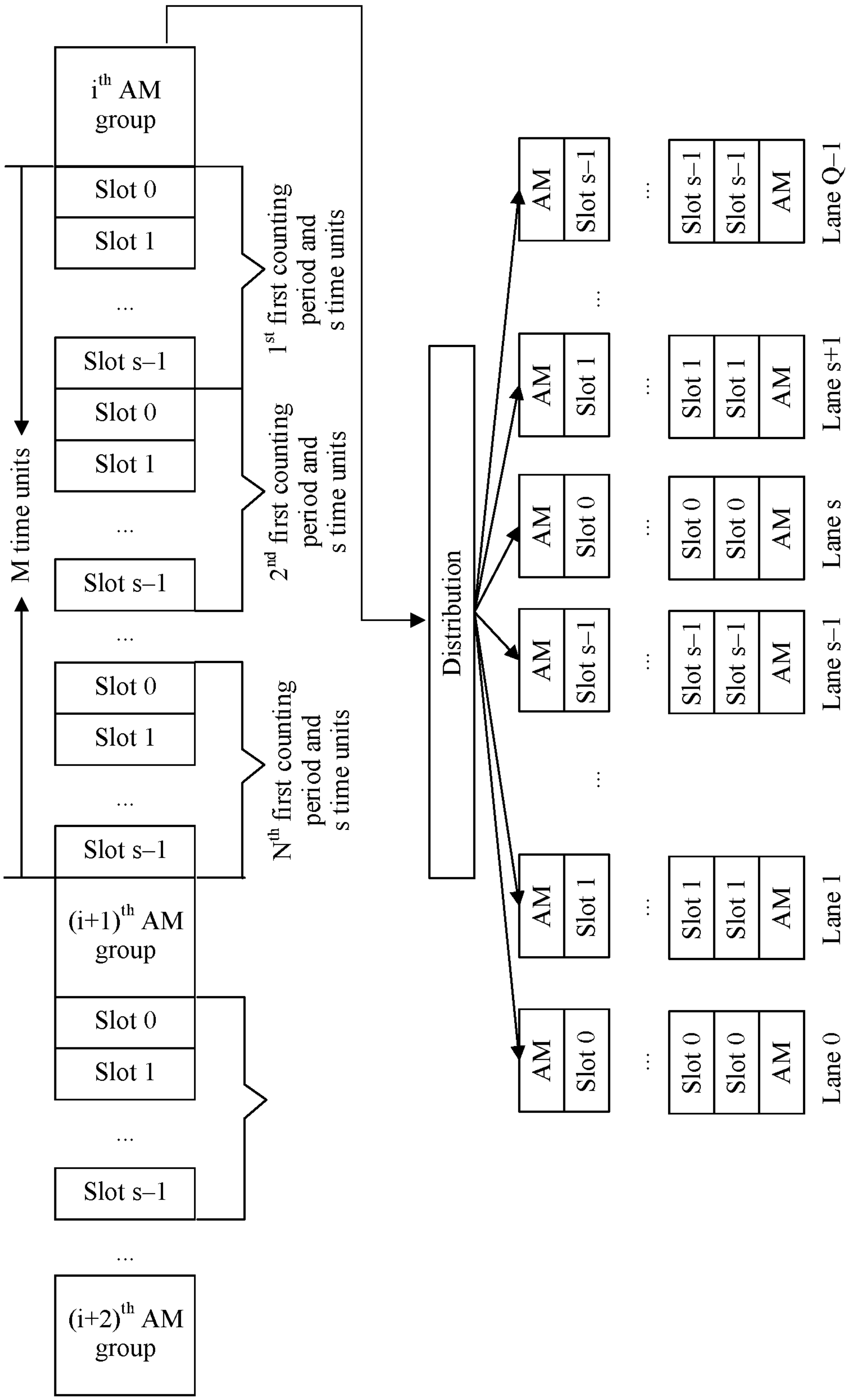
FIG. 12A is a diagram of mapping between a slot of a first calendar and a plurality of logical lanes according to an embodiment of this application.

For example, as shown in FIG. 12A, the time unit is duration for sending one 257-bit code block. The first counting period includes s time units, and a quantity of logical lanes is Q. Then, code blocks respectively corresponding to the slot 0, the slot 1, the slot 2, the slot 3, . . . , and the slot s−1 in the first counting period are sequentially distributed to a logical lane lane 0 to a logical lane lane s−1. Code blocks respectively corresponding to the slot 0, the slot 1, the slot 2, the slot 3, . . . , and the slot s−1 in the second counting period are sequentially distributed to a logical lane lane s to a logical lane lane (2s−1), and the rest can be deduced by analogy.

It can be learned from the descriptions in FIG. 12A that one slot corresponds to only K logical lanes in the plurality of logical lanes. Therefore, when any one or more of the K logical lanes are faulty, only data of the slot is affected, and data of all other slots is not affected, to improve data transmission performance.

Figure 12B:
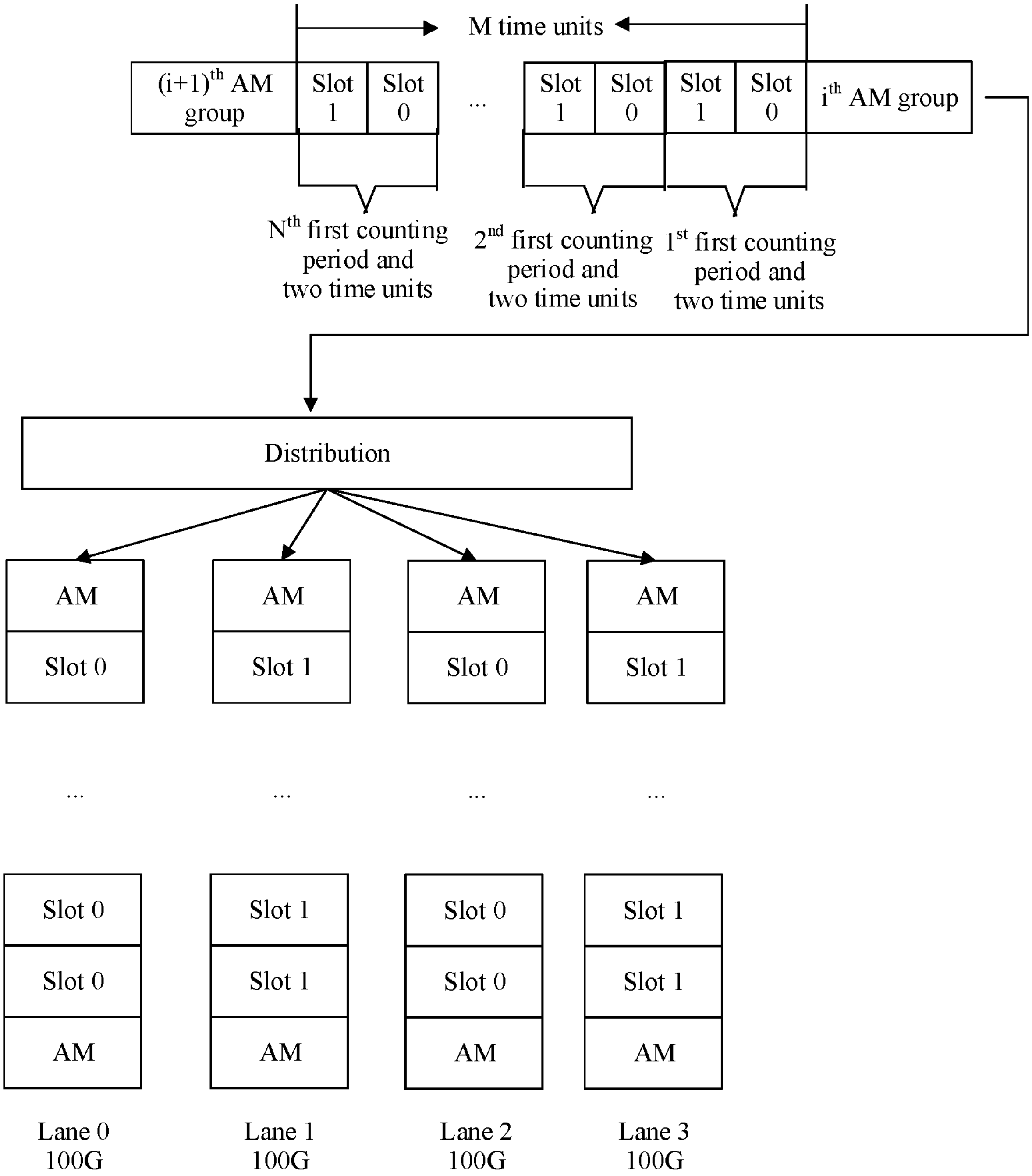
FIG. 12B is a diagram of mapping between one slot of a first calendar and two logical lanes in a plurality of logical lanes according to an embodiment of this application.

The following describes the relationship 1 between the slots and the logical lanes with reference to an example in FIG. 12B.

In the standard 400G Ethernet technology, distribution and interleaving are performed in a unit of 10 bits. One slot (257-bit code block) is distributed to 16 logical lanes. If one logical lane is faulty, data of all slots is affected. To avoid the problem, this embodiment of this application provides the following solution: The 400G Ethernet technology is newly defined to include four logical lanes, and each logical lane supports a 100G bandwidth. As shown in FIG. 12B, in a serial 257-bit code block stream, an AM group (which includes eight 257-bit code blocks, and details are shown in the foregoing related descriptions) is inserted at an interval of 4×40958 257-bit code blocks.

As shown in FIG. 12B, each first counting period includes two time units (the time unit is duration for sending one 257-bit code block). The first time unit of the first counting period corresponds to the slot 0, the second time unit of the first counting period corresponds to the slot 1, and the quantity of logical lanes is 4. Herein, distribution is performed by using a 257-bit code block as a distribution granularity. It can be learned from FIG. 12B that a code block corresponding to the slot 0 is distributed to the lane 0 and a lane 2, and a code block corresponding to the slot 1 is distributed to a lane 1 and a lane 3. In other words, one slot is mapped to a part of the plurality of logical lanes. FIG. 12B shows that one slot is mapped to two logical lanes in four logical lanes. The first communication apparatus uses the technical solution in this embodiment of this application, so that the service flow 1 and the service flow 2 separately occupy a 200G bandwidth. Therefore, the first communication apparatus implements sub-rate allocation, and implements an end-to-end cut-through forwarding mechanism.

Relationship 2: The quantity s of slots included in the first calendar is equal to K multiplied by the quantity Q of logical lanes included in the plurality of logical lanes, and a remainder obtained by dividing the quantity M of time units between two adjacent AM groups by the quantity Q of logical lanes included in the plurality of logical lanes is 0, where M, K, Q, and s are all integers greater than or equal to 2. In other words, s mod Q=0, s=K×Q, and M mod s=0.

In this case, each of the plurality of logical lanes corresponds to K slots of the first calendar, and the K slots corresponding to different logical lanes are different. To ensure that AMs in each AM group can be accurately distributed to corresponding logical lanes, the quantity M of time units between two adjacent AM groups should be an integer multiple of the quantity Q of logical lanes included in the plurality of logical lanes.

Figure 13A:
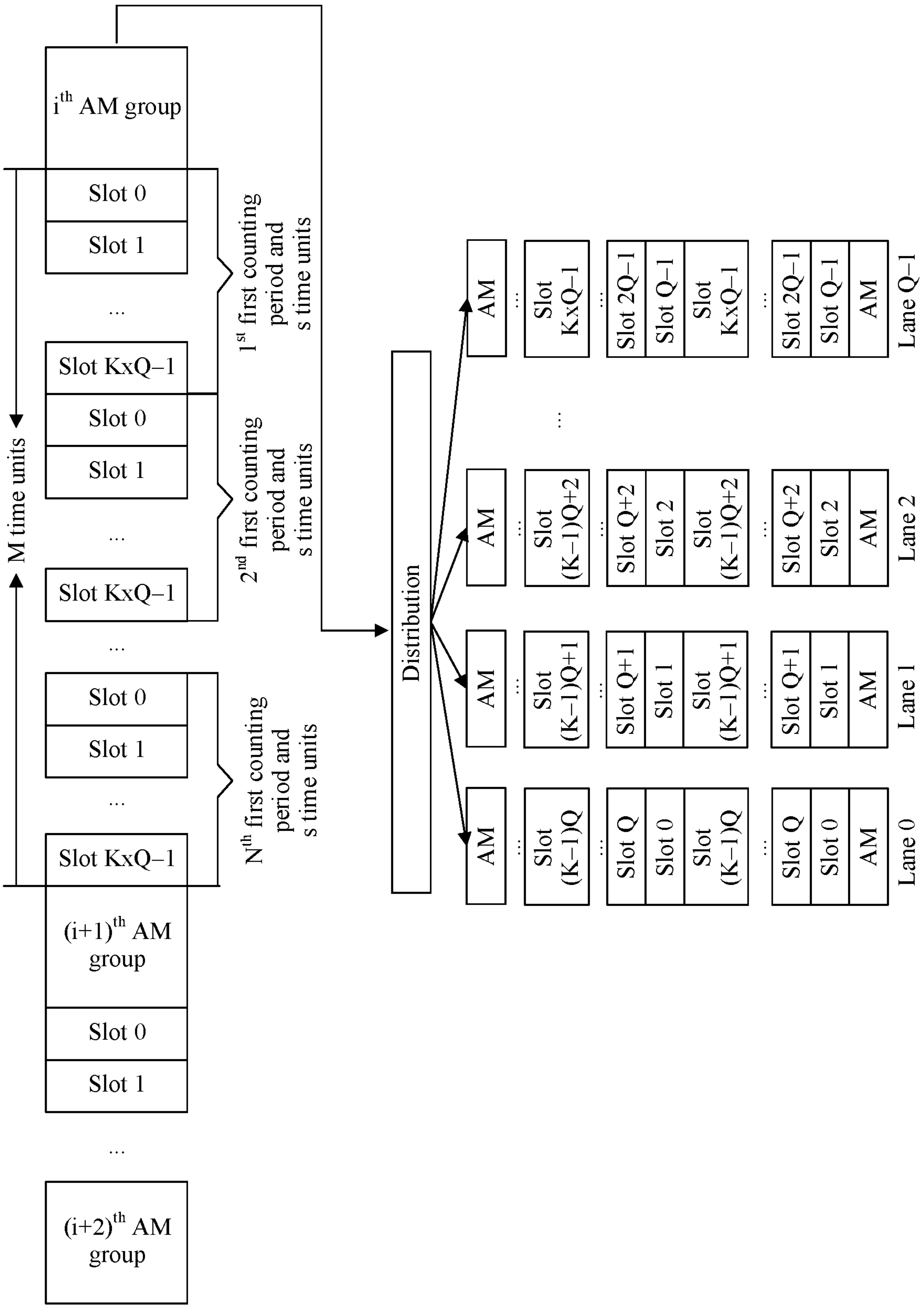
FIG. 13A is a diagram of other mapping between a slot of a first calendar and a plurality of logical lanes according to an embodiment of this application.

For example, as shown in FIG. 13A, the time unit is duration for sending one 257-bit code block. The first counting period includes s time units, and a quantity of logical lanes is Q. Then, the slot 0, a slot Q, a slot 2Q, . . . , and a slot (K−1)Q of the first calendar are distributed to the lane 0, the slot 1, a slot (Q+1), a slot 2(Q+1), . . . , and a slot (K−1)(Q+1) of the first calendar are distributed to the lane 1, and the rest can be deduced by analogy. For details, refer to FIG. 13A.

It can be learned from the related descriptions in FIG. 13A that one logical lane corresponds to K slots. Therefore, when the logical lane is faulty, only data of the K slots is affected, and data of all other slots is not affected, to improve data transmission performance.

Figure 13B:
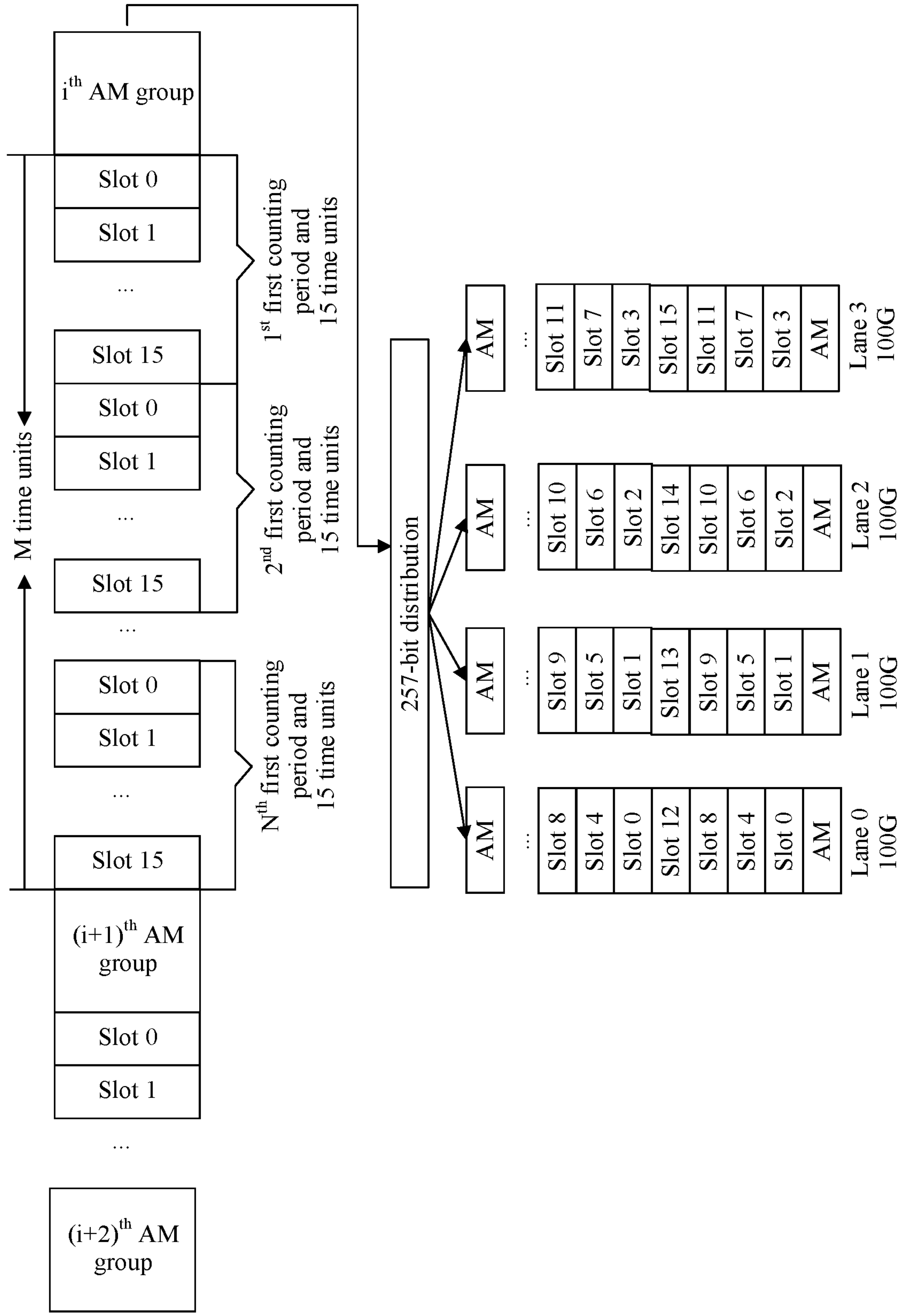
FIG. 13B is a diagram of mapping between four slots of a first calendar and one logical lane in a plurality of logical lanes according to an embodiment of this application.

The following describes the relationship 2 between the slots and the logical lanes with reference to an example in FIG. 13B.

In the standard 400G Ethernet technology, distribution and interleaving are performed in a unit of 10 bits. One slot (257-bit code block) is distributed to 16 logical lanes. If one logical lane is faulty, data of all slots is affected. To avoid the problem, this embodiment of this application provides the following solution: The 400G Ethernet technology is newly defined to include four logical lanes, and each logical lane supports a 100G bandwidth. As shown in FIG. 12B, in a serial 257-bit code block stream, an AM group (which includes eight 257-bit code blocks, and details are shown in the foregoing related descriptions) is inserted at an interval of 4×40958 257-bit code blocks.

As shown in FIG. 13B, each first counting period includes 16 time units (the time unit is duration for sending one 257-bit code block). The slot 0 to the slot 3 of the first calendar correspond to the service flow 1, the slot 4 to the slot 7 of the first calendar correspond to the service flow 2, and the slot 8 to the slot 15 of the first calendar correspond to the service flow 3. The first time unit of the first counting period corresponds to the slot 0, the second time unit of the first counting period corresponds to the slot 1, and the rest can be deduced by analogy. The sixteenth time unit of the first counting period corresponds to the slot 15, and the quantity of logical lanes is 4. Herein, distribution is performed by using a 257-bit code block as a distribution granularity. It can be learned from FIG. 13B that code blocks corresponding to the slot 0, the slot 4, the slot 8, and the slot 12 are distributed to the lane 0. Code blocks corresponding to the slot 1, the slot 5, the slot 9, and the slot 13 are distributed to the lane 1. Code blocks corresponding to the slot 2, the slot 6, the slot 10, and the slot 14 are distributed to the lane 2. Code blocks corresponding to the slot 3, the slot 7, the slot 11, and the slot 15 are distributed to the lane 3. In other words, one logical lane maps data of four slots. Therefore, it can be learned from FIG. 10B that the device D uses the technical solution in this embodiment of this application, to separately map the service flow 1, the service flow 2, and the service flow 3 to corresponding slots of the first calendar. Therefore, the service flow 1 and the service flow 2 separately occupy a 100G bandwidth, and the service flow 3 occupies a 200G bandwidth. The device D implements sub-rate allocation, and implements an end-to-end cut-through forwarding mechanism.

Relationship 3: The quantity s of slots included in the first calendar is equal to the quantity Q of logical lanes included in the plurality of logical lanes, and a remainder obtained by dividing the quantity M of time units between two adjacent AM groups by the quantity Q of logical lanes included in the plurality of logical lanes is 0, that is, s=Q, and M mod Q=0, where s, Q, and M are all integers greater than or equal to 2.

The slot included in the first calendar one-to-one corresponds to the logical lane included in the plurality of logical lanes. To ensure that AMs in each AM group can be accurately distributed to corresponding logical lanes, the quantity M of time units between two adjacent AM groups should be an integer multiple of the quantity Q of logical lanes included in the plurality of logical lanes.

Figure 14A:
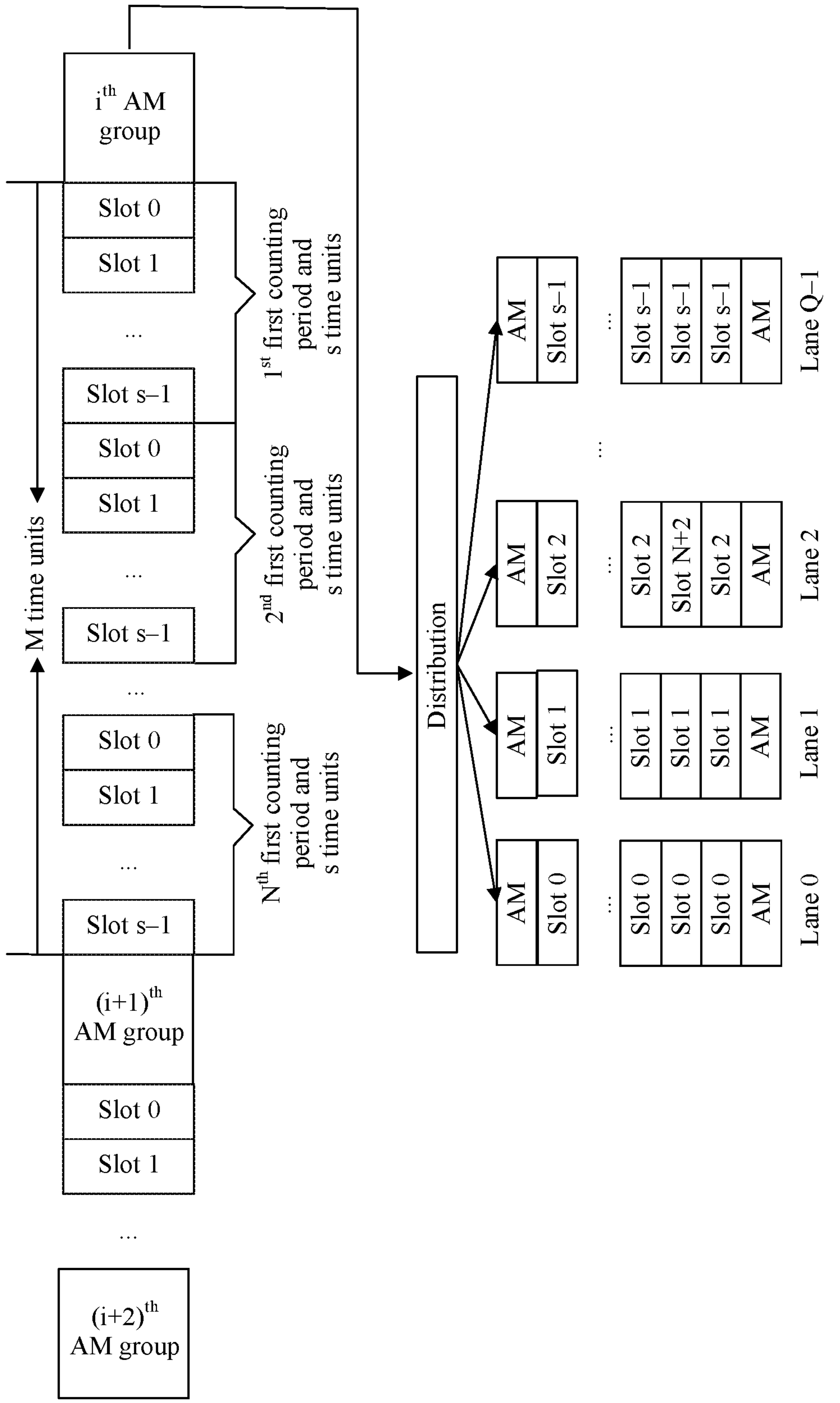
FIG. 14A is a diagram of other mapping between a slot of a first calendar and a plurality of logical lanes according to an embodiment of this application.

For example, as shown in FIG. 14A, the time unit is duration for sending one 257-bit code block. The first counting period includes s time units, a quantity of logical lanes is Q, and s is equal to Q. In this case, the slot 0 of the first calendar is always distributed to the lane 0, the slot 1 is always distributed to the lane 1, and the rest can be deduced by analogy. The slot s−1 is always distributed to a lane (Q−1).

It can be learned from the related descriptions in FIG. 14A that one slot corresponds to only one of the plurality of logical lanes. Therefore, when the logical lane is faulty, only data of one slot corresponding to the logical lane is affected, and data of all other slots is not affected, to improve data transmission performance.

Figure 14B:
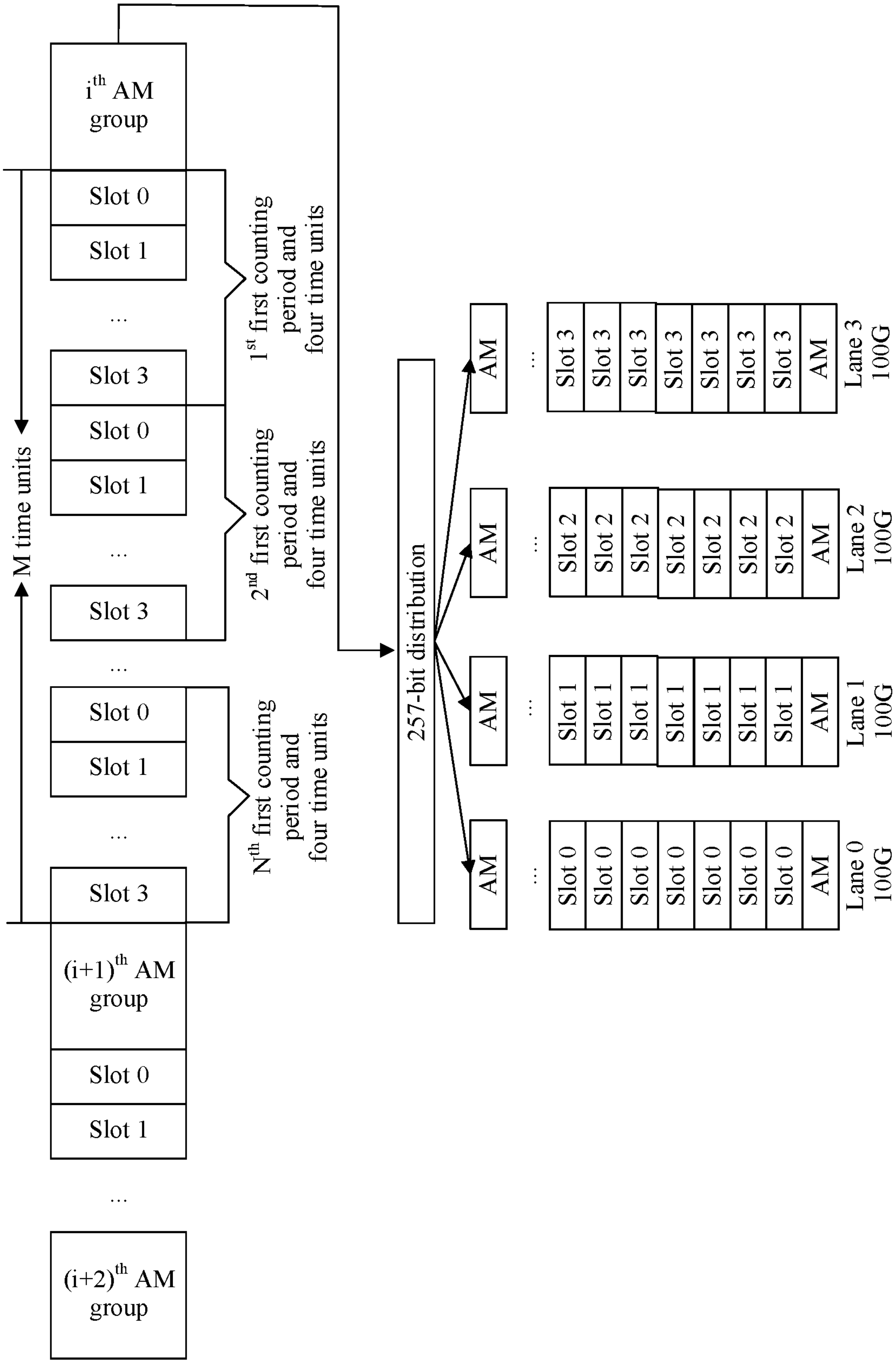
FIG. 14B is a diagram of mapping between one slot of a first calendar and one logical lane in a plurality of logical lanes according to an embodiment of this application.

The following describes the relationship 3 between the slots and the logical lanes with reference to an example in FIG. 14B.

In the standard 400G Ethernet technology, distribution and interleaving are performed in a unit of 10 bits. One slot (257-bit code block) is distributed to 16 logical lanes. If one logical lane is faulty, data of all slots is affected. To avoid the problem, this embodiment of this application provides the following solution: The 400G Ethernet technology is newly defined to include four logical lanes, and each logical lane supports a 100G bandwidth. As shown in FIG. 14B, in a serial 257-bit code block stream, an AM group (which includes eight 257-bit code blocks, and details are shown in the foregoing related descriptions) is inserted at an interval of 4×40958 257-bit code blocks.

It can be learned from FIG. 14B that each first counting period includes four time units. The slot 0 of the first calendar corresponds to the service flow 1, the slot 1 of the first calendar corresponds to the service flow 2, and the slot 2 and the slot 3 of the first calendar correspond to the service flow 3. The first time unit of the first counting period corresponds to the slot 0, the second time unit corresponds to the slot 1, the third time unit corresponds to the slot 2, and the fourth time unit corresponds to the slot 3. Herein, distribution is performed by using a 257-bit code block as a distribution granularity. It can be learned from FIG. 14B that a code block corresponding to the slot 0 is distributed to the lane 0, a code block corresponding to the slot 1 is distributed to the lane 1, a code block corresponding to the slot 2 is distributed to the lane 2, and a code block corresponding to the slot 3 is distributed to the lane 3. In other words, one logical lane maps data of one slot. Therefore, it can be learned from FIG. 10B that the device D uses the technical solution in this embodiment of this application, to separately map the service flow 1, the service flow 2, and the service flow 3 to corresponding slots of the first calendar. Therefore, the service flow 1 and the service flow 2 separately occupy a 100G bandwidth, and the service flow 3 occupies a 200G bandwidth. The device D implements sub-rate allocation, and implements an end-to-end cut-through forwarding mechanism.

It should be noted that the foregoing examples are described by using the 400G Ethernet technology as an example. However, during actual application, this embodiment of this application is also applicable to an Ethernet technology at another speed. This is not limited in this application. For example, this embodiment of this application is also applicable to the 200G Ethernet technology. In addition, in the foregoing examples, the relationship between the slots of the first calendar and the logical lanes is described by using an example in which one time unit is duration for sending one 257-bit code block. During actual application, the time unit may also be other duration. For a time unit with other duration, relationships between the slots of the first calendar and the logical lanes are similar to that in the foregoing examples, and are not described one by one herein again.

The relationship between the slot of the first calendar and the logical lane is described by using an example in which the distribution granularity is one time unit. This embodiment of this application is also applicable to another distribution granularity. For example, distribution is performed by using two time units as a distribution granularity.

It should be noted that, when a plurality of time units are used as a distribution granularity, the relationship between the slots of the first calendar and the logical lanes is any one of the relationship 1 to the relationship 3 shown above, and in each relationship, M mod a=0, where a is the distribution granularity, and a is an integer greater than 1. This can ensure that an AM in each AM group is distributed to a corresponding logical lane according to a distribution rule, to implement alignment of a plurality of logical lanes.

Figure 15:
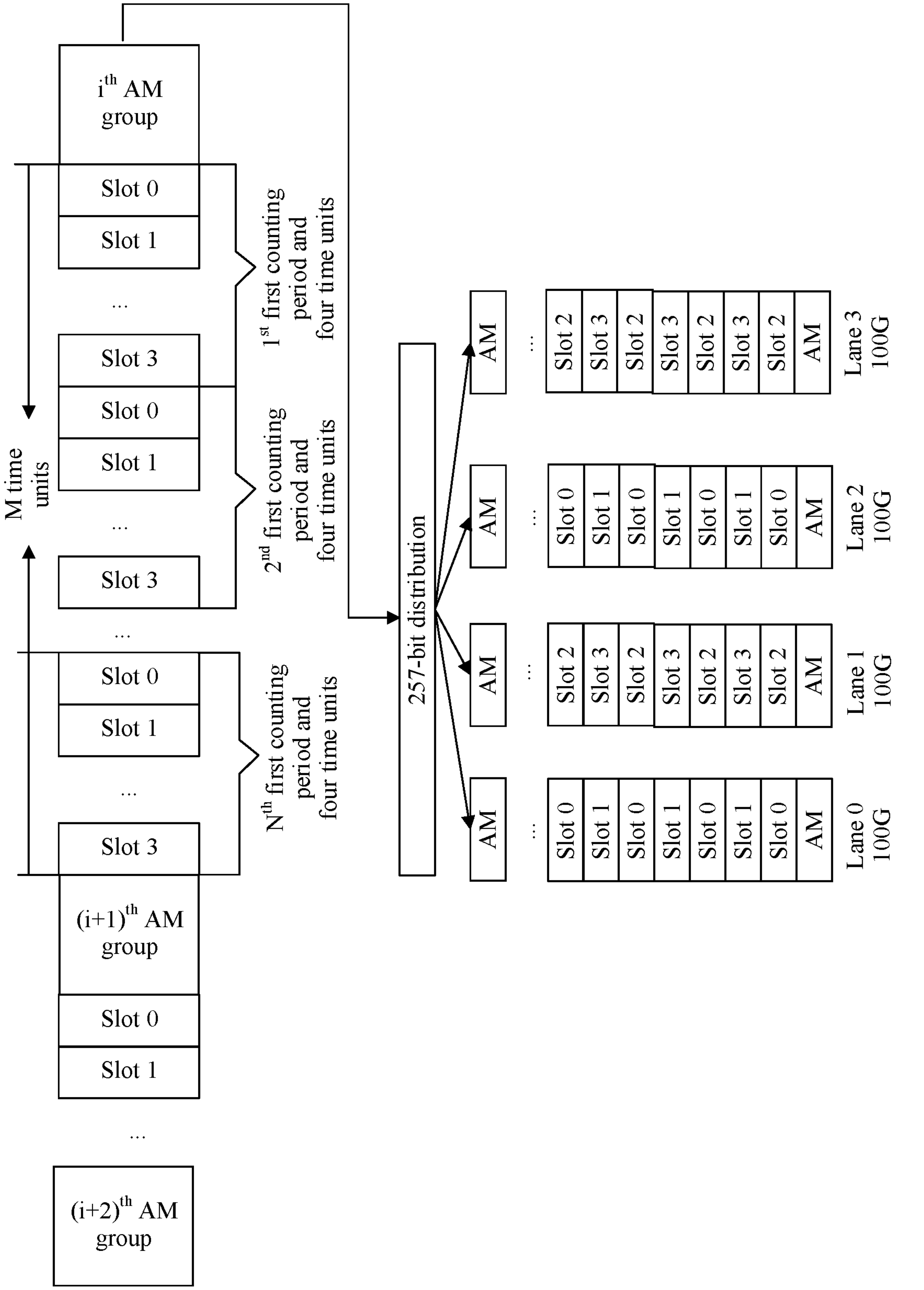
FIG. 15 is a diagram of other mapping between one slot of a first calendar and two logical lanes in a plurality of logical lanes according to an embodiment of this application.

With reference to FIG. 15, the following describes an example in which distribution is performed by using two time units as a distribution granularity.

The 400G Ethernet technology is newly defined to include four logical lanes, and each logical lane supports a 100G bandwidth. As shown in FIG. 14B, in a serial 257-bit code block stream, an AM group (which includes eight 257-bit code blocks, and details are shown in the foregoing related descriptions) is inserted at an interval of 4×40958 257-bit code blocks.

It can be learned from FIG. 15 that each first counting period includes four time units. The slot 0 of the first calendar corresponds to the service flow 1, the slot 1 of the first calendar corresponds to the service flow 2, and the slot 2 and the slot 3 of the first calendar correspond to the service flow 3. The first time unit of the first counting period corresponds to the slot 0, the second time unit corresponds to the slot 1, the third time unit corresponds to the slot 2, and the fourth time unit corresponds to the slot 3. Herein, distribution is performed by using two 257-bit code blocks as a distribution granularity. It can be learned from FIG. 15 that code blocks corresponding to the slot 0 and the slot 1 are distributed to the lane 0, code blocks corresponding to the slot 2 and the slot 3 are distributed to the lane 1, code blocks corresponding to the slot 0 and the slot 1 are distributed to the lane 2, and code blocks corresponding to the slot 2 and the slot 3 are distributed to the lane 3. In other words, data of one slot is mapped to two logical lanes. Therefore, it can be learned from FIG. 10B that the device D uses the technical solution in this embodiment of this application, to separately map the service flow 1, the service flow 2, and the service flow 3 to corresponding slots of the first calendar. Therefore, the service flow 1 and the service flow 2 separately occupy a 100G bandwidth, and the service flow 3 occupies a 200G bandwidth. The device D implements sub-rate allocation, and implements an end-to-end cut-through forwarding mechanism.

Figure 16:
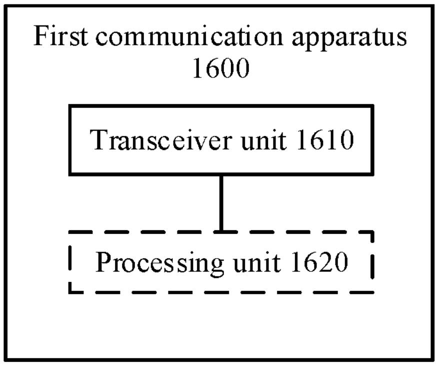
FIG. 16 is a diagram of a structure of a first communication apparatus according to an embodiment of this application.
Figure 17:
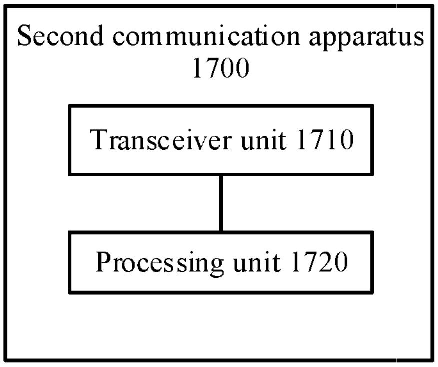
FIG. 17 is a diagram of a structure of a second communication apparatus according to an embodiment of this application.
Figure 18:
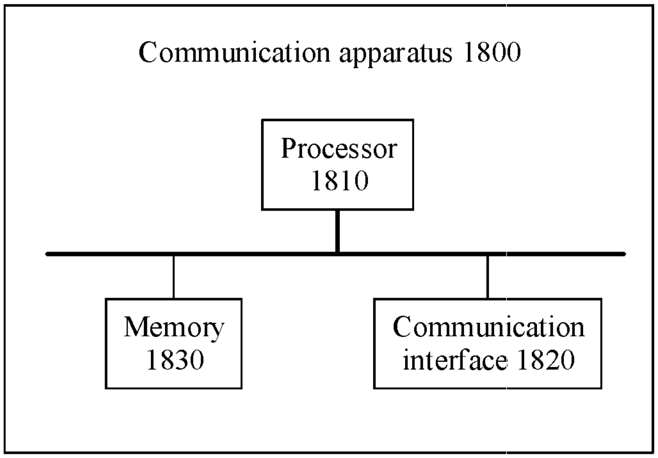
FIG. 18 is a diagram of a structure of a communication apparatus according to an embodiment of this application.

The following describes in detail the first communication apparatus and the second communication apparatus in embodiments of this application with reference to FIG. 16 to FIG. 18.

FIG. 16 is a schematic diagram of a first communication apparatus according to an embodiment of this application. The first communication apparatus 1600 may correspond to the first communication apparatus described in the foregoing method, or may correspond to a chip or a component of the first communication apparatus. In addition, modules or units in the first communication apparatus 1600 are separately configured to perform actions or processing processes performed by the first communication apparatus in the foregoing method. As shown in FIG. 16, the first communication apparatus 1600 includes a transceiver unit 1610. In an embodiment, the first communication apparatus 1600 further includes a processing unit 1620.

The transceiver unit 1610 is configured to: send an $i^{th}$ AM group to a second communication apparatus, where the $i^{th}$ AM group is used to align a plurality of logical lanes, and i is an integer greater than or equal to 1; and send first data of a plurality of service flows to the second communication apparatus based on a mapping relationship by using the plurality of logical lanes, where the first data is carried in M time units between the $i^{th}$ AM group and an $(i+1)^{th}$ AM group, M is an integer greater than or equal to 2, a first counting period includes s time units, each time unit of the first counting period corresponds to one slot of a first calendar, different time units of a same first counting period correspond to different slots of the first calendar, and N is an integer greater than or equal to 1; and send the $(i+1)^{th}$ AM group to the second communication apparatus, where a transmission time interval between sending the $i^{th}$ AM group by the transceiver unit 1610 and sending the $(i+1)^{th}$ AM group by the transceiver unit 1610 is the M time units, where s is an integer greater than or equal to 2.

In a possible implementation, the M time units between the $i^{th}$ AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

In another possible implementation, if a remainder obtained by dividing M by s is r, the second counting period includes r time units, and r is an integer greater than or equal to 1 and less than s.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In another possible implementation, the processing unit 1620 is configured to generate the $i^{th}$ AM group based on the mapping relationship, where the $i^{th}$ AM group indicates service flows corresponding to the slots of the first calendar.

In another possible implementation, a first AM in the $i^{th}$ AM group indicates a slot, of the first calendar, that corresponds to a first time unit of a $1^{st}$ counting period in the M time units between the $i^{th}$ AM group and the $(i+1)^{th}$ AM group.

The first communication apparatus shown in FIG. 16 is further configured to perform the following solutions.

The transceiver unit 1610 is configured to send first data of a plurality of service flows to a second communication apparatus based on a mapping relationship by using a plurality of logical lanes, where the first data is carried in M time units, and M is an integer greater than or equal to 2.

The M time units include N first counting periods and at least one second counting period, the first counting period includes s time units, each time unit of the first counting period corresponds to one slot of a first calendar, and different time units of a same first counting period correspond to different slots of the first calendar, where s is an integer greater than or equal to 2, and N is an integer greater than or equal to 1.

The second counting period includes only a part of the s time units, each time unit of the second counting period corresponds to one slot of the first calendar, and different time units of a same second counting period correspond to different slots of the first calendar.

In a possible implementation, the transceiver unit 1610 is further configured to:

- send an $i^{th}$ AM group to the second communication apparatus, where i is an integer greater than or equal to 1; and
- send an $(i+1)^{th}$ AM group to the second communication apparatus, where the $i^{th}$ AM group and the $(i+1)^{th}$ AM group are used to align the plurality of logical lanes, and a transmission time interval between sending the $i^{th}$ AM group by the transceiver unit 1610 and sending the $(i+1)^{th}$ AM group by the transceiver unit 1610 is the M time units. In other words, the M time units carrying the first data is the M time units between the $i^{th}$ AM group and the $(i+1)^{th}$ AM group.

In another possible implementation, the first communication apparatus further includes a processing unit 1620.

The processing unit 1620 is configured to generate the $i^{th}$ AM group based on the mapping relationship, where the $i^{th}$ AM group indicates service flows separately corresponding to the slots of the first calendar.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{h}$AM group.

It should be understood that for a specific process in which the units in the first communication apparatus 1600 perform the foregoing corresponding operations, refer to descriptions in the method embodiments. For brevity, details are not described herein again.

FIG. 17 is a schematic diagram of a second communication apparatus according to an embodiment of this application. The second communication apparatus 1700 may correspond to the second communication apparatus described in the foregoing method, or may correspond to a chip or a component of the second communication apparatus. In addition, modules or units in the second communication apparatus 1700 are separately configured to perform actions or processing processes performed by the second communication apparatus in the foregoing method. As shown in FIG. 17, the second communication apparatus 1700 includes a transceiver unit 1710 and a processing unit 1720.

The transceiver unit 1710 is configured to: receive an $i^{th}$ AM group sent by a first communication apparatus, where the $i^{th}$ AM group is used to align a plurality of logical lanes, and i is an integer greater than or equal to 1; and receive, in M time units between the $i^{th}$ AM group and an $(i+1)^{th}$ AM group, first data that is of a plurality of service flows and that is sent by the first communication apparatus by using the plurality of logical lanes, where M is an integer greater than or equal to 2.

The processing unit 1720 is configured to: determine service flows corresponding to data separately carried in the M time units between the $i^{th}$ AM group and the $(i+1)^{th}$ AM group.

There is a mapping relationship between the plurality of service flows and a slot of a first calendar, and the first calendar includes s slots. The M time units between the $i^{th}$ AM group and the $(i+1)^{th}$ AM group include N first counting periods, the first counting period includes s time units, each time unit of the first counting period corresponds to one slot of the first calendar, and different time units of a same first counting period correspond to different slots of the first calendar, where s is an integer greater than or equal to 2, and N is an integer greater than or equal to 1.

The transceiver unit 1710 is further configured to receive the $(i+1)^{th}$ AM group sent by the first communication apparatus, where a reception time interval between receiving the $i^{th}$ AM group by the transceiver unit from the first communication apparatus and receiving the $(i+1)^{th}$ AM group by the transceiver unit from the first communication apparatus is the M time units.

In a possible implementation, the M time units between the $i^{th}$AM group and the $(i+1)^{th}$ AM group further includes at least one second counting period, the second counting period includes only a part of the s time units, each time unit of the second counting period corresponds to one slot of the first calendar, and different time units of a same second counting period correspond to different slots of the first calendar.

In another possible implementation, the at least one second counting period includes one second counting period.

A first time unit included in the second counting period is continuous with a last time unit included in a last counting period in the N first counting periods, and a last time unit included in the second counting period is continuous with a first time unit of the $(i+1)^{th}$ AM group.

Alternatively, a first time unit included in the second counting period is continuous with a last time unit included in the $i^{th}$ AM group, and a last time unit included in the second counting period is continuous with a first time unit of a $1^{st}$ first counting period in the N first counting periods.

In another possible implementation, if a remainder obtained by dividing M by s is r, the second counting period includes r time units, and r is an integer greater than or equal to 1 and less than s.

In another possible implementation, the at least one second counting period includes two second counting periods.

A first time unit included in a $1^{st}$ second counting period in the two second counting periods is continuous with a last time unit included in the $i^{th}$ AM group, and a last time unit included in the $1^{st}$ second counting period is continuous with a first time unit of a $1^{st}$ first counting period in the N first counting periods.

A first time unit included in a $2^{nd}$ second counting period in the two second counting periods is continuous with a last time unit included in a last counting period in the N first counting periods, and a last time unit included in the $2^{nd}$ second counting period is continuous with a first time unit of the $(i+1)^{th}$ AM group.

In another possible implementation, if a remainder obtained by dividing M by s is r, the two second counting periods include r time units, and r is an integer greater than or equal to 1 and less than s. In this possible implementation, the remainder obtained by dividing M by s is used to determine a quantity of time units included in the two second counting periods.

In another possible implementation, each slot included in the first calendar corresponds to only a part of the plurality of logical lanes.

In another possible implementation, if a quantity of slots included in the first calendar is equal to a quantity of logical lanes included in the plurality of logical lanes, the slots included in the first calendar one-to-one correspond to the logical lanes included in the plurality of logical lanes.

In another possible implementation, if a quantity of logical lanes included in the plurality of logical lanes is equal to K multiplied by a quantity of slots included in the first calendar, and K is an integer greater than or equal to 2, each slot of the first calendar corresponds to K logical lanes in the plurality of logical lanes, and the K logical lanes corresponding to different slots of the first calendar are different.

In another possible implementation, if a quantity of slots included in the first calendar is equal to K multiplied by a quantity of logical lanes included in the plurality of logical lanes, and K is an integer greater than or equal to 2, each of the plurality of logical lanes corresponds to K slots of the first calendar, and the K slots corresponding to different logical lanes are different.

In another possible implementation, the processing unit 1720 is configured to:

determine slots, of the first calendar, separately corresponding to the M time units between the $i^{th}$ AM group and the $(i+1)^{th}$ AM group; and determine, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group.

In another possible implementation, the $i^{th}$ AM group indicates service flows separately corresponding to the slots of the first calendar, and the processing unit 1720 is configured to:

determine, based on the $i^{th}$ AM group and the slots, of the first calendar, separately corresponding to the M time units between the $i^{th}$ AM group and the $(i+1)^{th}$ AM group, the service flows corresponding to data separately carried in the M time units between the $i^{th}$ AM group and the $(i+1)^{th}$ AM group.

In another possible implementation, a first AM in the $i^{th}$ AM group indicates a slot, of the first calendar, that corresponds to a first time unit of a $1^{st}$ counting period in the M time units between the $i^{th}$ AM group and the $(i+1)^{th}$ AM group, and the processing unit 1720 is configured to:

determine, based on the first AM in the $i^{th}$ AM group, the slots, of the first calendar, separately corresponding to the M time units between the $i^{th}$ AM group and the $(i+1)^{th}$ AM group.

The second communication apparatus 1700 shown in FIG. 17 is configured to perform the following technical solutions.

The transceiver unit 1710 is configured to receive, in M time units, first data that is of a plurality of service flows and that is sent by a first communication apparatus by using a plurality of logical lanes, where M is an integer greater than or equal to 2.

The processing unit 1720 is configured to determine service flows corresponding to data separately carried in the M time units.

There is a mapping relationship between the plurality of service flows and a slot of a first calendar, and the first calendar includes s slots.

The M time units between the $i^{th}$ AM group and the $(i+1)^{th}$ AM group include N first counting periods and at least one second counting period, s is an integer greater than or equal to 2, and N is an integer greater than or equal to 1.

Each time unit of the first counting period corresponds to one slot of the first calendar, and different time units of a same first counting period correspond to different slots of the first calendar.

The second counting period includes only a part of the s time units, each time unit of the second counting period corresponds to one slot of the first calendar, and different time units of a same second counting period correspond to different slots of the first calendar.

In a possible implementation, the transceiver unit 1710 is further configured to:

receive an $i^{th}$ AM group sent by the first communication apparatus, where i is an integer greater than or equal to 1; and receive an $(i+1)^{th}$ AM group sent by the first communication apparatus.

The $i^{th}$ AM group and the $(i+1)^{th}$ AM group are used to align the plurality of logical lanes, and a reception time interval between receiving the $i^{th}$ AM group by the transceiver unit 1710 from the first communication apparatus and receiving the $(i+1)^{th}$ AM group by the transceiver unit 1710 from the first communication apparatus is the M time units.

In another possible implementation, the processing unit 1720 is configured to: determine slots, of the first calendar, separately corresponding to the M time units; and determine, based on the slots, of the first calendar, separately corresponding to the M time units, the service flows corresponding to data separately carried in the M time units.

In another possible implementation, the $i^{th}$ AM group indicates service flows corresponding to the slots of the first calendar, and the processing unit 1720 is configured to:

determine, based on the $i^{th}$ AM group and the slots, of the first calendar, separately corresponding to the M time units, the service flows corresponding to data separately carried in the M time units between the $i^{th}$ AM group and the $(i+1)^{th}$ AM group.

In another possible implementation, a first AM in the $i^{th}$ AM group is used to identify a slot, of the first calendar, that corresponds to a first time unit of a $1^{st}$ counting period in the M time units between the $i^{th}$ AM group and the $(i+1)^{th}$ AM group, and the processing unit 1720 is configured to:

determine, based on the first AM in the $i^{th}$ AM group, the slots, of the first calendar, separately corresponding to the M time units between the $i^{th}$ AM group and the $(i+1)^{th}$ AM group.

It should be understood that for a specific process in which the units in the second communication apparatus 1700 perform the foregoing corresponding operations, refer to descriptions in the method embodiments. For brevity, details are not described herein again.

The first communication apparatus 1600 in the foregoing solutions has functions to implement corresponding operations performed by the first communication apparatus. The second communication apparatus 1700 in the foregoing solutions has functions to implement corresponding operations performed by the second communication apparatus. The functions may be implemented by hardware or software, or may be implemented by hardware by executing corresponding software. The hardware or the software includes one or more modules corresponding to the foregoing functions. For example, the transceiver unit may be replaced with a communication interface, and another unit such as a processing unit may be replaced with a processor, to respectively perform a sending operation, a receiving operation, and a related processing operation in the method embodiments. In this embodiment of this application, a communication interface of an apparatus is used by the apparatus to communicate with another device. For example, the communication interface may be a transmitter, a receiver, a transceiver, a circuit, a bus, a module, a pin, or another type of communication interface. This is not limited in this embodiment of this application.

In an implementation process, the processor may be configured to perform, for example, but not limited to, baseband-related processing, and the communication interface may be configured to perform, for example, but not limited to, information exchange. The foregoing components may be separately disposed on chips independent of each other, or at least some or all of the components may be disposed on a same chip. For example, the processor may further be divided into an analog baseband processor and a digital baseband processor. The analog baseband processor and the communication interface may be integrated on a same chip, and the digital baseband processor may be disposed on an independent chip. With continuous development of integrated circuit technologies, more components may be integrated on a same chip. For example, the digital baseband processor and a plurality of application processors (for example, but not limited to, a graphics processor and a multimedia processor) may be integrated on a same chip. The chip may be referred to as a system on chip (system on chip, SoC). Whether the components are separately disposed on different chips or integrated and disposed on one or more chips usually depends on a requirement of a product design. An implementation form of the component is not limited in this embodiment of this application.

It may be understood that the processor in the foregoing embodiments may separately implement, by executing program instructions by using a hardware platform having a processor and a communication interface, functions of the processor in any design in the foregoing embodiments of this application. In view of this, as shown in FIG. 18, an embodiment of this application provides a schematic diagram of a communication apparatus 1800. The communication apparatus 1800 includes a processor 1810, a communication interface 1820, and a memory 1830. The processor 1810, the communication interface 1820, and the memory 1830 are coupled to communicate with each other. The memory 1830 is configured to store instructions. The processor 1810 is configured to execute the instructions stored in the memory 1830, to control the communication interface 1820 to send a signal and/or receive a signal. Coupling in embodiments of this application is indirect coupling or a communication connection between apparatuses, units, or modules, and may be in an electrical, mechanical, or another form, and is used for information exchange between the apparatuses, units, or modules.

In a possible implementation, if the communication apparatus 1800 is the first communication apparatus, the communication apparatus 1800 is configured to perform some or all of the operations performed by the first communication apparatus in the method embodiments. If the communication apparatus 1800 is the second communication apparatus, the communication apparatus 1800 is configured to perform some or all of the operations performed by the second communication apparatus in the method embodiments.

It should be understood that the first communication apparatus in FIG. 16 or the second communication apparatus in FIG. 17 in embodiments of this application may be implemented by using the communication apparatus 1800 in FIG. 18, and may be configured to perform operations and/or procedures corresponding to the first communication apparatus and the second communication apparatus in the method embodiments.

Figure 19:
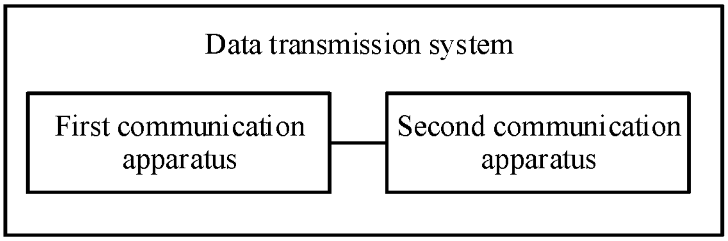
FIG. 19 is a diagram of a data transmission system according to an embodiment of this application.

An embodiment of this application further provides a data transmission system. Refer to FIG. 19. The data transmission system includes the first communication apparatus shown in FIG. 16 and the second communication apparatus shown in FIG. 17. The first communication apparatus shown in FIG. 16 is configured to perform some or all of the operations performed by the first communication apparatus in the method embodiments. The second communication apparatus shown in FIG. 17 is configured to perform some or all of the operations performed by the second communication apparatus in the method embodiments.

It may be understood that the methods, the procedures, the operations, or the operations in the designs described in the embodiments of this application can be implemented in a one-to-one correspondence manner by computer software, electronic hardware, or a combination of computer software and electronic hardware. Whether these functions are performed by hardware or software depends on particular applications and design constraints of the technical solutions. For example, in terms of good universality, low costs, and decoupling between software and hardware, program instructions may be executed to implement the functions. For another example, in terms of system performance and reliability, a dedicated circuit may be used to implement the functions. A person of ordinary skill may use different methods to implement the described functions for each particular application. This is not limited herein.

According to the method provided in embodiments of this application, this application further provides a computer program product. The computer program product includes computer program code. When the computer program code is run on a computer, the computer is enabled to perform the method in the foregoing embodiments. The embodiments in this application may also be combined with each other.

According to the method provided in embodiments of this application, this application further provides a computer-readable medium. The computer-readable medium stores program code. When the program code is run on a computer, the computer is enabled to perform the method in the foregoing embodiments.

According to the method provided in embodiments of this application, this application further provides a chip. The chip includes a processor, and the processor is configured to perform operations in the method embodiments. In an embodiment, the chip further includes a memory. The memory is coupled to the processor.

In embodiments of this application, it should be noted that the method embodiments in embodiments of this application may be applied to the processor, or may be implemented by the processor. The processor may be an integrated circuit chip and has a signal processing capability. In an implementation process, operations in the method embodiments can be implemented by using a hardware-integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component, to implement or perform the methods, the operations, and logical block diagrams that are disclosed in embodiments of this application. The general-purpose processor may be a microprocessor, any conventional processor, or the like.

It may be understood that the memory in embodiments of this application may be a volatile memory or a nonvolatile memory, or may include both a volatile memory and a nonvolatile memory. The non-volatile memory may be a read-only memory (ROM), a programmable read-only memory (PROM), an erasable programmable read-only memory EPROM), an electrically erasable programmable read-only memory (EEPROM), or a flash memory. The volatile memory may be a random access memory (RAM), used as an external cache. There are a plurality of different types of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this application. The foregoing storage medium includes any medium that can store program code, for example, a USB flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A data transmission method comprising:

sending, by a first communication apparatus, an $i^{th}$ alignment marker (AM) group to a second communication apparatus, wherein the $i^{th}$ AM group is used to align a plurality of logical lanes, and i is an integer greater than or equal to 1;

sending, by the first communication apparatus, first data of a plurality of service flows to the second communication apparatus based on a mapping relationship by using the plurality of logical lanes, wherein the first data is carried in M time units between the $i^{th}$ AM group and an $(i+1)^{th}$ AM group, and M is an integer greater than or equal to 2, wherein the mapping relationship is a mapping relationship between a slot of a first calendar and the plurality of service flows, wherein the first calendar comprises s slots, and s is an integer greater than or equal to 2; and the M time units between the $i^{th}$ AM group and the $(i+1)^{th}$ AM group comprise N first counting periods, each of the first counting periods comprises s time units, each time unit of a corresponding first counting period corresponds to one slot of the first calendar, different time units of a same first counting period correspond to different slots of the first calendar, and N is an integer greater than or equal to 1; and sending, by the first communication apparatus, the $(i+1)^{th}$ AM group to the second communication apparatus, wherein a transmission time interval between sending the $i^{th}$ AM group by the first communication apparatus and sending the $(i+1)^{th}$ AM group by the first communication apparatus is the M time units.

2. The method according to claim 1, wherein the M time units between the $i^{th}$ AM group and the $(i+1)^{th}$ AM group further comprise at least one second counting period, the second counting period comprises a part of the s time units, each time unit of the second counting period corresponds to one slot of the first calendar, and different time units of a same second counting period correspond to different slots of the first calendar.

3. The method according to claim 2, wherein the at least one second counting period comprises one second counting period; and wherein a first time unit within the second counting period is continuous with a last time unit within a last counting period in the N first counting periods, and a last time unit within the second counting period is continuous with a first time unit of the $(i+1)^{th}$ AM group; or a first time unit within the second counting period is continuous with a last time unit within the $i^{th}$ AM group, and a last time unit within the second counting period is continuous with a first time unit of a first counting period in the N first counting periods.

4. The method according to claim 3, wherein in response to a remainder obtained by dividing M by s being r, the second counting period comprises r time units, and r is an integer greater than or equal to 1 and less than s.

5. The method according to claim 2, wherein the at least one second counting period comprises two second counting period;

a first time unit within a first second counting period in the two second counting periods is continuous with a last time unit comprised in the $i^{th}$ AM group, and a last time unit comprised in the first second counting period is continuous with a first time unit of a first counting period in the N first counting periods; and a first time unit within a second counting period in the two second counting periods is continuous with a last time unit comprised in a last counting period in the N first counting periods, and a last time unit comprised in the second counting period is continuous with a first time unit of the $(i+1)^{th}$ AM group.

6. The method according to claim 5, wherein in response to a remainder obtained by dividing M by s being r, the two second counting periods comprise r time units, and r is an integer greater than or equal to 1 and less than s.

7. The method according to claim 1 wherein each slot comprised in the first calendar corresponds to only a part of the plurality of logical lanes.

8. The method according to claim 7, wherein in response to a quantity of slots within the first calendar being equal to a quantity of logical lanes comprised in the plurality of logical lanes, the slots comprised in the first calendar one-to-one correspond to the logical lanes comprised in the plurality of logical lanes.

9. The method according to claim 7, wherein in response to a quantity of logical lanes within the plurality of logical lanes being equal to K multiplied by a quantity of slots comprised in the first calendar, and K is being an integer greater than or equal to 2, each slot of the first calendar corresponds to K logical lanes in the plurality of logical lanes, and the K logical lanes corresponding to different slots of the first calendar are different.

10. The method according to claim 7, wherein in response to a quantity of slots within the first calendar being equal to K multiplied by a quantity of logical lanes within the plurality of logical lanes, and K being an integer greater than or equal to 2, each of the plurality of logical lanes corresponds to K slots of the first calendar, and the K slots corresponding to different logical lanes are different.

11. The method according to claim 1, wherein the method further comprises:

generating the $i^{th}$ AM group based on the mapping relationship, wherein the $i^{th}$ AM group indicates service flows separately corresponding to the slots of the first calendar.

12. The method according to claim 11, wherein a first AM in the $i^{th}$ AM group is used to identify a slot, of the first calendar, that corresponds to a first time unit of a first counting period in the M time units between the $i^{th}$ AM group and the $(i+1)^{th}$ AM group.

13. A data transmission method comprising:

Receiving, by a second communication apparatus, an $i^{th}$ alignment marker (AM) group sent by a first communication apparatus, wherein the $i^{th}$ AM group is used to align a plurality of logical lanes, and i is an integer greater than or equal to 1;

receiving, by the second communication apparatus in M time units between the $i^{th}$ AM group and an $(i+1)^{th}$ AM group, first data that is of a plurality of service flows and that is sent by the first communication apparatus by using the plurality of logical lanes, wherein M is an integer greater than or equal to 2;

determining, by the second communication apparatus, service flows corresponding to data separately carried in the M time units between the $i^{th}$ AM group and the $(i+1)^{th}$ AM group, wherein there is a mapping relationship between the plurality of service flows and a slot of a first calendar, wherein the first calendar comprises s slots, and s is an integer greater than or equal to 2; and the M time units between the $i^{th}$ AM group and the $(i+1)^{th}$ AM group comprise N first counting periods, the first counting period comprises s time units, each time unit of the first counting period corresponds to one slot of the first calendar, different time units of a same first counting period correspond to different slots of the first calendar, and N is an integer greater than or equal to 1; and receiving, by the second communication apparatus, the $(i+1)^{th}$ AM group sent by the first communication apparatus, wherein a reception time interval between receiving the $i^{th}$ AM group by the second communication apparatus and receiving the $(i+1)^{th}$ AM group by the second communication apparatus is the M time units.

14. The method according to claim 13, wherein the M time units between the $i^{th}$ AM group and the $(i+1)^{th}$ AM group further comprise at least one second counting period, the second counting period comprises only-a part of the s time units, each time unit of the second counting period corresponds to one slot of the first calendar, and different time units of a same second counting period correspond to different slots of the first calendar.

15. The method according to claim 14, wherein the at least one second counting period comprises one second counting period; and a first time unit within the second counting period is continuous with a last time unit within a last counting period in the N first counting periods, and a last time unit within the second counting period is continuous with a first time unit of the $(i+1)^{th}$ AM group; or a first time unit within the second counting period is continuous with a last time unit within the $i^{th}$ AM group, and a last time unit within the second counting period is continuous with a first time unit of a first counting period in the N first counting periods.

16. A first communication apparatus comprising:

a transceiver, configured to:

send an $i^{th}$ alignment marker (AM) group to a second communication apparatus, wherein the $i^{th}$ AM group is used to align a plurality of logical lanes, wherein i is an integer greater than or equal to 1; and send first data of a plurality of service flows to the second communication apparatus based on a mapping relationship by using the plurality of logical lanes, wherein the first data is carried in M time units between the $i^{th}$ AM group and an $(i+1)^{th}$ AM group, wherein M is an integer greater than or equal to 2, wherein the mapping relationship is a mapping relationship between a slot of a first calendar and the plurality of service flows, wherein the first calendar comprises s slots, and wherein s is an integer greater than or equal to 2;

the M time units between the $i^{th}$ AM group and the $(i+1)^{th}$ AM group comprise N first counting periods, the first counting period comprises s time units, each time unit of the first counting period corresponds to one slot of the first calendar, different time units of a same first counting period correspond to different slots of the first calendar, and N is an integer greater than or equal to 1; and the first communication apparatus sends the $(i+1)^{th}$ AM group to the second communication apparatus, wherein a transmission time interval between sending the $i^{th}$ AM group by the first communication apparatus and sending the $(i+1)^{th}$ AM group by the first communication apparatus is the M time units.

17. The first communication apparatus according to claim 16, wherein the M time units between the $i^{th}$ AM group and the $(i+1)^{th}$ AM group further comprise at least one second counting period, the second counting period comprises only a part of the s time units, each time unit of the second counting period corresponds to one slot of the first calendar, and different time units of a same second counting period correspond to different slots of the first calendar.

18. The first communication apparatus according to claim 17, wherein the at least one second counting period comprises one second counting period; and wherein a first time unit within the second counting period is continuous with a last time unit comprised within a last counting period in the N first counting periods, and a last time unit comprised in the second counting period is continuous with a first time unit of the $(i+1)^{th}$ AM group; or a first time unit within the second counting period is continuous with a last time unit within the $i^{th}$ AM group, and a last time unit within the second counting period is continuous with a first time unit of a 1st first counting period in the N first counting periods.

19. The first communication apparatus according to claim 18, wherein in response to a remainder obtained by dividing M by s being r, the second counting period comprises s-r time units, and wherein r is an integer greater than or equal to 1 and less than s.

20. The first communication apparatus according to claim 17, wherein the at least one second counting period comprises two second counting periods; and wherein a first time unit within a first second counting period in the two second counting periods is continuous with a last time unit within the $i^{th}$ AM group, and a last time unit within the first second counting period is continuous with a first time unit of a first counting period in the N first counting periods; and a first time unit comprised in a second counting period in the two second counting periods is continuous with a last time unit within a last counting period in the N first counting periods, and a last time unit within the 25% second counting period is continuous with a first time unit of the $(i+1)^{th}$ AM group.

* * * * *